United States Patent
Quirynen et al.

(10) Patent No.: US 12,311,975 B2
(45) Date of Patent: May 27, 2025

(54) SYSTEM AND METHOD FOR CONTROLLING MOVEMENT OF A VEHICLE

(71) Applicant: Mitsubishi Electric Research Laboratories, Inc., Cambridge, MA (US)

(72) Inventors: Rien Quirynen, Cambridge, MA (US); Yebin Wang, Boston, MA (US); Stefano Di Cairano, Cambridge, MA (US); Ahmad Ahmad, Cambridge, AL (US); Zejiang Wang, Cambridge, MA (US); Akshay Bhagat, Cambridge, MA (US); Eyad Zeino, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 200 days.

(21) Appl. No.: 17/933,210

(22) Filed: Sep. 19, 2022

(65) Prior Publication Data
US 2024/0059317 A1    Feb. 22, 2024

Related U.S. Application Data

(60) Provisional application No. 63/371,986, filed on Aug. 19, 2022.

(51) Int. Cl.
*B60W 60/00* (2020.01)
*B60W 10/18* (2012.01)
(Continued)

(52) U.S. Cl.
CPC ........ *B60W 60/0015* (2020.02); *B60W 10/18* (2013.01); *B60W 30/09* (2013.01);
(Continued)

(58) Field of Classification Search
CPC ...... B25J 9/1664; B25J 9/1666; B25J 9/1671; G05B 2219/40099; G05B 2219/40108;
(Continued)

(56) References Cited

U.S. PATENT DOCUMENTS 9,969,386 B1 * 5/2018 Wang .................. B62D 15/027
10,809,732 B2 10/2020 Wang
(Continued)

OTHER PUBLICATIONS

Jhang et al. "Human like motion planning for autonomous parking based on revised bidirectional rapidly exploring random tree with reeds shepp curve," Asian Journal of Control, Chinese Automatic Control Society, Hoboken, USA. vol. 23m No. 3. Oct. 14, 2020.
(Continued)

*Primary Examiner* — Andrew Joseph Rudy
(74) *Attorney, Agent, or Firm* — Gene Vinokur

(57) ABSTRACT

A control system for controlling movement of a vehicle, is disclosed. The control system is configured to construct a graph having multiple nodes defining states of the vehicle. The multiple nodes comprise an initial node defining initial state and a target node defining target state. Each pair of nodes is connected by an edge defined by collision-free motion primitives where the nodes comprise motion cusps. Multiple nodes connected through edges form a first path. A first number of motion cusps in the first path is determined and the graph is expanded to add new nodes until a termination condition is met on determining that the first number of motion cusps is above a threshold. The expansion of the graph is subjected to a constraint associated with a total number of motion cusps. Further a second path is determined having lesser motion cusps than the first path.

24 Claims, 21 Drawing Sheets

(51) Int. Cl.
  *B60W 30/09*     (2012.01)
  *B60W 30/095*    (2012.01)
  *B60W 10/06*     (2006.01)
  *B60W 10/20*     (2006.01)

(52) U.S. Cl.
  CPC .... *B60W 30/0953* (2013.01); *B60W 30/0956* (2013.01); *B60W 10/06* (2013.01); *B60W 10/20* (2013.01)

(58) Field of Classification Search
  CPC .......... G05B 2219/40392; G06V 10/82; B60R 11/04; B60W 10/06; B60W 10/18; B60W 30/09; B60W 30/0953; B60W 30/0956; B60W 60/00; B60W 60/0015
  USPC ........................................................ 701/26
  See application file for complete search history.

(56) References Cited

U.S. PATENT DOCUMENTS 11,803,184 B2 * 10/2023 Bonanni ................ G06V 20/56
11,970,161 B2 *  4/2024 Sorin ................ B60W 60/0023
12,049,238 B2 *  7/2024 Liu .................... B60W 60/0011

OTHER PUBLICATIONS

Aine, Sandip, Siddharth Swaminathan, Venkatraman Narayanan, Victor Hwang, and Maxim Likhachev. "Multi-heuristic a." The International Journal of Robotics Research 35, No. 1-3 (2016): 224-243.

Quirynen, Rien, and Stefano Di Cairano. "PRESAS: Block-structured preconditioning of iterative solvers within a primal active-set method for fast MPC." arXiv preprint arXiv:1912.02122 (2019).

* cited by examiner

| Path Classes | Path Patterns |
|---|---|
| CSC-1 | L+S+L+, L-S-L, R+S+R+, R-S-R- |
| CSC-2 | L+S+R+, L-S-R, R+S+L+, R-S-L- |
| C\|C\|C | L+R-L+, L-R+L, R+L-R+, R-L+R- |
| C\|CC | L+R-L, L-R+L+, R+L-R, R-L+R+ |
| CC\|C | L+R+L-, L-R-L+, R+L+R-, R-L-R+ |
| $CC_uC$ | L+$R_u$+$L_u$-R-, L-$R_u$-$L_u$+R+, R+$L_u$+$R_u$-L-, R-$L_u$-$R_u$+L+ |
| C\|$C_u$$C_u$\|C | L+$R_u$-$L_u$-R+, L-$R_u$+$L_u$+R-, R+$L_u$-$R_u$-L+, R-$L_u$+$R_u$+L- |
| C\|C$\pi$/2SC-1 | L+R$\pi$/2-S-R-, L-R$\pi$/2-S+R+, R+L$\pi$/2-S-L-, R-L$\pi$/2+S+L+ |
| C\|C$\pi$/2SC-2 | L+R$\pi$/2-S-L-, L-R$\pi$/2-S+L+, R+L$\pi$/2-S-R-, R-L$\pi$/2+S+R+ |
| CSC$\pi$/2\|C-1 | L+S+L$\pi$/2+R, L-S-L$\pi$/2-R, R+S+R$\pi$/2+L-, R-S-R$\pi$/2-L+ |
| CSC$\pi$/2\|C-2 | L+S+R$\pi$/2+L-, L-S-R$\pi$/2-L+, R+S+L$\pi$/2+R-, R-S-L$\pi$/2-R+ |
| C\|C$\pi$/2SC$\pi$/2\|C | L+R$\pi$/2-S-L$\pi$/2-R+, L-R$\pi$/2+S+L$\pi$/2+R-, R+L$\pi$/2-S-R$\pi$/2-L, R-L$\pi$/2-S-R$\pi$/2-L+ |

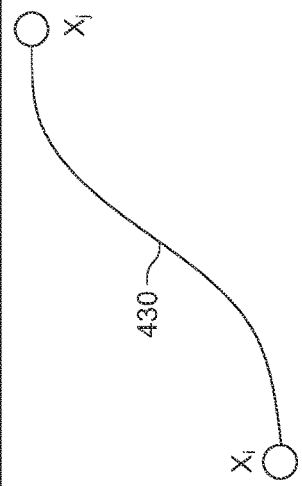

FIG. 5B

SYSTEM AND METHOD FOR CONTROLLING MOVEMENT OF A VEHICLE

TECHNOLOGICAL FIELD

The present disclosure relates generally to controlling vehicles, and more particularly to motion planning and predictive control for an autonomous or a semi-autonomous vehicle-trailer system.

BACKGROUND

Automated transportation systems, even in the case of partial automation, may lead to reduced accidents and more efficient usage of the vehicles and infrastructure. Connected and automated vehicles (CAVs) show large promises for improving safety and traffic flow, thereby reducing congestion, travel time, emissions, and energy consumption. Commercial heavy-duty vehicles (HDV), such as trucks, are an important use case of vehicle automation. In particular, considering the increasingly high complexity of supply chain management, automated trucks may provide considerable advantages with respect to economic, environmental, and social factors.

In recent years significant progress has been made in optimization-based planning and control for automated vehicle operation. For heavy-duty vehicles, the major focus of ongoing research has been on platooning and control of articulated vehicles, especially when cruising on the highway. To this end, optimization-based motion planning and control techniques have been investigated for automation of HDVs different tasks, such as platooning or motion planning during highway driving. In regard to tractor-trailer motion planning, different techniques have been proposed, such as sampling-based, lattice-based, or combined algorithms. Different control algorithms have been proposed to track a resulting motion plan for a tractor-trailer system, for example, including sliding mode control, linear quadratic regulation, input-to-state linearization, dynamic programming, and model predictive control.

However, a different and challenging maneuver for HDVs, which requires extensive and expensive labor training, is tractor-trailer hitching. During the hitching maneuver, a driver needs to accurately control position and orientation of a vehicle, such as a truck, while executing a sequence of forward and reverse motions to connect the vehicle with a trailer standing still. During the process, the driver may have a limited vision of the area around a target hitching point. To this end, the task of automated tractor-trailer hitching is a critical maneuver in heavy-duty vehicle operations, due to requiring a very high precision.

Most prior works focus on articulated tractor-trailer operation, while ignoring the hitching maneuver that may seem easier but requires a comparably higher precision and is a key task in HDV operation. Therefore, there is a need to overcome a technical problem associated with hitching maneuver, specifically, automated tractor-trailer hitching operation.

SUMMARY

It is an object of some embodiments to disclose a control system for controlling a movement of a vehicle using a motion planner. It is another object of some embodiments to disclose a method for controlling a movement of a vehicle. It is another object of some embodiments to disclose a new type of control system using a motion planning algorithm and a real-time reference tracking controller, tailored to a task of automated hitching maneuver. It is another object of some embodiments to provide such a system and a method that uses a modified variant of bi-directional A-search guided tree (BIAGT) algorithm and the tracking controller using nonlinear model predictive control for motion planning.

Some embodiments are based on the realization that the hitching maneuver (also referred to as hitching operation) is a critical maneuver in heavy-duty vehicle operations, due to very high precision to hitch trailer successfully. Some embodiments are based on a realization that the hitching maneuver requires extensive and expensive labor training, in vehicle-trailer hitching.

Some embodiments are based on the realization that during the hitching maneuver, a driver needs to accurately control position and orientation of a vehicle while executing a sequence of forward and reverse motions to connect the vehicle with a trailer. During the process, the driver may have a limited vision of the area around a target hitching point thereby increasing complexity of the hitching maneuver.

Some embodiment are based on the understanding that current research works focuses on articulated tractor-trailer operation, while ignoring the hitching maneuver that may seem easier but requires a comparably higher precision and is a key task in HDV operation.

Some embodiments are based on the realization that a cause of decreased accuracy in some types of maneuvers along a path generated by a sampling-based motion planning is not only in the motion planning itself, but also in control of the movement of the vehicle to follow the path generated by the sampling-based motion planning.

Some embodiments are based on the realization that it is common for the sampling-based motion planning to generate a fragmental path including multiple motion cusps. The presence of a motion cusp not only adds flexibility to space exploration, but also tends to give a shortest distance path, and is thereby common. Conventional motion planners typically seek for a shortest path and thus give a path plagued by unnecessary motion cusps which compromise positioning accuracy of the integrated control system. Conventional motion planners tend to improve path optimality in terms of path distance, therefore conventional motion planners cannot address issue of unnecessary motion cusps; instead as suggested by theory, potentially add more motion cusps. Some invention is based on realization that taking motion cusps into consideration by integrating a cost function with a soft constraint typically results in longer computation time but unnecessarily leads to a smaller number of cusps.

Some embodiments are based on the realization that, in theory, the presence of the motion cusps may add inconvenience and the necessity of shifting a gear but should not cause an accuracy problem.

Some embodiments are based on the realization that the presence of the motion cusp necessitates the motion of the vehicle with zero and near-zero velocity and such motion is problematic for the accuracy of the control due to the dominance of inertia of the vehicle over its dynamic behavior. Hence, each motion cusp in a path of the vehicle creates uncertainty that accumulates with the number of motion cusps creating an accuracy problem.

It is an object of some embodiments to generate a path for performing a maneuver while reducing the number of motion cusps in the path. Some embodiments are based on understanding that the sampling-based motion planning constructs a tree by adding new nodes based on a so-called cost-to-go indicative of the cost of having a path going through the new node. Hence, it is reasonable to add the penalty for having a motion cusp in the cost of the node. However, the approach of using motion cusps as a soft constraint in the cost function is computationally expensive for sampling-based motion planning and may lead to a failure in finding a feasible solution.

Accordingly, to overcome the above-mentioned problems, some embodiments disclose a multi-stage motion planner that during a first stage aims to find a feasible path using the sampling-based motion planning without considering the number of motion cusps. However, after finding a feasible path, instead of terminating the planning and outputting the path to the controller, the multi-stage motion planner continues to expand the tree during a second stage using a hard constraint on the number of motion cusps.

Additionally it is an object of some embodiments to provide such a sampling-based motion planning that may enable the movement of the vehicle with increased accuracy. Examples of the maneuver benefiting from the increased accuracy include hitching of the vehicle, such as trucks, docking, etc. However, even regular parking in a tight space may benefit from the accurate execution of the parking maneuver.

It is an object of some embodiments to provide an integrated system using a tree-based motion planning algorithm and a real-time reference tracking controller, tailored to the task of automated tractor-trailer hitching. It is an object of some embodiments to provide a modified variant of a bi-directional A-search guided tree (BIAGT) path and motion planning algorithm. For tracking an obtained reference trajectory from the BIAGT algorithm so to successfully complete the hitching maneuver, it is an object of some embodiments to provide a real-time and feasible implementation of a nonlinear model predictive controller (NMPC) for combined lateral and longitudinal dynamics of the tractor.

Some embodiments are based on the recognition that the vehicle, for example, a truck or a tractor, maneuvers in forward and reverse consecutively while steering towards the hitching point, where the vehicle's hitching mechanism connects to the trailer.

Some embodiments are based on the recognition that unlike typical automated driving on highways or urban environments, the hitching maneuver is more lenient to the path tracking errors when the vehicle is far from the hitching point but is very stringent in both lateral position and heading error requirements in a neighborhood of the hitching point. Therefore, in order not to damage the hitching mechanism and to successfully connect to the trailer there are certain requirements of automated hitching maneuver.

Some embodiments are based on the understanding that a set of vehicle poses are defined as $P \subset R^3$, and $P_{free} \subset P$ denotes a set of collision-free poses for the vehicle.

It is an object of some embodiments to compute a trajectory and control the vehicle to execute the hitching maneuver starting from an initial pose $p_0 \in P_{free}$ with zero velocity, to a hitching pose $p_f \in P_{free}$, while meeting certain requirements.

Some embodiments are based on the understanding that the requirements for the automated hitching system are that a lateral position error $|e_Y|<0.1$ meters (m) and a heading error $|e_\psi|<10$ degrees (deg) with respect to a preferred hitching orientation, is required, in a set where $P_f \in P_{free}$ around a hitching pose of $p_f \in P_f$.

Some embodiments are based on the recognition that planning and control algorithms disclosed in the present disclosure need to run on an automotive grade embedded system platform and meet the real-time requirements:

It is an object of some embodiments to provide tailored modifications of the BIAGT algorithm for motion planning of the vehicle-trailer hitching maneuver.

It is an object of some embodiments to provide a NMPC design for reference tracking that is offset-free, to meet the stringent precision requirements of the hitching maneuver.

It is an object of some embodiments to provide hardware-in-the-loop (HIL) validation results of planner and controller for automated vehicle-trailer hitching.

Accordingly, one embodiment discloses a control system for controlling a movement of a vehicle using a motion planner. The control system comprises at least one processor and a memory having instructions stored thereon. The at least one processor is configured to construct a graph having multiple nodes defining states of the vehicle. The multiple nodes of the graph includes an initial node defining an initial state of the vehicle and a target node defining a target state of the vehicle, wherein each pair of nodes in the graph is connected with an edge defined by one or a combination of collision-free motion primitives moving the vehicle between the states of the connected node. Each node comprises a number of motion cusps, wherein the multiple nodes connected through the corresponding edges form a first path through the graph connecting the initial node with the target node by a sequence of motion primitives for moving the vehicle from the initial state to the target state. The at least one processor is configured to determine a first number of motion cusps in the sequence of motion primitives of the first path, wherein a motion cusp from the first number of motion cusps indicates a switching between a forward motion and a backward motion in the sequence of motion primitives. The at least one processor is configured to expand the graph to add new nodes until a termination condition is met, on determining that the first number of motion cusps is above a threshold. The expansion of the graph is subjected to a constraint associated with a total number of motion cusps; the graph being expanded to form a second path connecting the initial node with the target node. The second path has a second number of motion cusps that is less than the first number of motion cusps. The at least one processor is configured to control the movement of the vehicle based on the second path.

The at least one processor is further configured to perform the expansion of graph until the termination condition is met and control the movement of the vehicle based on the second path, when the second path is formed before the termination condition is met.

The at least one processor is further configured to control the movement of the vehicle based on the first path, when the second path is not formed until the termination condition is met.

The at least one processor is further configured to compare the first number of motion cusps with the threshold and expand the graph to add the new nodes when the first number of motion cusps in the first path is above the threshold.

Some embodiments are based on an understanding that the second path comprises a minimum number of motion cusps for moving the vehicle from the initial state to the target state.

The at least one processor is further configured to generate a trajectory for the movement of the vehicle along at least one of: the first path or the second path, as a function of time.

Further, the at least one processor is configured to generate control commands for the vehicle to cause the vehicle to follow the trajectory.

The at least one processor is further configured to generate the trajectory for the movement of the vehicle by adding a time dimension to at least one of: the first path of the second path, wherein the adding the time dimension comprises adding extra time period at one or more cusps of the trajectory.

The at least one processor is further configured to construct the graph to form the first path by iteratively expanding a node from the multiple nodes to create a new node or by connecting two existing nodes from the multiple nodes.

In some embodiments, to form at least one of: the first path or the second path, the at least one processor is further configured to construct a first tree of a first set of nodes originating from the initial node and construct a second tree of a second set of nodes from the target node. Further, the at least one processor is configured to connect the first tree with the second tree by connecting a node from the first set of nodes with another node from the second set of nodes.

The at least one processor is further configured to connect the first tree with the second tree using a collision-free connecting path with one of forty-eight Reeds-Shepp (RS) patterns to form the first path. Further, the at least one processor is configured to connect the first tree with the second tree using a collision-free connecting path with one of eight from the forty-eight RS patterns to form the second path, wherein the eight RS patterns are cusp-free.

In some embodiments, to form at least one of: the first path or the second path, the at least one processor is further configured to select an expandable node from at least one of: the first nodes of the first tree, or the second nodes of the second tree, based on a cost associated with the expandable node. Further, the at least one processor is configured to expand the graph by adding a child node connected to the expandable node with an edge defined by a collision-free motion primitive such that a cost of the child node is less than the cost of the expandable node. The cost of the child node is a minimum cost for reaching the target node from the initial node through the child node, the cost of the child node including a first cost of an initial path through the first set of nodes, a second cost of a target path through the second set of nodes, and a third cost of a connecting path between the first set of nodes and the second set of nodes.

The at least one processor is further configured to remove a child node from a queue while expanding the graph to form the second path, when an edge between the child node and a corresponding expandable node comprises a number of motion cusps greater than a predefined threshold.

In some embodiments, the at least one processor is further configured to select the expandable node to form the first path without the constraint associated with the number of motion cusps. Further, the at least one processor is configured to select the expandable node to form the second path, wherein the expansion of the graph is subjected to the constraint associated with the total number of motion cusps.

The at least one processor is further configured to initialize the second tree with a root node at a distance from the target node having a cusps-free movement to the target node.

Some embodiments are based on an understanding that the root node is connected to the target node with an edge defining a straight motion.

Another embodiment discloses a method for controlling a movement of a vehicle. The method comprises constructing a graph having multiple nodes defining states of the vehicle. The multiple nodes of the graph includes an initial node defining an initial state of the vehicle and a target node defining a target state of the vehicle, wherein each pair of nodes in the graph is connected with an edge defined by one or a combination of collision-free motion primitives moving the vehicle between the states of the connected node. Each node comprises a number of motion cusps, wherein the multiple nodes connected through the corresponding edges form a first path through the graph connecting the initial node with the target node by a sequence of motion primitives for moving the vehicle from the initial state to the target state. The method comprises determining a first number of motion cusps in the sequence of motion primitives of the first path, wherein a motion cusp from the first number of motion cusps indicates a switching between a forward motion and a backward motion in the sequence of motion primitives. The method comprises expanding the graph to add new nodes until a termination condition is met, on determining that the first number of motion cusps is above a threshold. The expansion of the graph is subjected to a constraint associated with a total number of motion cusps; the graph being expanded to form a second path connecting the initial node with the target node. The second path has a second number of motion cusps that is less than the first number of motion cusps. The method comprises controlling the movement of the vehicle based on the second path.

Yet another embodiment discloses a non-transitory computer readable storage medium embodied thereon a program executable by a processor for performing a method for controlling a movement of a vehicle using a motion planner. The method comprises constructing a graph having multiple nodes defining states of the vehicle. The multiple nodes of the graph includes an initial node defining an initial state of the vehicle and a target node defining a target state of the vehicle, wherein each pair of nodes in the graph is connected with an edge defined by one or a combination of collision-free motion primitives moving the vehicle between the states of the connected node. Each node comprises a number of motion cusps, wherein the multiple nodes connected through the corresponding edges form a first path through the graph connecting the initial node with the target node by a sequence of motion primitives for moving the vehicle from the initial state to the target state. The method comprises determining a first number of motion cusps in the sequence of motion primitives of the first path, wherein a motion cusp from the first number of motion cusps indicates a switching between a forward motion and a backward motion in the sequence of motion primitives. The method comprises expanding the graph to add new nodes until a termination condition is met, on determining that the first number of motion cusps is above a threshold. The expansion of the graph is subjected to a constraint associated with a total number of motion cusps; the graph being expanded to form a second path connecting the initial node with the target node. The second path has a second number of motion cusps that is less than the first number of motion cusps. The method comprises controlling the movement of the vehicle based on the second path.

Some embodiments are based on the understanding that performing the hitching maneuver for vehicles, for hitching the vehicles with trailer, requires complex, time consuming and costly labor training. Moreover, owing to limited visibility of an area associated with a hitching point, drivers of the vehicles may have to perform extra movements (such as forward and backward motions) several number of times in order to correctly hitch the vehicles with trailer. Owing to limited visibility, the hitching operation may also be prone accidents. However, current path and motion planning systems fail to perform such hitching operation for a vehicle in an automated manner. Therefore, it is an objective of the present disclosure to enable automated hitching of the vehicle with trailer. The automated may reduce time for hitching and chances of accidents. In this way, such complex hitching operation may be performed in an automated manner.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 5B illustrates an example of a type of motion primitives, in accordance with another embodiment of the present disclosure;

DETAILED DESCRIPTION

Figure 1A:
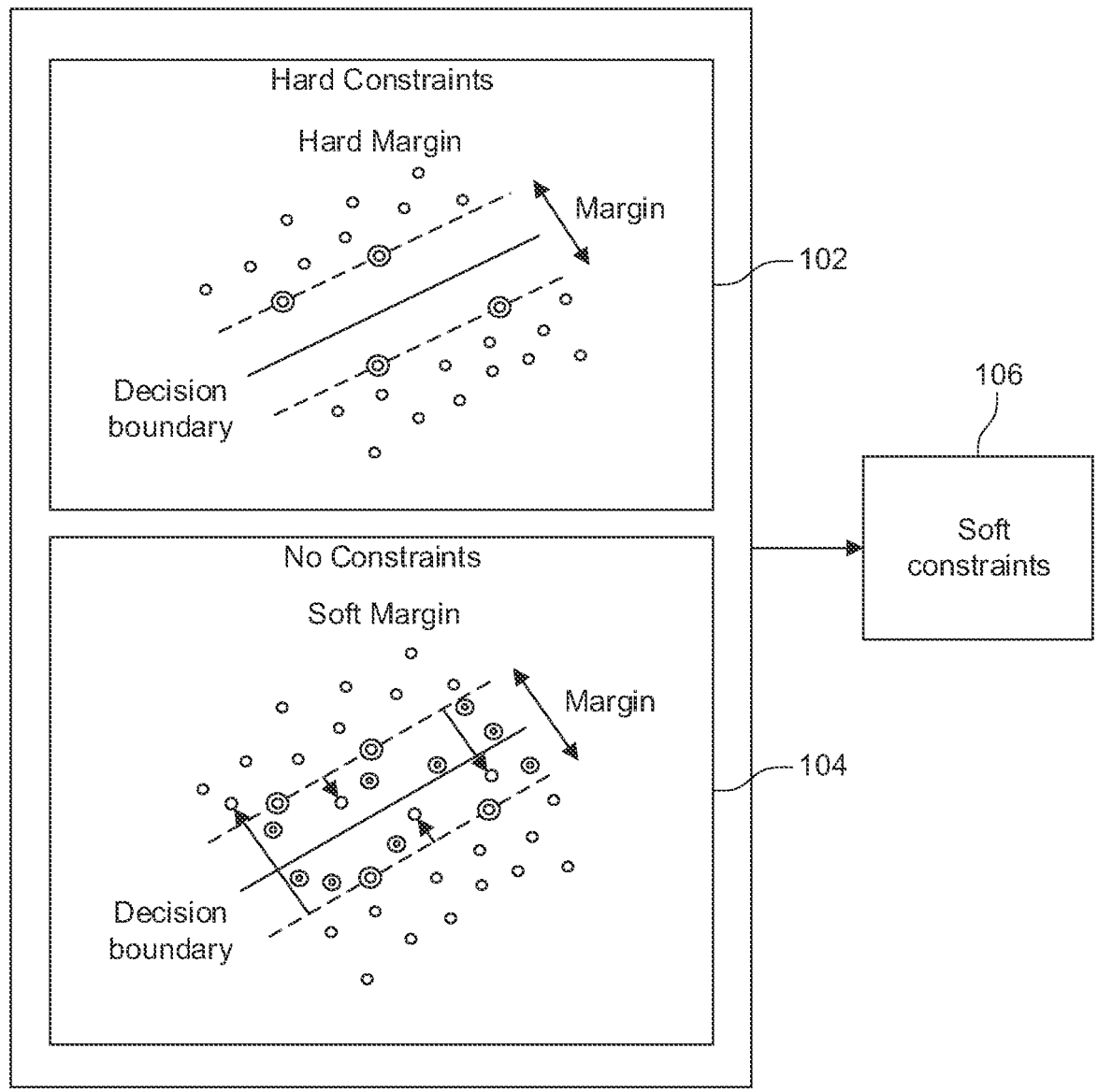
FIG. 1A shows an example graph depicting imposing no constraints, hard constraints, and soft constraints on motion primitives for motion planning, according to some embodiments of the present disclosure.

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure. Contemplated are various changes that may be made in the function and arrangement of elements without departing from the spirit and scope of the subject matter disclosed as set forth in the appended claims.

As used in this specification and claims, the terms "for example," "for instance," and "such as," and the verbs "comprising," "having," "including," and their other verb forms, when used in conjunction with a listing of one or more components or other items, are each to be construed as open ended, meaning that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

It is an object of some embodiments to disclose a system and a method for controlling a movement of a vehicle using a motion planner. It is another object of some embodiments to disclose path and motion planning algorithm and a predictive controller for controlling the movement of the vehicle in real-time. An example of the predictive controller is a model predictive control (MPC) for determining control inputs based on a dynamic model and constraints of the controlled system. An example of the path and motion planning algorithm is bi-directional A-search guided tree (BIAGT). It is another object of some embodiments to disclose techniques for controlling movement or operation of the vehicle during hitching maneuver in an automated manner, i.e., without human intervention. It is another object of some embodiments to disclose techniques for computing kinematically feasible reference trajectory online, starting from an initial pose $p_0$ to an ending or goal pose $p_f$, while avoiding collisions between the vehicle and any static obstacles in environment.

Typically, the BIAGT algorithm may compute kinematically feasible solutions for automated vehicle parking tasks by searching for a trajectory by forming a graph. In operation, the BIAGT algorithm may perform bi-directional search to find smallest path from an initial node to a goal node by starting the search from both directions, simultaneously. In particular, the BIAGT may start generating sub-graphs from both direction, for example, one starting from the initial node and other starting from the goal node. In this manner, the BIAGT algorithm may perform a forward search from the initial node towards the goal node, and a backward search from the goal node towards the initial node. To this end, the search may terminate when the two sub-graphs intersect. Based on the graph, the trajectory may be determined.

To this end, the vehicle's hitching maneuver may be considered as a special parking task with very stringent requirements on terminal phase of the maneuver in terms of lateral position and heading angle errors. For performing the hitching maneuver for the vehicle, the BIAGT is modified. The embodiments of the present disclosure are described in detail in conjunction with appended figures.

FIG. 1A shows an example graph depicting imposing no constraints, hard constraints, and soft constraints on motion primitives for motion planning. In accordance with some embodiments, vehicle path planning plays a key role in vehicle navigation system. To this end, trajectory planning is an essential task of autonomous vehicles. Map- and sensor-based data form a basis to generate a trajectory that serves as a target value to be tracked by a controller. Besides comfort aspects, the feasibility and possible collisions must be considered when generating the target trajectory.

During path planning and trajectory generation, constrained optimization may have to be performed. Vehicle motion must be planned and regulated to accomplish driving tasks and while respecting constraints introduced by a selected model. A motion planning layer is responsible for computing a safe, comfortable, and dynamically feasible trajectory from a vehicle's current configuration or current state to a goal configuration or goal state. Depending on context, the goal configuration may differ. For example, the goal location may be a hitching point where the vehicle, such as a tractor, may hitch to a trailer to form a tractor-trailer configuration.

A path planning problem is to find a path $\sigma(\alpha):[0, 1] \rightarrow X$ in a configuration space X of the vehicle (or more generally, a robot) that starts at the initial state and reaches the goal location while satisfying constraints. The path planning problem may be solved to generate a dynamically feasible path. The generated trajectory must be smooth without extreme turns as a robot may have several motion constraints, such as the non-holonomic condition in under-actuated systems. Feasible path planning refers to a problem of determining a path that satisfies some given problem constraints (namely, hard constraints) without focusing on a quality of the solution.

While generating a feasible path ensures obstacle-free navigation, however, due to imposition of the hard constraints, a quality of the generated path may be affected. For example, the path or trajectory may have sharp turn, bad quality, longer route, and the like. As shown in FIG. 1, the motion planning with hard constraints 102 on motion primitives may hamper efficiency of the path.

To this end, not applying any constraints in dynamic optimization is important as the constraints reflect safety and quality limits. Moreover, applying no constraints 104 may result in an infeasible path, without efficiently overcoming obstacles.

Therefore, optimal path planning is required. Optimal path planning refers to the problem of finding a path that optimizes some quality criterion subject to given constraints. The problem of finding an optimal path is difficult. Moreover, there may not be an (efficient) algorithm able to solve all instances of the problem while satisfying constraints. Therefore, soft constraints may have to be imposed to generate optimal path.

A soft constraint is a condition on a trajectory generated by a solution that may have to be satisfied rather than not satisfied but is prepared to accept not satisfying it because of the cost of satisfying it, or because of conflicts with other constraints or goals. In case there are multiple soft constraints, there is a need to determine which of the various constraints should take priority if there is a conflict between them or if it should prove costly to satisfy them.

In accordance with present disclosure, a soft constraint 106 is imposed on a number of motion cusps to ensure accuracy of path. The embodiments of the present disclosure describe imposing soft constraint on path planning based on a number of motion cusps in a generated path.

Figure 1B:
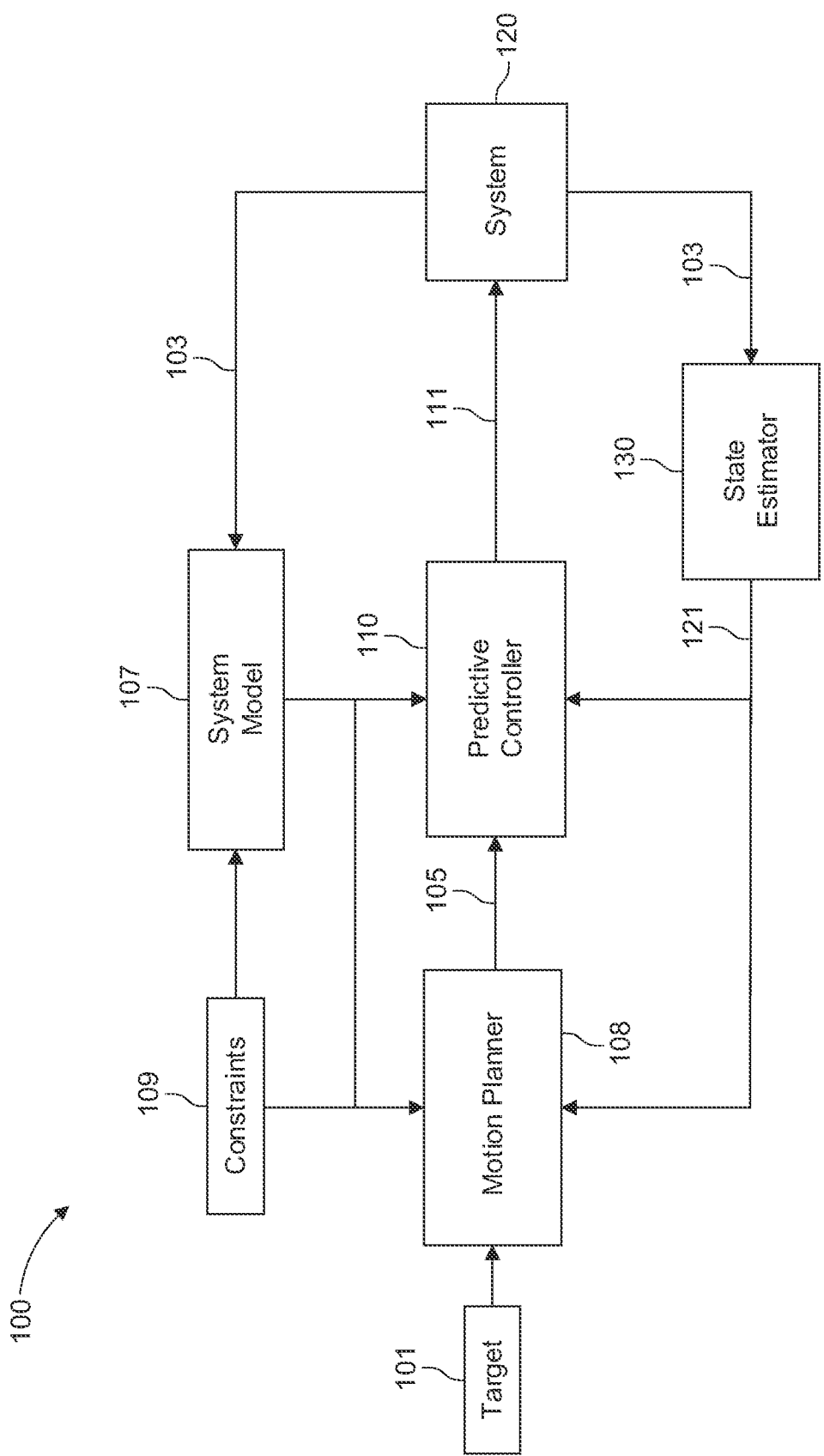
FIG. 1B shows an example environment where a control system is implemented, according to some embodiments of the present disclosure.

FIG. 1B illustrates an environment where a control system 100 is implemented, in accordance with some embodiments of the present disclosure. The control system 100 comprises a motion planner 108, a predictive controller 110 and a system 120. The motion planner 108 may be configured to control movement of a vehicle. In an example, the motion planner 108 may be configured to control movement of the vehicle while performing a hitching maneuver. During the hitching maneuver, the vehicle may have to maneuver in forward and reverse motions consecutively while steering towards a hitching point. At the hitching point, a fifth wheel of the vehicle hitching mechanism may connect to the trailer.

Continuing further, the motion planner 108 is connected to the predictive controller 110 and the system 120, for example, via a state estimator 130. In some implementations, the predictive controller 110 is an MPC controller configured with a dynamic system model 107. The system model 107 may include a set of equations representing changes of state and output 103 of the system 120, over time. In an example, the set of equations may represent the changes of the state and the output 103 as functions of current inputs, previous inputs, and previous outputs. The system model 107 may further include constraints 109 that represent physical and operational limitations of the system 120.

During operation, the predictive controller 110 receives a reference trajectory 105 indicating a desired behavior of the system 120, which is computed by the motion planner 108. The reference trajectory 105 may be, for example, a desired sequence of one or more motion commands. In an example, the reference trajectory 105 may indicate a time function of a path to be travelled by the vehicle to perform a maneuver, such as the hitching maneuver. For example, the motion planner 108 may generate the path based on, for example, a graph structure. Further, time-dimension may be added to the path to generate the reference trajectory 105.

In response to receiving the reference trajectory 105, the predictive controller 110 generates a control signal (also referred to as, control inputs) 111 that serves as an input for the system 120. In response to receiving the control input 111, the system 120 updates the output 103 of the system 120. Based on measurements of the output 103 of the system 120, the state estimator 130 updates an estimated state 121 of the system 120. The estimated state 121 of the system 120 provides state feedback to the predictive controller 110. For example, the predictive controller 110 tracks movement of the vehicle to ensure if the vehicle is travelling along the reference trajectory 105, using the states of the system 120.

The system 120 may be any machine or device controlled by certain manipulation control inputs 111. In an example, the control inputs 111 may be associated with physical quantities, such as voltage, pressure, force, torque, and so forth. For example, the control inputs 111 may indicate control values of, for example, steering angle, acceleration, driving speed, etc. for controlling the vehicle.

The system 120 may be configured to generate some controlled output signals 103 (also referred to as, output 103). For example, the output 103 may also be associated with physical quantities, such as current, flow, velocity, positions indicative of a transition of a state of the system 120 from a previous state to a current state, and so forth. In an example, the output 103 may be associated in part with previous output values of the system 120, and in part with previous and current input values. The dependency on previous inputs and previous outputs may be encoded within the state of the system 120. During operation of the system 120, for example, the system 120 may generate the output 103 indicative change in state of the vehicle, for example, change in precise location, orientation or settings of the vehicle being controlled, based on movement of the vehicle from one state to another while following the reference trajectory 105. In an example, the control inputs 111 may also be provided to the actuators of the vehicle in order to move the vehicle in automated manner based on the reference trajectory. The output 103 may include a sequence of output values generated by the system 120 following the application of certain input values.

The system model 107 may be associated with the system 120. The system model 107 may include a set of mathematical equations that describe how the system 120 outputs 103 may change over time, as functions of current inputs, previous inputs, and previous outputs. The state of the system 120 may correspond to any set of information, such as time varying information. For example, the state of the system 120 may be a subset of current and previous inputs and outputs that, together with the system model 107 of the system 120 and future inputs, may uniquely define the future motion of the vehicle or output of the system 120.

The system 120 may be subjected to physical limitations and specific constraints 109. The constraints 109 may be applied to limit a range of the outputs 103, the inputs 111, and also possibly the states of the system 120, in which the system 120 is allowed to operate. In an example, the constraint may correspond to driving speed limit, physical area limit associated with an environment, etc.

The predictive controller 110 may be implemented in hardware or as software program executed in a processor, for example, a microprocessor. The predictive controller 110 may receive the estimated state 121 of the system 120, at fixed or variable control period sampling intervals. In an example, the estimated state 121 may indicate future motion of the vehicle based on the current and previous inputs and current and previous outputs of the system 120. Based on the control input 111 provided by the predictive controller 110, the actuators of the vehicle may be controlled to move the vehicle. The actuators may be controlled to cause the vehicle to travel on the reference trajectory 105. Such control of vehicle based on the control input 111 may cause a change in a state of the vehicle. Subsequently, determining the estimated state 121 based on the output of the system 120 enables the predictive controller 110 to monitor and track the movement of the vehicle.

The predictive controller 110 may receive the estimated state 121 and the desired reference trajectory 105. Further, the predictive controller 110 may be configured to determine, using the received information, the inputs, for example, the control signal or control inputs 111, for operating the system 120 for controlling movement of the vehicle. The predictive controller 110 may also track the movement of the vehicle based on the estimated state 121 and the reference trajectory 105.

The motion planner 108 may be implemented in hardware or as a software program executed in a processor. Such processor may be either the same or a different processor from the predictive controller 110. The motion planner 108 is configured to receive the estimated state 121 of the system 120 and a desired target state 101, at fixed or variable control period sampling intervals. The motion planner 108 is configured to determine, using the received information, the reference trajectory 105 for the predictive controller 110. In an example, the reference trajectory may be updated based on change in the estimated state 121.

The state estimator 130 may be implemented in hardware or as a software program executed in a processor. Such processor may be either the same or a different processor from the predictive controller 110 or the motion planner 108. The state estimator 130 may be configured to receive the output 103 of the system 120, at fixed or variable control period sampling intervals. Further, the state estimator 130 may determine, using the new and the previous output measurements, the estimated state 121 of the system 120. In this manner, the reference trajectory 105 generated by the motion planner 108 may be updated, based on the estimated state 121 of the system 120 and control signals or control inputs 111 generated by the predictive controller 110. The updated reference trajectory may optimize operation of a task, such as a maneuver, by a vehicle.

Figure 1C:
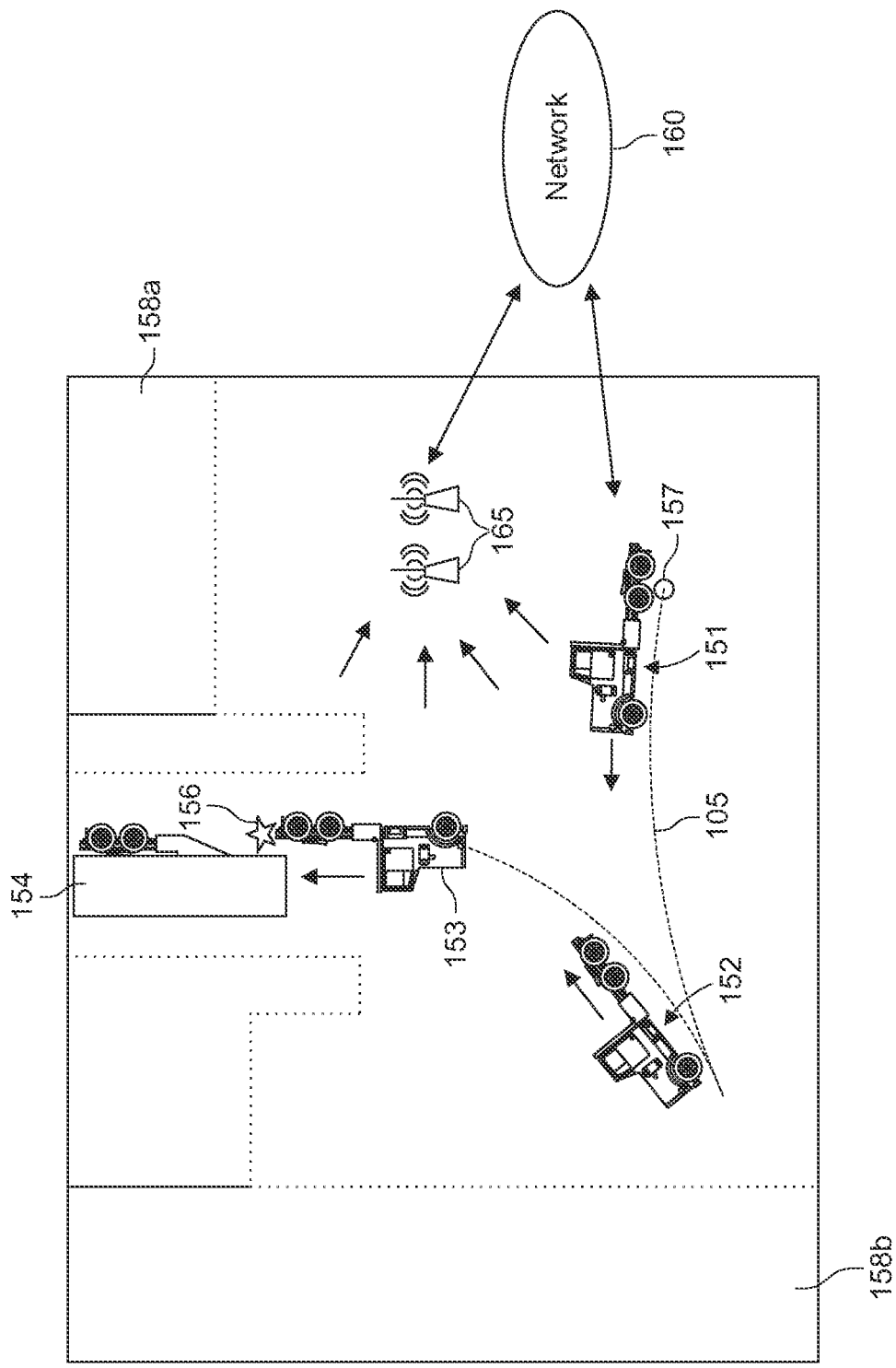
FIG. 1C shows an example of an automated hitching maneuver, according to some embodiments of the present disclosure.

FIG. 1C shows an example of an automated hitching maneuver, in accordance with some embodiments of the present disclosure. For example, a vehicle 153 may have to perform the hitching maneuver to hitch a fifth wheel of the vehicle 153 with a trailer 154. The hitching between the vehicle 153 and the trailer may occur at a hitching point. To this end, the hitching maneuver may include a sequence of one or more forward motions 151 and one or more backward motions 152 in order to reach a target goal state configuration 156 (also referred to as a goal state 156 or a target state 156), starting from an initial state configuration 157 (also referred to as an initial state 157 or a source state 157). The hitching maneuver is to be performed without causing any collisions between the vehicle 153 and any obstacle (depicted as obstacles 158a and 158b) within an environment of the vehicle 153.

As described above, unlike typical automated driving on highways or urban environments, the hitching maneuver is more lenient to path tracking errors when the vehicle 153 is far from the hitching point. However, the hitching maneuver is very stringent in both lateral position and heading error requirements in a neighborhood of the hitching point. This may prevent damage to the hitching mechanism and to successfully connect to the trailer 154 for hitching.

According to some embodiments of the present disclosure, the automated hitching maneuver is to be executed based on a reference trajectory 105. The reference trajectory 105 may be computed by the motion planner 108. For example, the reference trajectory 105 may include a forward motion 151, followed by a reverse motion 152 and then followed by a hitching motion between the vehicle 153 and trailer 154. Some embodiments of the disclosure are based on the realization that the position and heading errors with respect to the reference trajectory 105 need to be sufficiently small in a terminal phase. i.e., toward end of the reference trajectory 105 when hitching point is very close, of the hitching maneuver, in order to allow for a successful hitching between the fifth wheel of the tractor 153 and the hitching system of the trailer 154.

According to some embodiments, a set of vehicle poses of the vehicle 153 are defined as $P \subset R^3$, and $P_{free} \subset P$ denotes a set of collision-free poses for the vehicle 153. To this end, there are certain requirements or constraints for performing automated hitching maneuver. In an example, the requirement for automated hitching maneuver may include automating vehicle operation during the hitching maneuver, such that there is no human intervention. Further, the requirement for automated hitching maneuver may include that the reference trajectory 105 starting from an initial pose $p_0$ of the vehicle 153 to a hitching pose $p_f$ of the vehicle 153, is to be computed online and in real-time or near real-time, such that the reference trajectory 105 is kinematically feasible while avoiding collisions between the vehicle 153 and any static obstacles, such as the obstacles 158a and 158b, in the environment. In an example, the requirement for automated hitching maneuver may also include that for a successful hitching and for the safety of the hitching mechanism, a lateral position error $|e_y|$ should be less than 0.1 meters (m) and a heading error $|e_\psi|$ should be less than 10 degrees (deg) with respect to a preferred hitching orientation. Moreover, the lateral position error and the heading error is required to be in a set where $P_f \subset P_{free}$ around a hitching pose of $p_f \in P_f$. Further, the requirement for automated hitching maneuver may include that if a dynamic obstacle enters a safety set around a current or predicted positions of the vehicle 153, the real-time trajectory maneuvering and tracking is interrupted by an emergency braking system, and the real-time trajectory maneuvering, and tracking is resumed when the dynamic obstacle moves away or out of the environment.

In addition, the system for controlling the vehicle 153 operation for automated hitching maneuver need to run on an automotive grade embedded system platform and meet the real-time requirements. In particular, the motion planner 108 may have to execute motion planning at standstill and compute the reference trajectory 105 within a maximum computation time of 2-5 seconds. Further, the predictive controller 110 may have to execute trajectory tracking continuously while the vehicle 153 is moving with a sampling time of $T_s=50$ milliseconds (ms).

In an example, a path and motion planning system may have to control vehicle 153 operations for performing the hitching maneuver under the assumption of normal driving conditions, i.e., not at-the-limit maneuvers. Subsequently, vehicle modeling may be based on a single-track model in which two wheels on each axle of the vehicle 153 are lumped together. Further, if the vehicle 153 is equipped with multiple rear axles, the multiple axes may be lumped together resulting in a model with only two wheels, one at the front and one at the rear. Although a dynamic state model based on force-torque balances is generally more accurate than a kinematic model, a difference at the relatively low speeds, that are typical for a vehicle-trailer hitching maneuver, is small and compensated by the feedback nature of the predictive controller 110.

In this regard, conditions set for the path and motion planning system to determine vehicle model operations or motion commands for the vehicle 153 may be denoted as:

$$\begin{rcases} \dot{p}X = v\cos(\psi), \\ \dot{p}Y = v\sin(\psi), \\ \dot{\psi} = v\tan(\delta_f)/L, \\ \dot{\delta}_f = (\delta - \delta_f)/\tau, \end{rcases} \quad (1)$$

Wherein $(pX, pY, \psi) \in P$ denotes a set of the vehicle poses, $(pX, pY)$ are the longitudinal-lateral position, respectively, $\psi$ is a heading angle and $\dot\psi$ is a heading rate. Further, v denotes a longitudinal velocity of the vehicle, $\delta$ and $\delta_f$ are the desired and actual front wheel steering angles, respectively. Moreover, L is a wheelbase of the tractor and $\tau$ is a time constant of a steering actuator.

In some embodiments of the present disclosure, one or more road-side units (RSUs) or infrastructure sensing devices 165 may be used for accurate execution of the automated vehicle-trailer hitching maneuver, based on accurate sensing of a current state as well as a current environment of the vehicle 153 and the path and motion planning system. For example, the one or more RSUs 165 may include one or more sensors, for example, distance range finders, radars, LIDARs, and/or cameras, as well as sensor fusion technologies in order to accurately detect the state of the vehicle 153 and the dynamic environment around the vehicle 153.

In some embodiments of the present disclosure, the computations of sensor fusion technologies may be executed either in the cloud or in one or more mobile edge computers (MECs), which may be either embedded as a part of one or more RSUs 165 or they may be separate devices that are connected to one or more RSUs 165. In some embodiments of the present disclosure, a communication network 160 may be used for real-time communication between the vehicle 153, the one or more RSUs 165 or infrastructure sensing devices 165, and the path and motion planning system.

Figure 1D:
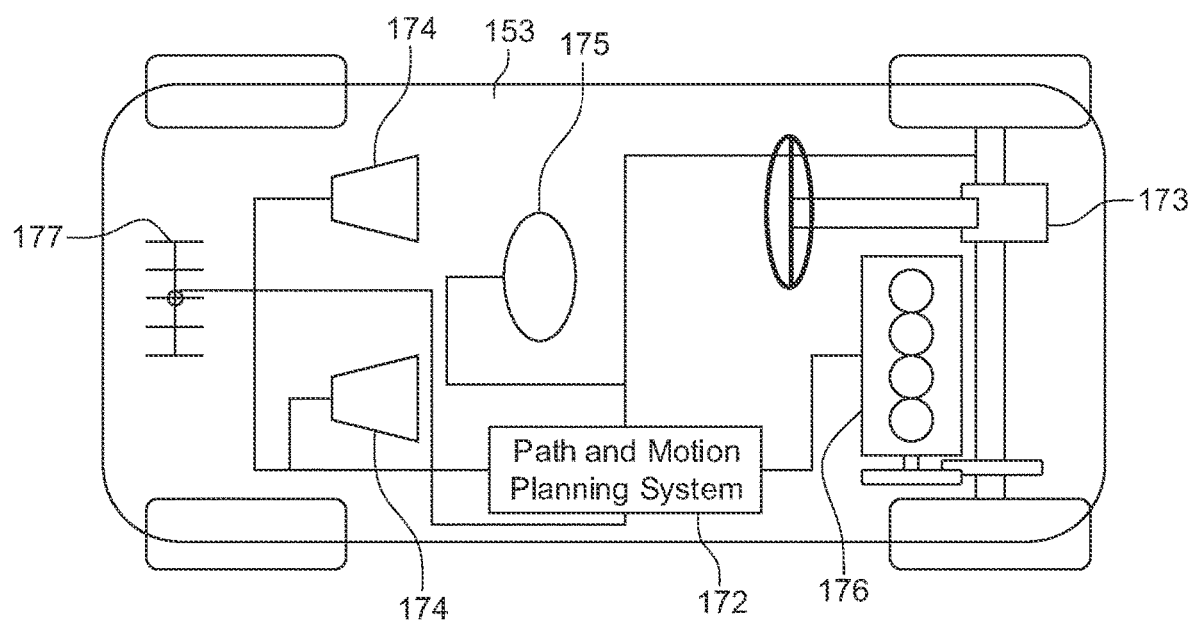
FIG. 1D shows a schematic of a vehicle including a system employing principles of some embodiments, according to some embodiments of the present disclosure.

FIG. 1D shows a schematic of the vehicle 153 including a path and motion planning system 172, employing principles of some embodiments. Examples of the vehicle 153 may include, but are not limited to, passenger car, heavy-duty vehicle, tractor-trailer, bus, or rover. In addition, the vehicle 153 may be an autonomous or semi-autonomous vehicle.

In accordance with some embodiments of the present disclosure, techniques for controlling movement of the vehicle 153 are disclosed. Examples of such movement may include, but are not limited to, lateral motion of the vehicle 153 controlled by a steering system 173 of the vehicle 153. In one embodiment, the steering system 173 is controlled by the path and motion planning system 172. Additionally or alternatively, the steering system 173 may be controlled by a driver of the vehicle 153.

The vehicle 153 may also include an engine 176, which can be controlled by the path and motion planning system 172 or by other components of the vehicle 153. The vehicle 153 may also include one or more sensors 174 to sense the surrounding environment. Examples of the sensors 174 may include, but are not limited to, distance range finders, radars, LIDARs, and cameras. The vehicle 153 may also include one or more sensors 175 to sense current motion quantities and internal status of the vehicle 153. Examples of the sensors 175 may include, but are not limited to, global positioning system (GPS), accelerometers, inertial measurement units, gyroscopes, shaft rotational sensors, torque sensors, deflection sensors, pressure sensors, and flow sensors. The sensors 174 and 175 may provide information to the path and motion planning system 172. The vehicle 153 may be equipped with a transceiver 177 enabling communication capabilities of the path and motion planning system 172 through wired or wireless communication channels.

For example, the path and motion planning system 172 may control operation or movement of the vehicle 153. In this regard, the path and motion planning system 172 may generate the reference trajectory 105 for movement of the vehicle 153 for completing a task. Further, the path and motion planning system 172 may generate motion commands for the vehicle 153 based on the reference trajectory 105 to be followed. Further, the path and motion planning system 172 may control components, such as the steering system 173 of the vehicle 153 to configure the vehicle 153 to perform the task. In an example, the task may be a hitching task, wherein the motion commands may include a sequence of forward and reverse motions.

Figure 1E:
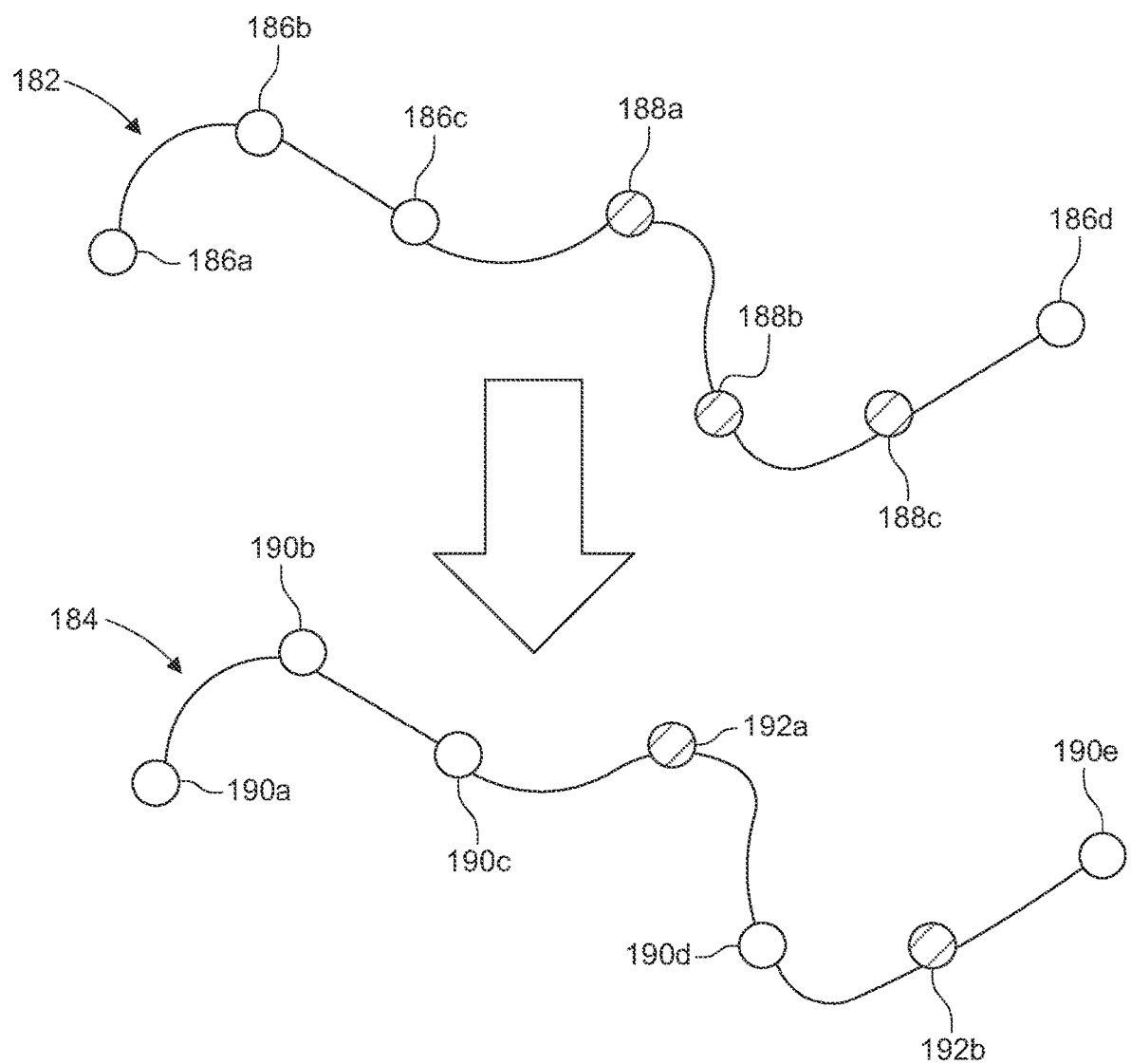
FIG. 1E illustrates an example plot of a path for controlling motion of a vehicle, according to some embodiments of the present disclosure.

FIG. 1E illustrates an example plot of a path for controlling motion of a vehicle, in accordance with some embodiments. Pursuant to present example, the path 182 includes a number of nodes (depicted as nodes 186a, 186b, 186c, 186d, 188a, 188b and 188c) and the path 184 includes the nodes 190a, 190b, 190c, 190d, 190e, 192a and 192b. The path 182 and 184 also includes a number of edges connecting each pair of the corresponding nodes. The nodes 186a, 186b, 186c, 186d, 188a, 188b and 188c are selected to generate the path 182 from other multiple nodes, such that the nodes 186a, 186b, 186c, 186d, 188a, 188b and 188c are dynamically feasible, i.e., ensures collision free path 182. Similarly, the nodes 190a, 190b, 190c, 190d, 190e, 192a and 192b are dynamically feasible nodes.

For accurate hitching maneuver, a path may have to be generated having a constraint over a total number of motion cusps in the path. Specifically, a number of motion cusps should not exist or be less when a vehicle is near a hitching point. To this end, the path 182 shows imposing hard constraints regarding the total number of motion cusps, especially, towards an end of the path when the vehicle may be near the hitching point. As shown, in the path 182, the nodes 186a, 186b, 186c and 186d may not completely remove motion cusps in corresponding motion primitives, however, the nodes 188a, 188b and 188c may satisfy hard constraint on the number of motion primitives and may not include any number of motion cusps.

Generation of such a path 182 may be difficult owing to satisfying of hard constraints, especially, toward the end of the path 182. Therefore, the embodiments of the present disclosure provides techniques such that some of the nodes, such as the nodes 192a and 192b, of the path 184 satisfies the constraint while ensuring that the entire path 184 satisfies the constraint to some extent, without compromising on path quality. In this manner soft constraint is imposed on a dynamically feasible path 182 for generating a path 184 that satisfies the constraint associated with a maximum number of motion cusps in a path.

A manner in which the path and motion planning system 172 operates to generate a path having constraints associated with a maximum number of motion cusps is described in detail, in conjunction with the following figures.

Figure 2:
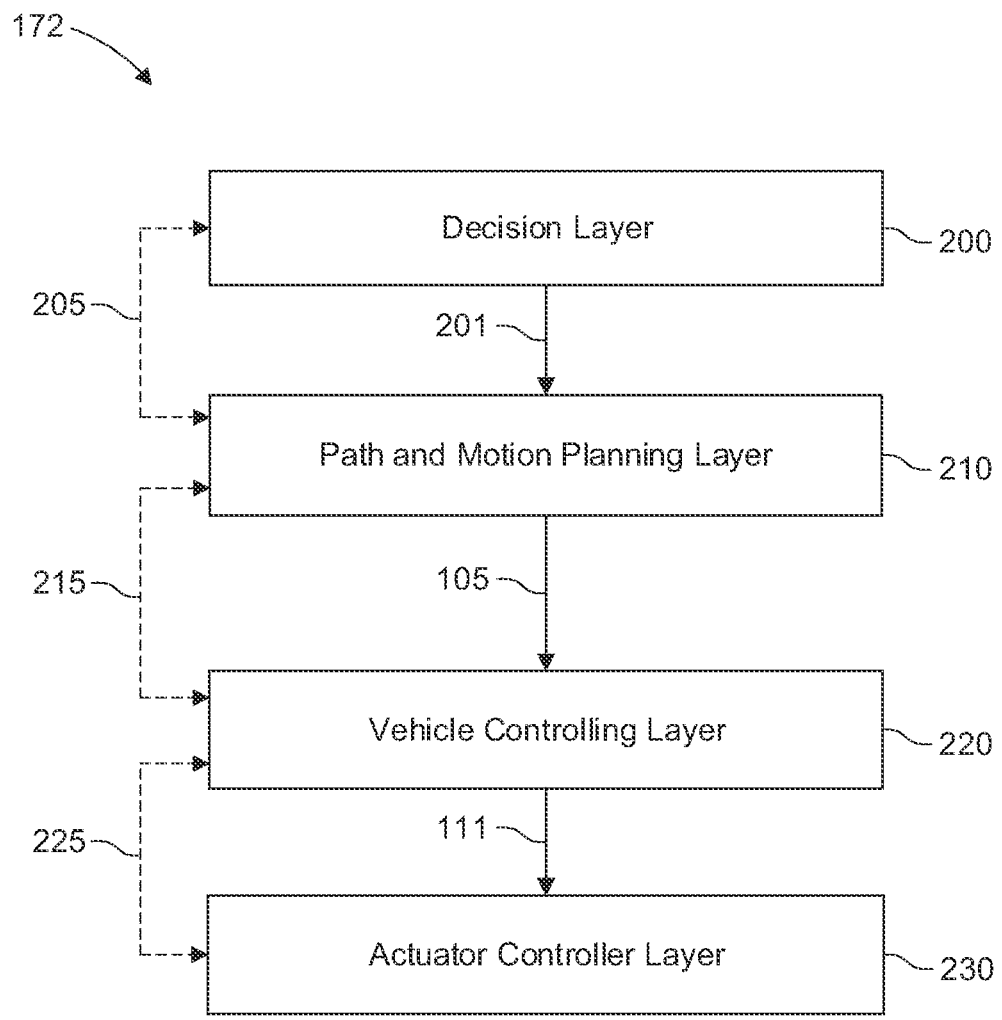
FIG. 2 shows a block diagram of a system for controlling movement of a vehicle, in accordance with some embodiments of the present disclosure.

FIG. 2 shows a schematic of different layers of the path and motion planning system 172 for controlling movement of the vehicle 153, in accordance with some embodiments of the present disclosure. As may be understood, autonomous and semi-autonomous vehicles are complex systems that require integration of advanced and interconnected sensing and control components. Due to complexity associated with developing software and hardware components of an autonomous vehicle and dynamic driving conditions, the autonomous controlling of vehicle is complicated.

In accordance with an embodiment, the path and motion planning system 172 for controlling movement of the vehicle 153 may include a path and motion planning layer 210 and a vehicle controller layer 220. For example, the path and motion planning layer 210 may be implemented by the motion planner 108 and the vehicle controller layer 220 may be implemented by the predictive controller 110.

In an example, the path and motion planning layer 210 computes the reference trajectory 105 and provides the reference trajectory 105 to the vehicle controller layer 220. Further, the vehicle controller layer 220 computes control inputs 111 for the system 120 to track the reference trajectory 105. The system 120 may update the reference trajectory 105 to optimize the vehicle operation. The vehicle controller layer 220 may then execute a desired sequence of one or more motion commands.

According to some embodiments of the present disclosure, the layers of the path and motion planning system 172 may also include a decision layer 200 and/or an actuator controller layer 230.

In operation, a sequence of destinations, in form of a route, may be computed through a road network by a route planner. For example, the route planner may utilize map-based technology in order to generate the route between a source and a target. Such route is then to be navigated by the vehicle 153, in automated or semi-automated manner. Pursuant to present disclosure, the route may be travelled by the vehicle 153 in automated manner. Moreover, the route may correspond to a hitching maneuver, a parking maneuver, etc.

Given the route, the decision layer 200 may be responsible for determining one or more local driving goals (or target goals corresponding to a target location) and corresponding discrete decisions 201 of the vehicle 153. Each decision of the discrete decisions 201 may be a desired sequence of one or more motion commands. Examples of the motion commands may include, but are not limited to, turn right, stay in lane, turn left, change lane, or come to full stop in a particular position. In this regard, a number of sensing and mapping modules may use information from the one or more sensors 165, such as radar, LIDAR, inertial measurement units (IMUs), camera, and/or global positioning system (GPS) information, together with prior map information, to estimate an estimated state from current state of the system 120 and surrounding parts of the environment that are relevant to the system 120 and the vehicle 153 for a particular driving scenario. The sensing and mapping modules may be made available to one, multiple or all of the layers of the path and motion planning system 172.

Based on the one or more driving goals and corresponding discrete decisions 201, the path and motion planning layer 210 is responsible for determining the reference trajectory 105 that is provided to the vehicle controller layer 220. In some embodiments of the present disclosure, the reference trajectory 105 is a safe, desirable, and dynamically feasible trajectory that the vehicle 153 should follow. The reference trajectory 105 may be determined based on the outputs from the sensing and mapping module and the system 120. Some embodiments are based on the realization that an important requirement for the reference trajectory 105 computed by the path and motion planning layer 210 is that the reference trajectory 105 is collision free, dynamically feasible, and possible to be tracked by the predictive controller 110 in the vehicle controller layer 220. This means that the reference trajectory 105 achieves or reaches one or more target goals while avoiding any collisions with objects in the environment and respecting the dynamic system model 107 of the controlled system 120 that can be represented by a set of mathematical equations.

Some embodiments of the present disclosure are based on the realization that a typical limiting factor in path and motion planning task is the non-convex nature of constrained dynamic optimization problem. This results in achieving only a locally optimal solution, which may be significantly far from the globally optimal one. In some cases, solving the optimization problem may utilize a very large computational load and time, to find just a feasible solution. According to some embodiments, path and motion planning may be performed, for example, using sampling-based methods such as rapidly exploring random trees (RRTs), or graph-search methods such as A*, D* and other variations.

As illustrated in FIG. 2, the vehicle controller layer 220 aims to realize the reference trajectory 105, considering the dynamic system model 107 and constraints 109, by computing a control signal or control input 111 for operating the system 120. The control input 111 may include one or more actuation commands such as values for, for example, steering angle, wheel torque and brake force. In some embodiments of the present disclosure, the vehicle controller layer 220 provides the control input 111 to an additional layer that consists of one or more controllers in the actuator controller layer 230. The actuator controller layer 230 directly regulates the actuators to achieve a desired movement of the vehicle 153.

Different embodiments of the present disclosure may use different techniques in the vehicle controller layer 220 to track the reference trajectory 105 that is computed by the path and motion planning layer 210. In some embodiments of the disclosure, a model predictive controller (MPC) is used in the vehicle controller layer 220, such that future information in the long-term reference trajectory 105 computed by the path and motion planning layer 210 can be used effectively to achieve the desired movement or operation of the vehicle 153.

In some embodiments of the present disclosure, linear model predictive controller (LMPC) may be used in the vehicle controller layer 220. The LMPC may be a resultant of a linear dynamic system model 107 used in combination with linear constraints 109 and a quadratic objective function, to track the reference trajectory 105 that is computed by the path and motion planning layer 210. In other embodiments of the present disclosure, one or more of the constraints 109 and/or objective functions may be non-linear and/or the dynamic system model 107 equations that describe vehicle state behavior may be non-linear, resulting in a non-linear model predictive controller (NMPC) to track the reference trajectory 105 that is computed by the path and motion planning layer 210.

Some embodiments of the present disclosure are based on the realization that the path and motion planning layer 210 may compute a relatively long-term, highly predictive motion plan, but it typically needs to run at a relatively slow sampling frequency. In some embodiments of the present disclosure, the path and motion planning layer 210 is executed once for each desired sequence of one or more motion commands. For example, the path and motion planning layer 210 may be executed for automated hitching maneuver as illustrated in FIG. 1B. In some embodiments of the invention, the path and motion planning layer 210 may be executed multiple times for each desired sequence of one or more motion commands for performing the automated hitching maneuver, e.g., to allow for re-planning when the surrounding environment of the vehicle 153 has changed substantially.

Some embodiments of the present disclosure are based on the realization that the predictive vehicle controller layer 220 may track the reference trajectory 105 by computing a control input 111 over a relatively short prediction horizon, while running at a relatively high sampling frequency. For example, the vehicle controller layer 220 may use a prediction horizon of 1-10 seconds while it can be executed 10-100 times per second. The vehicle controller layer 220 may be highly reactive to local deviations due to uncertainties, for example, related to obstacles, in the surrounding environment of the vehicle 153, in the vehicle state estimation as well as other uncertainties in the sensing and mapping module.

In some embodiments of the present disclosure, a different dynamic vehicle model may be used in different components in the multi-layer path and motion planning system 172 for controlling movement of an autonomous or semi-autonomous vehicle. For example, a relatively simple but computationally cheap kinematic model may be used in the path and motion planning layer 210, while a relatively accurate but computationally more expensive dynamic single- or double-track vehicle model can be used in the vehicle controller layer 220.

As illustrated in FIG. 2, information may be shared between the different components in the multi-layer path and motion planning system 172 for an autonomous or semi-autonomous control of the vehicle 153. For example, information 205 related to the map and the vehicle surroundings may be shared between the decision layer 200 and the path and motion planning layer 210. Further, the information 215 related to the map and the vehicle surroundings may be shared between the path and motion planning layer 210 and the vehicle controller layer 220. Information 225 may be shared between the vehicle controller layer 220 and the actuator controller layer 230. In addition, some embodiments of the present disclosure are based on the realization that reliability and safety in control of the vehicle 153 may be improved by using diagnostic information such as, e.g., a performance metric of success and/or failure of the algorithm in one component that may be shared with components of the multi-layer path and motion planning system 172.

In one embodiment, a two-stage approach may be used at the path and motion planning layer 210 to construct two trees, each of which is rooted at an initial location (or source location) and a target location. A tree may be composed of a set of nodes indicating states and a set of edges. Herein, any node or edge of the trees may include location and heading information of the vehicle 153. The set of nodes and the set of edges may be collision-free and represent a kinematically or dynamically feasible transition between states. Moreover, the set of nodes and the set of edges may represent all possible states where the vehicle 153 does not overlap any obstacles in the environment.

The motion planner 108 is configured to generate a path, based on which the reference trajectory 105 is generated. A manner in which the motion planner 108 computes the path for controlling the movement of the vehicle 153 for performing a task is described in detail hereinafter.

Figure 3A:
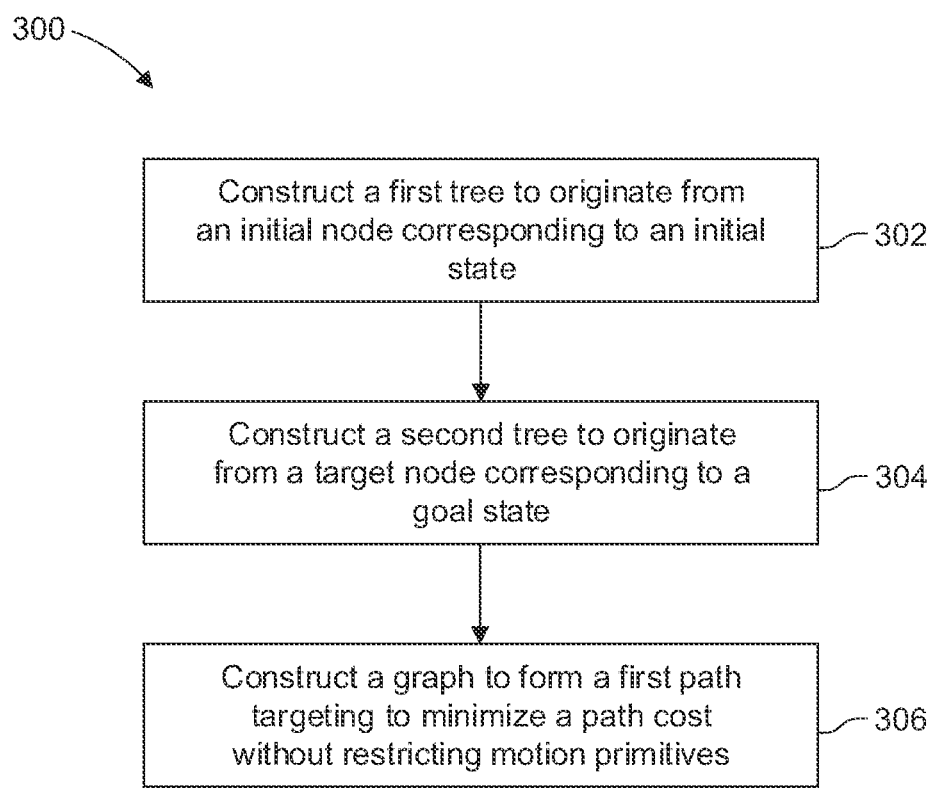
FIG. 3A illustrates an example method for generating a first path for controlling motion of the vehicle, in accordance with some embodiments of the present disclosure.

FIG. 3A illustrates an example method 300 for generating a first path for controlling motion of the vehicle 153, in accordance with some embodiments of the present disclosure. In an example, the motion of the vehicle 153 may correspond to a hitching maneuver from an initial state till a target state. For example, with regard to the environment disclosed in FIG. 1B, the initial state 157 may correspond to a starting pose of the vehicle 153 and the target state 158 corresponds to a location of the vehicle 153 corresponding to hitching operation.

It may be noted that the vehicle 153 is equipped with the ability to interact with the environment and receive sensor data corresponding to state of the vehicle and surrounding environment. The vehicle 153 is configured with the path and motion planning system 172 for controlling movement of the vehicle 153 in automated manner. For example, the path and motion planning system 172 may include one or more components to determine the first path for the vehicle 153 and further control movement of the vehicle 153 in order to perform certain operation. Pursuant to embodiments of the present disclosure, the vehicle 153 operation may correspond to a hitching maneuver. For example, the path and motion planning system 172 may provide a set of motion commands to control the motion of the vehicle 153, based on the first path. In an example, the path and motion planning system 172 may utilize a BIAGT algorithm to generate the path for the vehicle 153, to cause the vehicle 153 to perform the hitching maneuver. The method 300 describes use of the BIAGT algorithm to generate the path, to perform the hitching maneuver in an effective and efficient manner.

In an example, the motion planner 108 of the path and motion planning system 172 may perform the steps of method 300 to generate the path and reference trajectory 105.

As may be understood, a bi-directional A-search guided tree (BIAGT) path and motion planning algorithm is a variant of A*-based algorithms. The BIAGT algorithm may be capable of efficiently computing kinematically feasible solutions for automated vehicle parking tasks. Pursuant to embodiments of present disclosure, the hitching maneuver described may be considered as a special parking task with very stringent requirements on terminal phase of the maneuver in terms of lateral position error and heading angle error.

The BIAGT algorithm improves the hybrid A* algorithm in two aspects. Given a configuration space P of the set of vehicle poses, including position and heading, the BIAGT algorithm prioritizes control actions at each node to balance optimality of a computed path and computational efficiency. Moreover, the BIAGT algorithm simultaneously expands two trees or sub-graphs, i.e., a first tree (also referred to as, an initial tree) from the initial node towards the goal node, and a second tree (also referred to as, a goal tree) from a hitching point at the trailer 154 corresponding to the goal node towards the initial node. In particularly, each of the first tree and the second tree leverages an arrival cost of the other tree or the other sub-graph to estimate cost-to-go for its own nodes. Once a feasible path is found, BIAGT may execute a motion planning step to determine a velocity profile along the feasible path, and outputs a motion plan.

In an example, a tree of the graph may be defined as a union of a set of nodes and a set of edges. In this regard, the tree $T=(v, \varepsilon)$, where $v \subset P_{free}$ and $E(X_i, X_j) \in \varepsilon$. To this end, the E $(X_i, X_j)$ denotes a feasible and collision-free trajectory between state values $X_i$ and $X_j$. Moreover, $P_{free}$ is implicitly obtained by checking collisions with static obstacles, such as the obstacles 158a and 158b, in the environment. It may be assumed that M denotes a finite set of motion primitives pre-computed from available control actions, and $V_{max}$ denotes a maximum number of nodes allowed in the tree of the graph.

According to some embodiments of the present disclosure, to enhance the performance of the BIAGT algorithm for path and motion planning in automated hitching maneuver, and to improve the performance of the predictive vehicle controller 110 for tracking a resulting reference trajectory, tailored modifications are done to generate a first path, using the BIAGT algorithm.

Continuing with present example, at 302, a first tree is constructed to originate from an initial node corresponding to the initial state 157. The first tree may have a first set of nodes originating from the initial state 157. In an example, the BIAGT algorithm constructs the first tree (also referred to as, a start tree) $T_s$ rooted at $X_0$.

At 304, a second tree is constructed from the target node corresponding to the goal state 156. The second tree may have a second set of nodes originating from the goal state 156. In an example, the second tree (also referred to as, a goal tree) $T_g$ is rooted at $X_f$.

At 306, a graph is constructed to form the first path. According to some embodiments, the graph for the first path may target to minimize a path cost without restricting motion primitives for travelling from the initial state 157 to the target state 156. In this regard, the path and motion planning system 172 may utilize the motion planner 108 corresponding to the path and motion planning layer 210 to generate the first path.

Figure 3B:
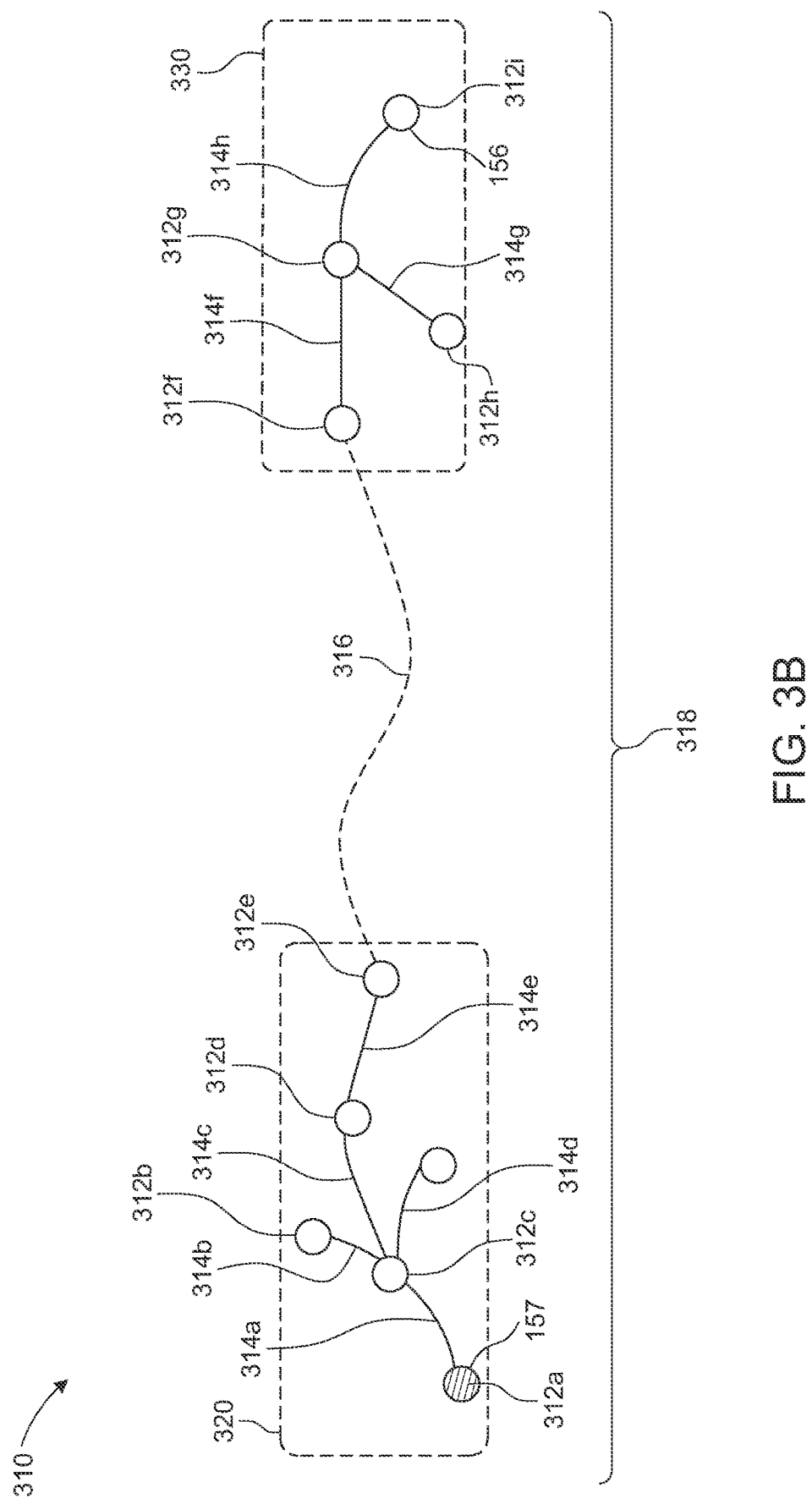
FIG. 3B illustrates an example graph structure for forming the first path, in accordance with some embodiments of the present disclosure.

FIG. 3B illustrates an example graph structure 310 for forming the first path, in accordance with some embodiments. In accordance with some embodiments, the graph structure 310 may have multiple nodes (depicted as nodes 312a-312i) defining states, such as the states $X_i$ and $X_j$, of the vehicle 153. The multiple nodes 312a-312i of the graph 310 may include an initial node 312a defining the initial state $X_0$ 157 of the vehicle 153 and a target node 312i defining the target state $X_f$ 156 of the vehicle 153.

The target state $X_f$ 156 may correspond to the hitching point. As may be understood, each pair of the nodes 312a-312i in the graph 310 is connected with an edge (depicted as edges 314a-314h) defined by one or a combination of collision-free motion primitives for moving the vehicle 153 between the corresponding states of the connected nodes. In addition, each node 312a-312i may include a number of motion cusps, representing the number of motion cusps in the path from either 312a or 312i to the particular node. For example, the multiple nodes 312a-312i connected through the corresponding edges 314a-314h may be used to generate the first path through the graph 310 connecting the initial node 312a with the target node 312i by a sequence of motion primitives for moving the vehicle 153 from the initial state 157 to the target state or the goal or target state 156.

In an example, the graph 310 may be constructed by iteratively expanding a node from the multiple nodes 312a-312i to create a new node or by connecting two existing nodes from the multiple nodes 312a-312i. The new node and the expanded node or the two existing nodes may be connected with a corresponding edge that denotes collision free motion primitives for moving the vehicle 153.

In particular, to construct the graph 310, the BIAGT algorithm may be employed by the motion planer 108. The BIAGT algorithm may connect two nodes corresponding to states of the vehicle 153. For example, the two states of the vehicle may be denoted as $X_i$ and $X_j$. Subsequently, the two states $X_i$ and $X_j$ may be connected by an edge indicative of collision-free motion primitives. For example, the two states $X_i$ and $X_j$ may be connected using a collision-free connecting path with one of forty-eight Reeds-Shepp (RS) patterns. In an example, the connecting path may be selected from the forty eight RS patterns without any constraint on a number of motion cusps in the connecting path. The forty-eight Reeds-Shepp (RS) patterns is described in detail in conjunction with FIG. 5B.

The BIAGT algorithm may cause expansion of each of the first tree 320 and the second tree 330, simultaneously, i.e., states in each of the first tree 320 and the second tree 330. In an example, the expansion of the first tree 320 and the second tree 330 may be based on a cost function F (•) that sums a heuristic value h (•) and arrival cost g (•). In an example, the heuristics in the BIAGT algorithm are calculated based on the Reeds-Shepp (RS) path length towards corresponding goal of the first tree 320 and the second tree 330, while ignoring the obstacles 158a and 158b. If either of the first tree 320 or the second tree 330 gets close to the corresponding goal or a distance between the two trees 320 and 330 is smaller than or equal to a threshold $\epsilon$, then BIAGT may connect the two trees 320 and 330 with a dynamically feasible edge 316. If the connection succeeds, all parents of the connected nodes of a tree are added to other tree resulting in a feasible first path 318. In an example, the first tree 320 may be connected with the second tree 330 using a collision-free dynamically feasible edge 316 with one of forty-eight RS patterns to form the first path 318. For example, the first path 318 may be a resultant path formed by nodes 312a, 312c, 312d, 312e, 312f, 312g and 312i, and corresponding edges 314a, 314c, 314e, 316, 314f and 314h.

To this end, owing to no constraint associated with the number of motion cusps while generating the first path 318, any one of the forty-eight RS patterns may be used for connecting different states or nodes of the trees 320 and 330 to form the graph 310.

However, the BIAGT algorithm is modified to generate a second path, based on the first path 318. In this regard, the second path is generated based on a hard constraint associated with the number of motion cusps that are allowed in a connecting path between two states. In such a case, the connecting path of motion primitives between two states for generating the second path may have minimum number of motion cusps. In accordance with some embodiments, motion primitives between the two states $X_i$ and $X_j$ may represent the construction of the shortest distance path in one of the eight cusp-free RS patterns from the forty-eight RS patterns. Such embodiment associated with the generation of the second path is explained in detail in conjunction with following FIG. 4A, FIG. 4B, FIG. 4C and FIG. 4D. In some embodiments, motion primitives to be applied at a state $X_i$ shall not introduce additional cusps, that is, the velocity of motion primitives to be applied at $X_i$ should be the same as that of the motion primitive reaching $X_i$ from its parent.

When the generation of the first path 318 is successful, the path and motion planning system 172, specifically, the motion planner 108 may generate the first path 318 without restricting motion primitives corresponding to movement of the vehicle 153. The first path 318 may have minimized cost associated therewith. However, if a total number of nodes 312a-312i on both the trees 320 and 330, i.e., the forward tree 320 and the backward tree 330, reaches $V_{max}$ and a solution trajectory, i.e., the first path, has not been found, the path planning fails. For example, if the path planning fails, the generation of the first path may be re-started, or the control of the vehicle 153 may be transferred for manual maneuvering.

Based on the generated first path 318, the modified BIAGT algorithm employed by the motion planner 108 may improve the performance of the predictive controller 110 for tracking the reference trajectory 105 of the vehicle 153, and for enabling successful hitching maneuver. A manner in which the modified BIAGT algorithm is used by the motion planner 108 for controlling the movement of the vehicle 153 for performing the hitching maneuver in an efficient manner is defined in detail hereinafter.

Figure 4A:
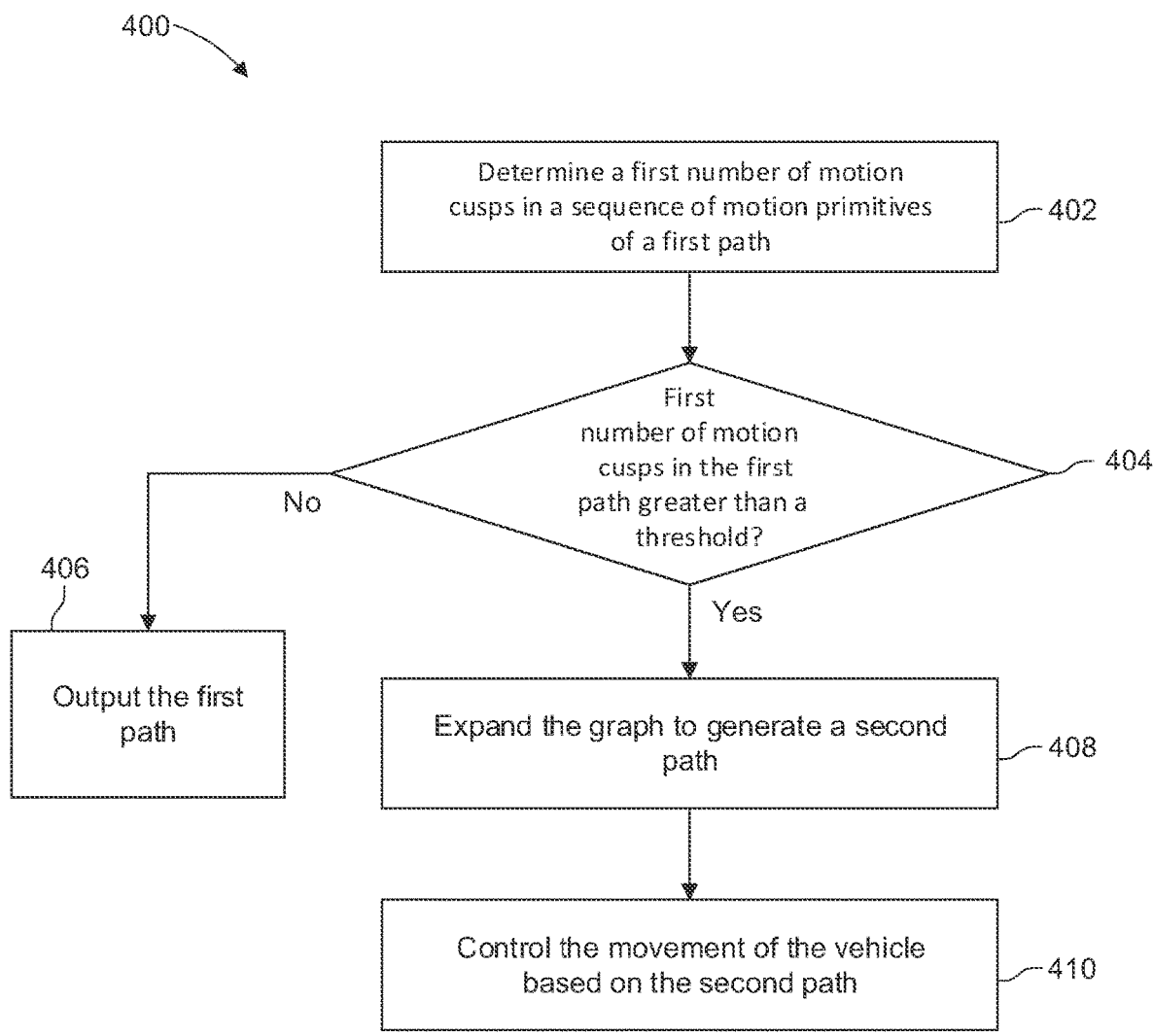
FIG. 4A shows an example method for controlling motion of the vehicle based on a second path, in accordance with some embodiments of the present disclosure.

FIG. 4A shows an example method 400 for controlling motion of the vehicle 153 based on a second path, in accordance with some embodiments of the present disclosure. For example, the motion of the vehicle 153 may correspond to a hitching maneuver from the initial state 157 till the target state 156. In an example, the steps of the method 400 may be performed after generation of the first path 318, as described in FIG. 3B.

According to some embodiments, path and motion planning for automated hitching maneuver is described herein. In this regard, to improve the performance of the predictive controller 110 for tracking the resulting reference trajectory 105, the BIAGT algorithm is modified. The modified BIAGT algorithm is configured to continue expanding the graph 310, even after the generation of the first path 318, to generate the second path, if the first path does not meet the criteria on path quality, for example the number of motion cusps of the first path exceeds a threshold. It may be noted that the second path is also constructed by simultaneous expansion of two trees, namely the first tree 320 from the initial node 312a and the second tree 330 from the goal or target node 312i. A manner in which the second path is constructed is described in present method 400.

At 402, a first number of motion cusps in the sequence of motion primitives of the first path 318 may be determined. In particular, a motion cusp from the first number of motion cusps indicates a switching between a forward motion and a backward motion in the sequence of motion primitives. As used herein, a motion cusp switches from a forward motion to a backward motion or switches from the backward motion to the forward motion in the sequence of motion primitives defining the first path 318.

Conventional motion planners typically seek for a shortest path and thus give a path, such as the first path 318, having unnecessary motion cusps. This is largely due to the fact that a cost-to-go used to guide the tree construction fails to take the number of motion cusps into account. Such motion cusps may compromise positioning accuracy of the integrated path and motion planning system 172. The motion cusps necessitates the motion of the vehicle 153 with zero and near-zero velocity and such motion is problematic for the accuracy of the path and motion planning system 172 due to the dominance of inertia of the vehicle 153 over its dynamic behavior. Hence, each motion cusp in a path of the vehicle 153 amplifies the impact of uncertainty that accumulates with the number of motion cusps creating an accuracy problem.

To overcome the problems associated with the number of motion cusps, on determining the first number of motion cusps in the first path 318 to be greater than a threshold at 404, the motion planner 108 is configured to keep on expanding the graph 310 of the first path 318 whiling taking the number of motion cusps into account. In particular, on comparing the first number of motion cusps with the threshold and determining that the first number of motion cusps is greater than the threshold, the motion planner 108 may keep on expanding the graph 310 to add more new nodes. The threshold is defined as a maximum number of allowed motion cusps in a path. For example, if the first number of motion cusps in the first path is less than the threshold, then the vehicle 153 may be able to follow the reference trajectory 105 based on the first path 318 with greater accuracy. However, if the first number of motion cusps in the first path is greater than the threshold, a large amount of uncertainty may be added at each of the motion cusps that may hamper accuracy of path planning and may prevent the vehicle 153 form travelling along the reference trajectory 105 based on the first path 318.

For example, the threshold associated with the number of cusps may be user-selectable or dynamically defined based on the first path 318, for example, length of the first path 318.

Continuing further, if the first number of motion cusps in the first path 318 is less than the threshold, the motion planner 108 may output the first path, at 406, for controlling motion of the vehicle 153 according to the first path 318. In this regard, the reference trajectory 105 may be generated based on the first path 318.

Continuing further, at 408, the motion planner 108 further expands the graph 310 to generate a second path. In particular, the graph 310 is expanded to add new nodes in the graph 310 until a termination condition is met. Such expansion of the graph 310 is subjected to a hard constraint associated with a total number of motion cusps in the graph 310 or path. The graph 310 is further expanded to form the second path connecting the initial node 157 or 312a with the target node 156 or 312i. The second path may have a second number of motion cusps that is less than the first number of motion cusps in the first path 318.

In accordance with an example, the motion planner 108 may perform the expansion of the graph 310 until the termination condition is met. The path and motion planning system 172 may then control the movement of the vehicle 153 based on the second path, when the second path is formed before the termination condition is met. However, if the second path is not generated before the termination condition is met, the method may go back to 406, to output the first path 318 for controlling the movement of the vehicle 153.

At 410, the path and motion planning system 172 is configured to control the movement of the vehicle 153 based on the second path. In particular, if the second path is generated before the termination condition is met, and the second path has a reduced number of motion cusps as compared to the first path 318, then the motion planner 105 may generate the reference trajectory 105 based on the second path. Subsequently, the path and motion planning system 172 may use the second path for controlling movement of the vehicle 153, for example, during the hitching maneuver. In an example, the termination condition may be time-based. For example, the termination condition may indicate an expiration of a pre-defined time period or time limit for generation of the second path. In an example, the time period or time limit of the termination condition may be in a range of 10 seconds to 30 seconds. For example, when the time period of 30 seconds is expired, then the termination condition is met. In another example, the time period of the termination condition may be in a range of 30 seconds to 60 seconds.

In accordance with some embodiments, the generation of the second path may be initialized based on search for new nodes, wherein node selection is based on penalizing a change of velocity direction in calculating an arrival cost associated with a node. However, in order to balance the completeness, computational efficiency, and path quality, such penalizing method may substantially increase a time of generation of the second path. Therefore, pursuant to present embodiments, the second path is generated based on the first path 318. The second path is constructed using the modified BIAGT algorithm.

Figure 4B:
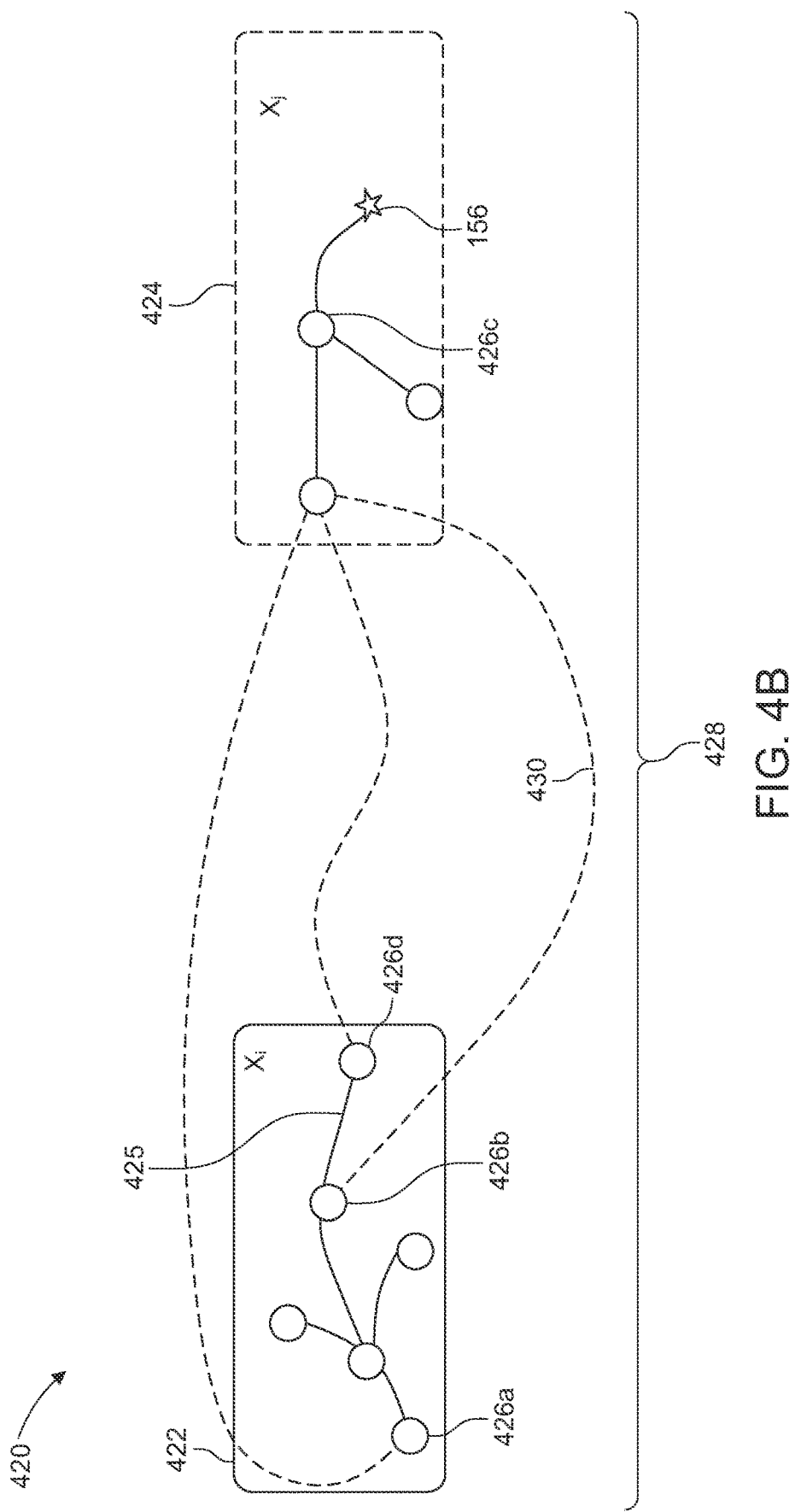
FIG. 4B illustrates an example graph structure 420 for forming a second path, in accordance with some embodiments of the present disclosure.

FIG. 4B illustrates an example graph structure 420 for forming a second path, in accordance with some embodiments. The second path may be generated for accurate control of the movement of the vehicle 153. In an example, the movement of the vehicle 153 may correspond to a hitching maneuver from the initial state 157 till the target state 156. Although the embodiments of the present disclosure describe controlling movement of the vehicle 153 during the hitching maneuver, however, this should not be construed as a limitation. In other embodiments of the present disclosure, the path and motion planning system 172 may use the second path having reduced number of motion cusps during other type of maneuvering, such as docking, parking, and so forth.

In order to construct the second path, the motion planner 108 may utilize the modified BIAGT algorithm. The motion planner 108, using the modified BIAGT algorithm, may construct the graph 420.

The graph comprises of two trees, depicted as a first tree or the start tree 422 and the second tree or the goal tree 424. The start tree 422 is rooted at an initial state $X_0$ or 157. The first tree 422 is constructed to originate from an initial node 426a corresponding to the initial state 157. In an example, the motion planner 108 uses modified BIAGT algorithm to construct the start tree 422 $T_s$.

For example, the construction of the start tree 422 begins with adding the initial state 157 as a root node or the initial node 426a. The root node or initial node 426a of the start tree 422 may be pushed into a priority queue, and the target state 156 may be added as a goal node of the start tree 422. The construction of the start tree 422 comprises of selecting a best node, such as a node 426b with lowest cost for moving towards the goal node, i.e., the target or goal state 156. The construction of the start tree 422 further comprises expanding the best node by applying motion primitives, which grows the start tree 422 by adding collision-free child nodes and collision-free edges, each of which connects the best node 426b to one or more corresponding child nodes. A node is removed from the priority queue if all possible motion primitives of a particular type that gives a collision-free child node within the start tree have been applied for the node.

Thereafter, a root node 426c of the second tree 330 is initialized at a distance from the target state 156. In other words, instead of starting the second tree 330 or the goal tree exactly from hitching point corresponding to the target state $X_f$ or 156, the root node 426c of the second tree 330 is placed at a user-defined distance from the hitching point in a preferred hitching direction away from the target state $X_f$ at the trailer. In an example, the distance between a location of positioning of the root node 426c for the second tree 330 and a node corresponding to the target state 156 or $X_f$ may be 1 meter, 5 meters, 10 meters, 20 meters, and so forth. In particular, the hitching point or the target state 156 may be connected with the root node 426c of the second tree 330 with a straight line. In other words, the root node 426c is connected to the node corresponding to the target state 156 with an edge defining a straight motion. This ensures that the BIAGT algorithm computes a motion plan or the second path that ends with a straight line segment before the vehicle 153 arrives in the neighborhood of the hitching point. This may prevent any damage to the accuracy of the hitching mechanism and ensures that stringent requirements of the hitching maneuver are met. In this manner, a motion cusp-free movement is ensured, at least from the root node 426c of the second tree 330 to the target state 156, i.e., from an area in a neighborhood of the hitching point to the hitching point.

Once the start tree or first tree 422 and the target tree or second tree 424 are initialized, a search for the second path is initiated. Some embodiments are based on the recognition that a path quality, such as the number of motion cusps, may be an important factor for accuracy of the hitching maneuver. Thus, the BIAGT algorithm is modified to search and generate the second path, specifically, new nodes for the second path, such that the second path is formed with a minimum number of motion cusps.

As may be understood, the first path 318 generated during a first stage, as described in FIG. 3A and FIG. 3B, ensures feasibility by executing the BIAGT algorithm to find the first path 318 as quickly as possible. Further, during a second stage, the path quality of the first path 318 is improved by imposing a desired maximum number of motion cusps as a hard constraint during node selection.

According to some embodiments, a node with a lowest cost is selected from the priority queue. For example, the node 426c may be selected as an expandable node 426c from at least one of: first set of nodes of the first tree 422, or second set of nodes of the second tree 424, based on a cost associated with the expandable node 426. During the second stage for generating the second path, the selection of the expandable node 426c for the expansion of the graph 420 is subjected to a constraint associated with a total number of motion cusps.

In an example, an expandable node in the first tree 422 and/or the second tree 424 is identified, based on corresponding cost. Further, the expandable node is expanded by applying motion primitives and adding child nodes to it. Such addition of child nodes is based on a determination whether the child nodes introduce a number of motion cusps in the corresponding tree 422 or 424 and/or an associated path greater than a specified maximum number of motion cusps. In particular, for any node in the priority queue, when expanding the graph 420, if a segment between the node and a root node of the corresponding tree 422 or 424 contains more motion cusps than the allowed maximum number of motion cusps, such node will be removed from the priority queue without further expansion. For example, such addition of new nodes for the path quality improvement keeps running until either a termination condition is met or the second path 428 having minimum number of motion cusps is found. For example, the termination condition may be set based of a time constraint. Once the first tree 422 and/or the second tree 424 is expanded based on new nodes and/or previous nodes, the two trees 422 and 424 may be connected using a collision-free connecting path with one of eight cusp-free RS patterns from the forty-eight RS patterns to form the second path 428. In particular, the eight RS patterns are cusp-free path patterns.

The expansion of the start tree 422 and/or the target tree 424 may be performed by selecting a node having lowest cost associated therewith. Further, child nodes for the selected node may have to be determined. In an example, the child nodes may be determined such that the child nodes may have less cost as compared to cost of the selected node. Further, the node and corresponding child node may be connected using a type of collision-free motion primitives, such as motion primitives 425. The motion primitives 425 may be applied at 426b to give a collision-free child node, such as node 426d.

In an example, for the start tree 422, a cost of the node 426b may be calculated as a sum of an arrival cost and an estimated cost-to-go, where the arrival cost represents a cost of driving the vehicle 153 from the initial state 157 or the initial node 426a to the node 426b, and the estimated cost-to-go represents an estimated cost of driving the vehicle 153 from the target state 156 or the root node 426c. The arrival cost is known, whereas the cost-to-go is unknown and thus has to be estimated.

In an example, the graph 420 may be expanded by adding a child node 426d connected to the expandable node 426b with an edge defined by a collision-free motion primitive 425. The cost of the child node 426d is a minimum cost for reaching the corresponding goal node of the tree 422 from the initial node 426a (or corresponding root node) till the child node 426d. For example, the cost of the child node 426d may include a first cost of an initial path formed by the start tree 422 through the first set of nodes, a second cost of a target path formed by the target tree 424 through the second set of nodes, and a third cost of a connecting path between the first set of nodes and the second set of nodes.

In a similar manner, the goal tree 424 may also be expanded. Once the start tree 422 and the goal tree 424 are in close vicinity, i.e., a distance between them is less than a predefined threshold, the goal tree 424 is connected with the start tree 422 to generate a path. The expansion of the start tree 422 and the target tree 424 may go on until a distance between the start tree 422 and the goal or target tree 424 is less than a threshold.

When the distance between the tree 422 and the goal or target tree 424 is less than the threshold, the two trees 422 and 424 may be connected using a different type of collision-free motion primitives 430. The motion primitives 430 are applied at 426b to connect both trees 422 and 424. Subsequently, the second path 428 is identified. For example, the second path 428 may include the nodes, such as the nodes 426a, 426b, and 426c; and edges, such as edge(s) between the nodes 426a and 426b, the edge based on the motion primitives 430, and other edges in the trees 422 and 424 that may be collision-free and feasible and have a smaller number of motion cusps.

For example, a number of connecting paths between the start tree 422 and the target tree 424 may exist (as depicted by dotted lines, from the node 426a, the node 426b and the node 426d). However, a connecting path between the start tree 422 and the target tree 424 may be selected based on, number of motion cusps, feasibility, etc.

Thereafter, the reference trajectory 105 is generated for controlling the movement of the vehicle 153, based on the second path 428. In particular, if the second path 428 is identified or generated before the termination condition is met; the reference trajectory 105 is generated based on the second path 428. Typically, the second path 428 may also include certain number of motion cusps, such as a second number of motion cusps wherein the second number of motion cusps is less than the first number of motion cusps associated with the first path 318. To this end, the reference trajectory 105 for the hitching maneuver, based on the second path 428, may include minimum number of motion cusps, i.e., switches between forward driving direction and backward driving direction.

In accordance with some embodiments, the motion planner 108 may generate the reference trajectory 105 for controlling the movement of the vehicle 153 along either the first path 318 or the second path 428. The reference trajectory 105 may be generated as a function of time. For example, the reference trajectory 105 may indicate a type or pattern of motion and a corresponding amount of time for which the pattern of motion is to be performed. Thereafter, the reference trajectory 105 may be provided to the predictive controller 110 that generates control inputs 111. The control inputs may include motion control commands, for example, value for steering angle, value for acceleration, etc., for controlling the actuators of the vehicle 153 to cause the vehicle to move and follow the reference trajectory 105.

In accordance with some embodiments, the generated reference trajectory 105 may include a pause at each motion cusp. In an example, the pause may be for 1 second, 2 seconds, 5 seconds, and so forth. In an example, the pause at the motion cusps may allow to accommodate a physical time for gear shifting. Moreover, the pause at the motion cusps may improve the tracking performance when the predictive controller 110 is used.

Figure 4C:
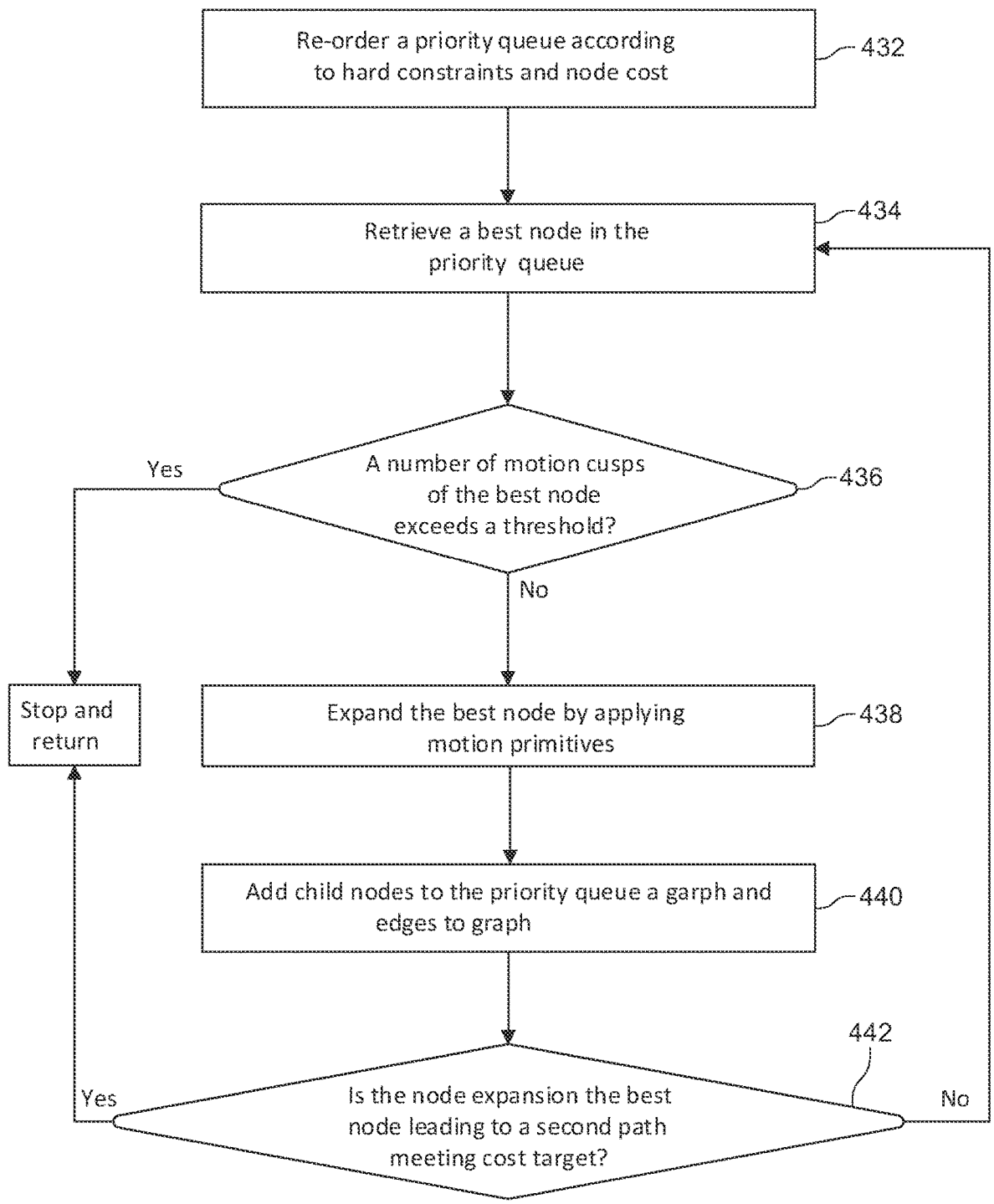
FIG. 4C illustrates an example method to perform the construction of the graph during a second stage, in accordance with some embodiments of the present disclosure.

FIG. 4C illustrates an example method to perform the construction of the graph 420 during a second stage, in accordance with some embodiments. During the second stage, the second path 428 may be generated, based on the first path 318.

At 432, a priority queue is re-ordered to consolidate hard constraints. In some embodiments, the hard constraint indicates a maximum number of motion cusps for a path from a root node to a first node of a tree 422 or 424. Since the number of motion cusps of each node is calculated and recorded in the first stage during generation of the first path 318, the nodes 312a-312i of the graph 310 corresponding to the first path 318 in the priority queue are re-ordered. Such re-ordering of the nodes 312a-312i is based on two keys, first, a number of motion cusps, and second, a node cost. In this regard, one or more nodes 312a-312i with lowest number of cusps have a highest priority to be selected (as nodes 426 for forming the second path 428) as compared to the nodes having a same number of cusps. For example a node with a lowest cost and lowest number of motion cusps gets the priority. In this manner, the priority queue is re-ordered by increasing priority of nodes having lowest number of cusps and cost.

Once the priority queue is re-ordered, at 434, a best node, such as the node 426b, is retrieved or selected. At 436, if the best node 426b contains a greater number of motion cusps than a threshold of maximum number of allowed motion cusps, it may be identified that there is no way to improve the quality of the first path 318. In such a case, the motion planner 108 returns the first path 318 as the best path. Otherwise, at 438, node expansion is performed for the best node 426b. The node expansion may be performed by applying motion primitives at the best node 426b.

At 440, child nodes and associated edges between the best node 426b and corresponding child nodes, if exist, are added to the tree 422. It may be noted that in the present example, the expansion of the first tree or the start tree 422 is described using the best node 426b. However, this should not be construed as a limitation. In other embodiments of the present disclosure, best node may be identified in the second tree or the target tree 424, for expansion of the target tree 424. Further, it may be noted that nodes (such as the nodes 426a, 426b, 426c and 426d) for generating the second path 428 may be selected from the nodes 312a-312i, or by new nodes added to the graph 310 for forming the graph 420 for the second path 428. In other words, the graph 310 associated with the first path 318 may be expanded and modified to form the graph 420 for identifying and generating the second path 428.

At 442, if the node expansion of the best node 426b leads to a new path, wherein the new path meets a cost target, the new path is used as output for generating the reference trajectory 105. In accordance with an example, the cost target is associated with a total number of cusps in the new path. For example, a number of motion cusps (referred to as a second number of motion cusps) of the new path is calculated. If the second number of motion cusps of the new path is less than the first number of motion cusps of the first path 318, the new path is updated as the first path 318. The updated first path is then used for calculating the reference trajectory 105. In such a case, another best node may be retrieved for further processing. However, if the second number of motion cusps of the new path is less than the threshold of maximum number of allowed motion cusps, then the new path is recorded as the second path 428. The second path 428 is then output for generating the reference trajectory 105 and controlling motion of the vehicle 153.

Figure 4D:
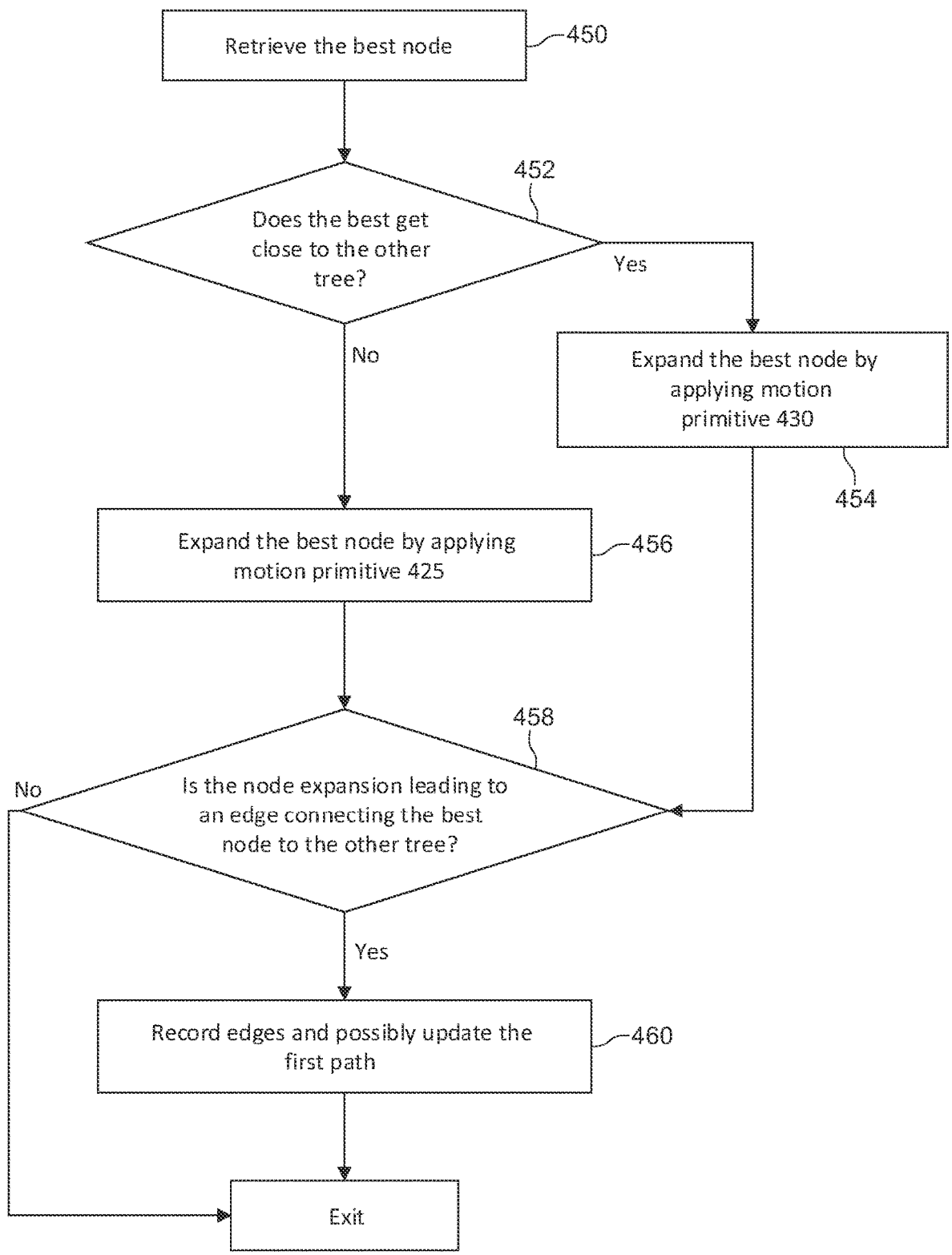
FIG. 4D illustrates an example method of node expansion, in accordance with some embodiments of the present disclosure.

FIG. 4D illustrates an example method of node expansion, in accordance with some embodiments. At 450, the best node 426b of the start tree 422 or the target tree 424 is retrieved. Given the best node 426b, at 452, a determination is made whether the best node 426b of a given tree is close to the other tree. If yes, at 454, motion primitives of a particular type, such as the motion primitives 430, may be used to try to connect the best node 426b with certain nodes on the other tree that is within a certain distance. Otherwise, at 456, motion primitives of other type, such as the motion primitives 425, may be applied to expand the best node 426b and add corresponding child node, depicted as node 426d.

At 458, a determination is made to check if the node expansion, at steps 454 or 456, due to motion primitives 430 or 425 has led to an edge connecting the best node 426b of the given tree to the other tree. If neither of the motion primitives 430 nor 425 lead to a new edge connecting both trees 422 and 424, the node expansion of the best node 426b is finished. Thereafter, another node, such as the child node 426d, may be selected for expansion, according to steps of the method described in FIG. 4A, FIG. 4B, FIG. 4C, and FIG. 4D. Otherwise, at 460, the new edge is recorded, and the path is updated using the new edge as new path. In this regard, if the new path generated using the new edge contains a smaller number of motion cusps than the first number of motion cusps of the first path 318, the new path will be updated as the first path. Alternatively, if the new path generated using the new edge contains a smaller number of motion cusps than the threshold of maximum number of allowed motion cusps, the new path may be recorded as the second path 428.

To this end, the continued expansion of the graph 310 is performed to reduce path cost. In particular, the continued expansion of the graph 310 is performed to satisfy a hard constraint associated with selection of nodes of the graph 420 by applying restrictive motion primitives. In an example, the motion primitives are restricted based on presence of motion cusps within edges associated with a node.

Figure 5A:
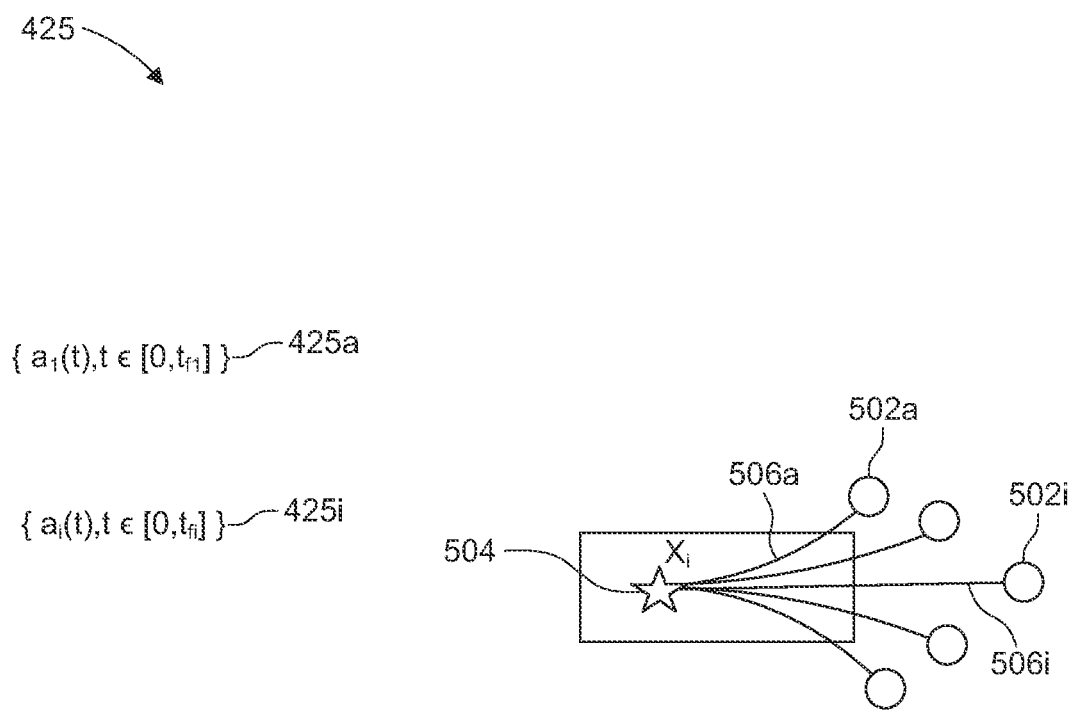
FIG. 5A illustrates an example of a type of motion primitives, in accordance with an embodiment of the present disclosure.

FIG. 5A illustrates an example of a type of motion primitives 425, in accordance with some embodiments. For example, the motion primitives 425 are applied to a node to give a collision-free child node. As may be understood, motion primitives are pre-computed motions that the vehicle 153 may perform. The motion primitives indicate motions which the vehicle 153 can smoothly transition into. For example, the motion primitives may be super-imposed on the graph at a node, such as the node 426b, to identify child node(s) thereof.

In an example, the motion primitives 425 may be applied to the initial node 426a to identify and connect the node 426a with its child nodes, using motion primitives 425a. Subsequently, each node from the trees 422 and 424 may be connected to its child node(s) using motion primitives 425i. The motion primitives 425i may be uniquely defined by a trajectory of control inputs over a finite time interval.

To this end, applying the motion primitives 425i at $X_i$, results in a connecting path ending at a state 502i. For example, the state 502i may correspond to a child node connected from corresponding parent node. If the state 502i and the corresponding connecting path 506i are collision-free, the state 502i may become a child node of its parent node, such as the node 504. In an example, the node 504 may have multiple child nodes. In one example, a state 502a may become child node of the node 504, when a path between the node 504 and the state 502a is collision-free, feasible and has less cost and number of motion cusps.

As may be understood, the construction of a tree, such as the start tree 422 or the target tree 424, comprises expanding a best node, such as the node 426b, by applying two types of motion primitives 425 and 430. The motion primitives 425 grows a tree by adding collision-free child nodes and collision-free edges. Each of the collision-free edges connect the best node to a child node.

In accordance with present example, the node 504 may be a best node of a tree, wherein the motion planner 108 may expand the tree using motion primitives 425a (defined by, $\{a_1(t), t \in [0, t_{r_1}]\}$), to 425i (defined by $\{a_i(t), t \in [0, t_{r_i}]\}$). The motion primitives 425a-425i add collision free edges 506a-506i. The edges 506a-506i may connect the node 504 with corresponding child nodes 502a-502i. According to some embodiments, the child nodes 502a-502i may be added to a path if number of motion cusps from a root of corresponding tree to the child node has a smaller number of motion cusps than a threshold of maximum number of allowed motion cusps. Moreover, the cost of the child node may be less than the cost of the parent node 504. Such a child node may be added to graph for generating the second path 428. A particular child node may be then selected as next best node for expansion.

In an example, a cost of the child node corresponding to the states 502a-502i may be calculated as a sum of an arrival cost and an estimated cost-to-go, where the arrival cost represents a cost of driving the vehicle 153 from initial state or root node of a tree to the child node, and the estimated cost-to-go represents an estimated cost of driving the vehicle 153 from a target state (for example, a state corresponding to hitching point) to the child node 520.

FIG. 5B illustrates an example of a type of motion primitives 430, in accordance with some embodiments. For example, the motion primitives 430 solve the shortest distance path between any two states, such as $X_i$ and $X_j$, and without considering obstacles. In an example, the motion primitives 430 are applied at a state $X_i$ of a tree, such as the start tree 422, to connect the start tree to another tree, such as the target tree 424. In particular, the motion primitives 430 are applied to connect the state $X_i$ of the start tree 422 with $X_j$ of the target tree if the states $X_i$ and $X_j$ are close to each other.

As may be understood, Reeds-Shepp established that there are at most forty-eight solutions to connect any two states and, and the forty-eight solutions admit the patterns shown in the table 510 in FIG. 5B. In this regard, 'L', 'S', and 'R' correspond to left turn, straight line, and right turn, respectively. The superscripts '+' and '−' of 'L', 'S' and 'R' mean forward and backward movements, respectively. The subscript indicates that the vehicle 153 has to follow a circle to achieve changes in the vehicle's heading angle. The line | represents a motion cusp. It may be noted that a motion cusp may indicate a change in a moving direction, i.e., forward motion to reverse motion, or reverse motion to forward motion. The motion primitives 430 between the two states $X_i$ and $X_j$ represent the construction of the shortest distance path according to one of the forty-eight patterns 430a.

The motion primitives 430 may not be pre-defined. Instead, only a pattern, or a structure, of a path is pre-defined. Pattern and structure are used interchangeably in this disclosure. During a first stage, nodes in a priority queue are ordered according to the costs of nodes to be selected for expansion. A node with lowest cost has the highest priority to be selected.

In another embodiment, the motion primitive 430 between the states represents the construction of the shortest distance path in one of the first eight cusp-free patterns 430b.

Different from motion primitives 425, motion primitives 430 are not pre-defined. Instead, only the pattern, or the structure, of a path (first path or the second path) is pre-defined. Pattern and structure are used interchangeably in this invention.

During the first stage for constructing the first path 318, the nodes in the priority queue are ordered according to the costs of nodes to be selected for expansion, where the cost may not characterize the number of motion cusps. The node with the lowest cost has the highest priority to be selected. During the second stage for constructing the second path 428, constraint associated with number of motion cusps in motion primitives of nodes is imposed for node selection.

Once a trajectory is generated based on the second path 428 having minimum number of motion cusps or the first path 318, a model predictive controller (MPC) 110 is used for accurately tracking the planned trajectory.

Figure 6A:
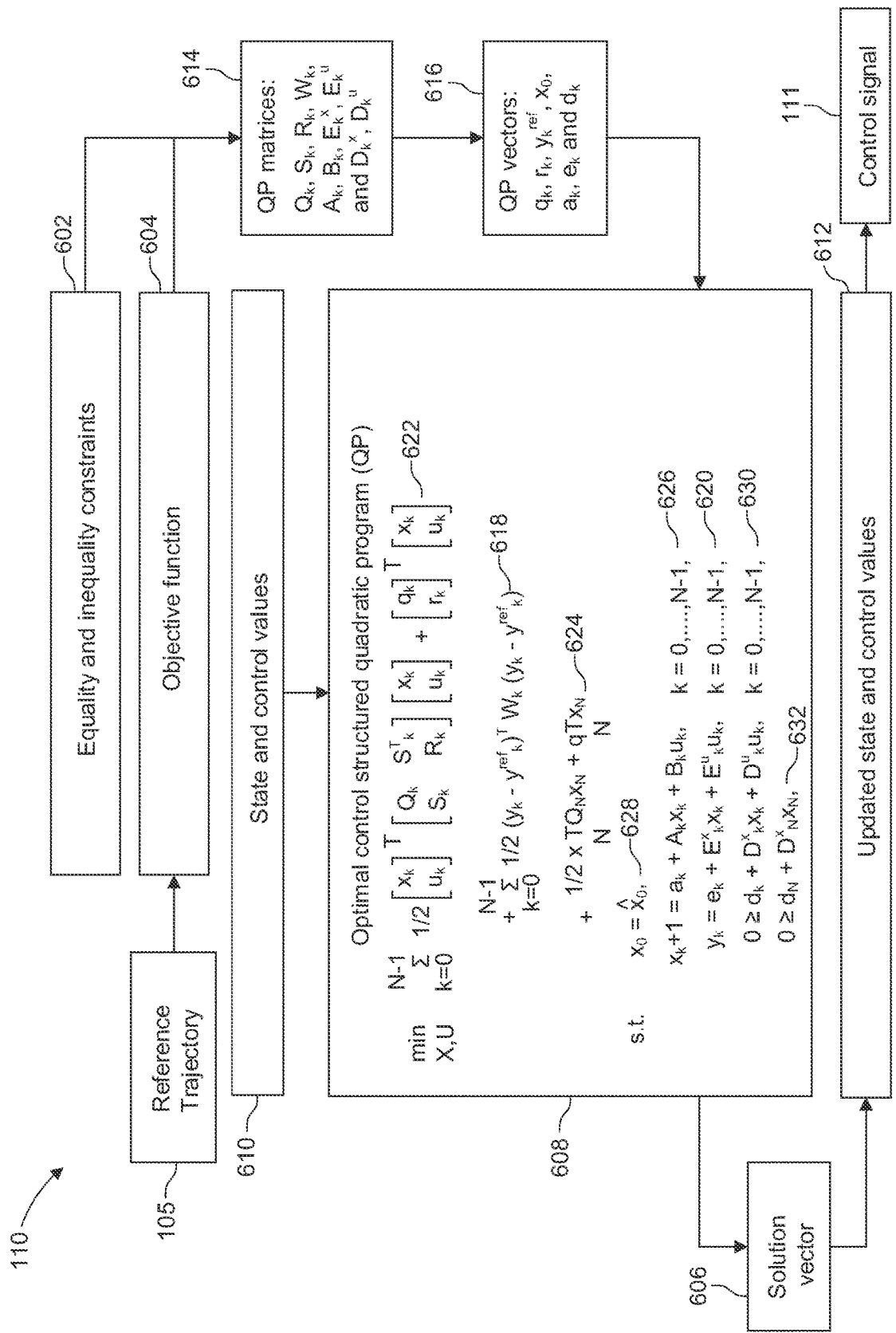
FIG. 6A shows an example block diagram for a linear predictive controller, in accordance with an embodiment of the present disclosure.

FIG. 6A shows an example block diagram for a model predictive controller (MPC) 110, in accordance with some embodiments. The predictive controller 110 is configured to compute the control signal 111, given the current state and the estimated state 121 of the system 120 and the reference trajectory 105. Specifically, the reference trajectory 105 may be determined based on the first path 318 or the second path 428, as a function of time thereof. The reference trajectory 105 for the movement of the vehicle 153 may be generated by adding a time dimension to the path 318 or 428. The motion planner 108 may be configured to implement the embodiments described in conjunction with the above FIG. 3A, FIG. 3B, FIG. 4A, FIG. 4B, FIG. 4C, FIG. 4D, FIG. 5A, and FIG. 5B, for generating the first path 318 or the second path 428 and the reference trajectory 105. In certain cases, the motion planner 108 within the control system 100 may generate the second path 428 with minimum number of motion cusps and generate the reference trajectory based on the second path 428. The predictive controller 110 of the control system 100 then receives the reference trajectory and tracks motion of the vehicle 153.

In an example, the predictive controller 110 may be configured to generate equality and inequality constraints 602 for controlling movement of the vehicle 153. For example, the equality and inequality constraints may indicate constraints in physical movement of vehicle corresponding to its surroundings. Further, the predictive controller 110 may be configured to generate an objective function 604 for the MPC predictive controller 110, using the reference trajectory 105 generated by the motion planner 108. In an example, the objective function 604 may indicate a start or initial state of the vehicle 153, goal or target state of the vehicle 153, and the reference trajectory to be followed. For example, during the hitching maneuver, the objective function 604 may indicate the initial state as current location of vehicle away from a hitching point and the goal state as the hitching point. For example, optimal control data of the objective function 604 and the equality and inequality constraints 602 may be used for solving an optimization problem. For example, based on a solution of the optimization problem, control signal 111 may be generated. In an example, a type of the optimization problem may depend on the dynamical system model 107 of the system 120, the system constraints 109, the estimated state 121 of the system 120 and the reference trajectory 105.

According to some embodiments, the predictive controller 110 may be configured to compute a control solution, for example, a solution vector 606, comprising a sequence of future optimal control inputs 111 over a prediction time horizon of the motion planner 108. The predictive controller 110 may be configured to compute the control solution 606 by solving the optimization problem, at each control time step. In accordance with present example, the optimization problem may have inequality constraints and may be in the form of an optimal control structured quadratic program 608.

In some embodiments, the solution of the inequality constrained optimization problem, i.e., the optimal control structured quadratic program (QP) 608 uses state and control values 610 over a prediction time horizon from a previous control time step, which may be read from a memory. In this manner, techniques for warm- or hot-starting of the optimization problem may be implemented. This may considerably reduce a required amount of computational effort of the predictive controller 110, in some embodiments. In a similar manner, the corresponding solution vector 606 generated by solving the optimal control structured QP 608 may be used to generate a sequence of optimal or suboptimal updated state and control values 612 for a next control time step.

According to some embodiments, the predictive controller 110 may compute the control inputs 111 for controlling and tracking the movement of the vehicle 153 by solving the optimal control structured quadratic program QP 608, given the estimated state 121 of the system 120 and the reference trajectory 105.

In some embodiments of the invention, the predictive controller 110 uses a linear-quadratic objective function 604 in combination with a linear dynamical system model 107 to predict a behavior of the vehicle 153 and linear inequality constraints. The prediction of the behavior of the vehicle and the linear inequality constraints may result in the formulation of the optimal control structured QP 608 problem that may be formulated as:

$$\min_{X,U} \sum_{k=0}^{N-1} \frac{1}{2} \begin{bmatrix} x_k \\ u_k \end{bmatrix}^T \begin{bmatrix} Q_k & S_k^T \\ S_k & R_k \end{bmatrix} \begin{bmatrix} x_k \\ u_k \end{bmatrix} + \begin{bmatrix} q_k \\ r_k \end{bmatrix}^T \begin{bmatrix} x_k \\ u_k \end{bmatrix} +$$

$$\sum \frac{1}{2}(y_k - y_k^{ref})^T W_k (y_k - y_k^{ref}) + \frac{1}{2} x_N^T Q_N x_N + q_N^T x_N,$$

such that $x_0 = \hat{x}_0$ $x_{k+1} = a_k + A_k x_k + B_k u_k, k=0, \ldots, N-1,$ $y_k = e_k + E_k^x x_k + E_k^u u_k, k=0, \ldots, N-1,$ $0 \geq d_k + D_k^x x_k + D_k^u u_k, k=0, \ldots, N-1,$ $0 \geq d_N + D_N^x x_N,$ where the prediction horizon of the linear predictive controller 110 is discretized in time, using a sequence of N equidistant or non-equidistant control time intervals. The control time intervals may be divided by a corresponding sequence of discrete time points $t_k$ for k=0, ..., N.

The optimization variables in the optimal control structured QP 608 consist of state variables $x_k$ and control input variables $u_k$ for k=0, ..., N. According to some embodiments of the present disclosure, the dimensions for the state and the control variables 610 may not need to be equal to each other for each discrete time point $t_k$, where k=0, ..., N. At each sampling time for the predictive controller 110, the optimal control structured QP 608 is formulated, using QP matrices 614 and QP vectors 616. Subsequently the optimal control structured QP 608 is solved in order to compute the solution vector 606. The solution vector 606 may be used to generate updated the state and the control values 612 that may be used in next iteration. Further, based on solving the optimal control structured QP 608 a new control input 111 is generated.

The objective function in the constrained optimal control structured QP that is solved by the predictive controller 110 includes one or more least squares reference tracking terms 618, which penalizes a difference between a sequence of predicted state and/or output values 620 and a sequence of reference state and/or output values for the reference trajectory 105 that is computed by the motion planner 108.

The output variables $y_k$ for k=0, ..., N, that are used in the reference tracking terms 618 may be defined as any linear function of state and/or control input variables 620. The reference tracking terms 618 may be defined by the weighting matrix $W_k$ 618 in the QP matrices 614 and the reference values $y_k^{ref}$ in the QP vectors 616. In some embodiments of the present disclosure, the weighting matrix is either positive definite $W_k > 0$ or positive semi-definite $W_k \geq 0$, i.e., all eigenvalues of the matrix $W_k$ are either larger than zero or all eigenvalues of the matrix $W_k$ are larger than or equal to zero.

For example, an output function may include, but are not limited to, longitudinal or lateral velocities and/or accelerations of the vehicle 153, a slip ratio or slip angle, angles of orientation or angular velocities, wheel speeds, forces, and torques.

In various embodiments, a penalty between the reference values corresponding to the reference trajectory 105 determined by the motion planner 108 and the values determined by the predictive controller 110 is weighted by the weighting matrix that assigns different weights to different state variables of the target states. Additionally or alternatively, some embodiments add additional reference tracking terms to be considered by the predictive controller 110. Such additional reference tracking terms may be related to, for example, driving comfort, speed limits, energy consumption, pollution, etc. These embodiments balance a cost of reference tracking with the additional reference tracking terms.

In accordance with an example, additional reference tracking terms for the MPC may be defined based on cost function in the form of a linear-quadratic stage cost 622 and/or a linear-quadratic terminal cost term or matrix 624. These additional linear-quadratic reference tracking terms, including the stage cost 622 and terminal cost matrix 624, may include a linear and/or quadratic penalization of one or more combinations of one or more state and/or control input variables. For example, the objective function in the constrained QP 608 may include a linear or quadratic penalization of longitudinal or lateral velocities and/or accelerations of the vehicle, a slip ratio or slip angle, angles of orientation or angular velocities, wheel speeds, forces, torques or any combination of such quantities. The linear-quadratic objective terms in the stage cost 622 and the terminal cost matrix 624 are defined by the matrices $Q_k$, $S_k$ and $R_k$ in the QP matrices 614 and the gradient values $q_k$, $r_k$ in the QP vectors 616.

In some embodiments of the present disclosure, a Hessian matrix (as used in the stage cost 622) is denoted as:

$$H_k = \begin{bmatrix} Q_k & S_k^T \\ S_k & R_k \end{bmatrix}$$

where the Hessian matrix is either a positive definite $H_k>0$ or positive semi-definite $H_k \geq 0$. In other words, all eigenvalues of the Hessian matrix $H_k$ are either larger than zero or all eigenvalues of the matrix $H_k$ are larger than or equal to zero.

The constrained optimal control structured QP 608 that is solved by the linear predictive controller 110 at the vehicle controller layer 220 (as shown in FIG. 2) defines a linear dynamic system model equations 626 that describes the state of the vehicle 153 at one time step $t_{k+1}$, given the state and control variables 610 at the previous time step $t_k$. The linear dynamical system model 626 is defined by a time-invariant or time-varying sequence of matrices $A_k$ and $B_k$ in the QP matrices 614 and vectors $a_k$ in the QP vectors 616, for k=0, . . . , N−1. Given the current estimated state $\hat{x}_0$ 121 in the equality constraint for the initial state value 628 and a sequence of control input values $u_k$, the linear dynamic system model equations 626 may be used to compute the state values $x_k$ for k=0, . . . , N.

In addition to the equality constraints, including the initial state value 628, the dynamic system model equations 626 and the control input variables or output equations 620, the constrained optimal control structured QP 608 may include one or more inequality constraints to impose physical limitations of the system 120, safety constraints and/or to impose desirable performance-related constraints on the behavior of the autonomous or semi-autonomous vehicle 153. More specifically, the QP 608 may include path inequality constraints 630 for k=0, . . . , N−1 and/or terminal inequality constraints 632 at the end of the prediction horizon. The inequality constraints are defined by a time-invariant or time-varying sequence of matrices $D_k^x$ and $D_k^u$ in the QP matrices 614 and vectors $d_k$ in the QP vectors 616 for k=0, . . . , N.

The inequality constraints may include constraints on, for example, longitudinal or lateral velocities, accelerations of the vehicle 153, the position and/or orientation of the vehicle 153 with respect to its surroundings, a slip ratio or slip angle, angles of orientation, angular velocities, wheel speeds, forces and/or torques. For example, obstacle avoidance constraints could be implemented in the predictive controller 110 by defining a set of one or more inequality constraints on a linear function of the predicted position, velocity, and orientation of the vehicle 153 with respect to the predicted position, and velocity and orientation of one or more obstacles 158a, 158b in the surrounding environment of the vehicle 153.

In this manner, the equality constraint, and the inequality constraints 602 and objective function 604, previous state and control values 610, QP matrices 614 and QP vectors 616 may be used in formulation and solving the QP 608. By solving the QP 608, the predictive controller 110 may generate the value of control inputs 111. For example, the values of control input may include values for, for example, longitudinal or lateral velocities of the vehicle 153, longitudinal or lateral accelerations of the vehicle 153, a slip ratio or slip angle for the vehicle 153, angles of orientation, angular velocities, wheel speeds, forces, and torques. Based on the values of the control inputs 111 corresponding to different functions, the vehicle 153 may be controlled to perform the hitching maneuver. For example, the control input 111 may be provided to the actuators of the vehicle 153 to control the movement of the vehicle based on the reference trajectory 105 corresponding to the first path 318 or the second path 428.

The predictive controller 110 may also provide the control inputs 111 to the system 120 for generating estimated state of the vehicle 153 for tracking the vehicle 153. The estimated state 121 of the system 120 provides state feedback to the predictive controller 110. For example, the predictive controller 110 tracks movement of the vehicle 153 to ensure if the vehicle 153 is travelling along the reference trajectory 105, and/or deviation in actual states of the vehicle 153 as compared to the reference trajectory 105.

Some embodiments of the present disclosure are based on the realization that the optimal control structured QP 608 is convex if the Hessian matrix $H_k$ in 622, the terminal cost matrix $Q_N$ 624 and the weighting matrix $W_k$ 618 are positive definite or positive semi-definite. Embodiments of the present disclosure may use an iterative optimization algorithm to solve the optimal control structured QP 608 to find the solution vector 606, which is either feasible with respect to the constraints and globally optimal, feasible but suboptimal or an algorithm may find a low-precision approximate control solution that is neither feasible nor optimal. As part of the predictive controller 110, the optimization algorithm may be implemented in hardware or as a software program executed in a processor.

Examples of iterative optimization algorithms for solving the QP 608 may include, but are not limited to, primal or dual gradient-based methods, projected or proximal gradient methods, forward-backward splitting methods, alternating direction method of multipliers, primal, dual, or primal-dual active-set methods, primal or primal-dual interior point methods or variants of such optimization algorithms. In some embodiments of the present disclosure, the block-sparse optimal control structure in the QP matrices 614 may be exploited in one or more of the linear algebra operations of the optimization algorithm in order to reduce the computational complexity, and therefore to reduce the execution time and memory footprint of the QP optimization algorithm.

Other embodiments of the disclosure can solve a non-convex optimal control structured QP 608 using optimization algorithms for non-linear programming such as, for example, sequential quadratic programming (SQP) or interior point methods (IPM). Subsequently, either a suboptimal, a locally optimal or globally optimal control solution may be found to the inequality constrained optimization problem at each sampling time of the MPC controller 110.

Figure 6B:
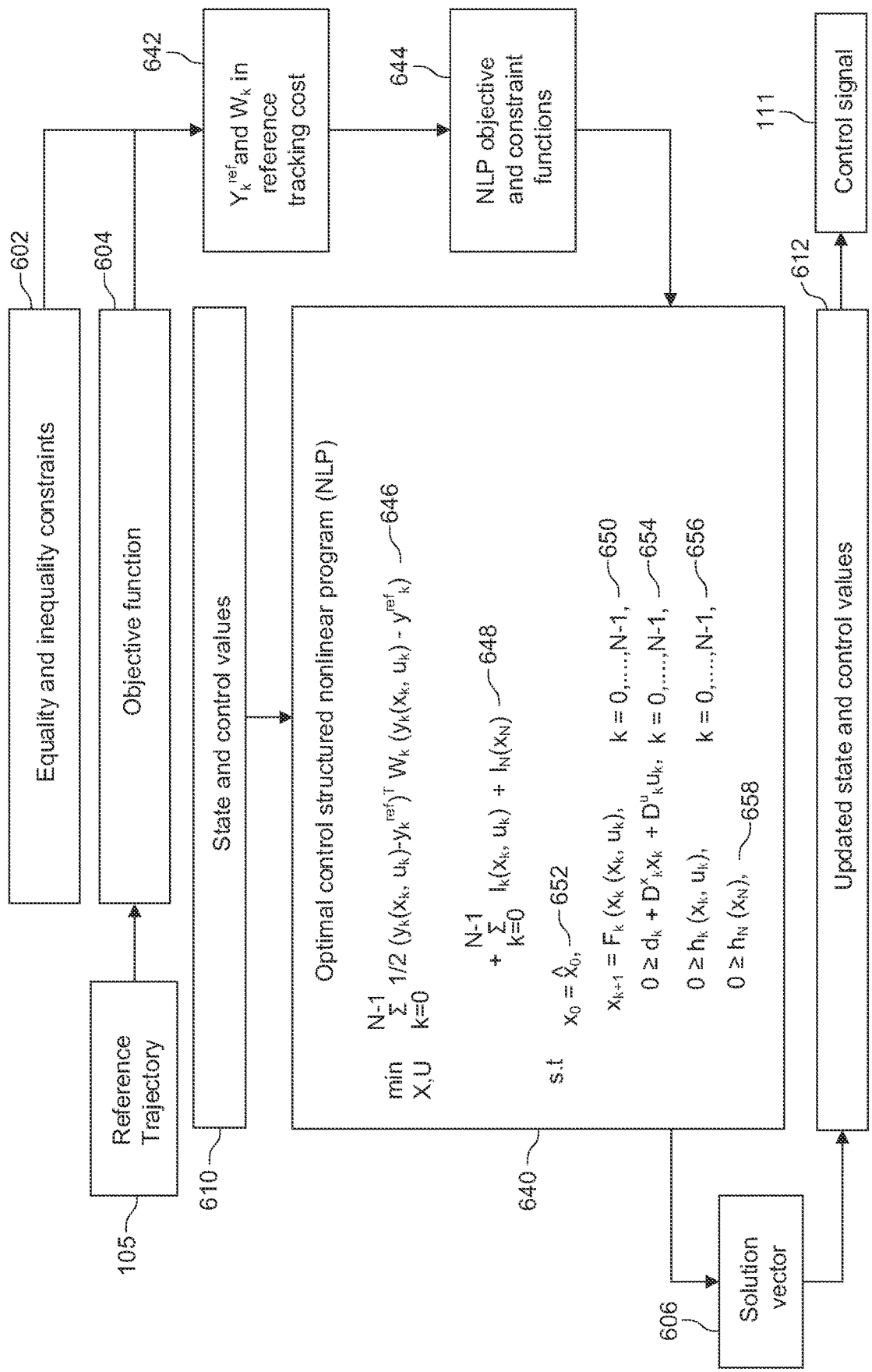
FIG. 6B shows an example block diagram for a non-linear predictive controller, in accordance with another embodiment of the present disclosure.

FIG. 6B shows an example block diagram for predictive controller 110, in accordance with some embodiments. Pursuant to present example, the predictive controller 110 may be implemented by solving an optimal control structured non-linear program (NLP) 640 to compute the control signal 111, given the estimated state 121 of the system 120 and the reference trajectory 105. In some embodiments of the present disclosure, the predictive controller 110 uses a linear-quadratic or nonlinear objective function 604 in combination with a linear or nonlinear dynamical system model 107 to predict the behavior of the vehicle 153 and a combination of linear and nonlinear inequality constraints. The predicted behavior of the vehicle 153 and the combination of linear and nonlinear inequality constraints may result in formulation of the optimal control structured NLP 640 problem that may be formulated as:

$$\min_{X,U} \sum_{k=0}^{N-1} \frac{1}{2}\left(y_k(x_k, u_k) - y_k^{ref}\right)^T W_k\left(y_k(x_k, u_k) - y_k^{ref}\right) + \sum_{k=0}^{N-1} l_k(x_k, u_k) + l_N(x_N)$$

such that $x_0 = \hat{x}_0$ $x_{k+1} = F_k(x_k, u_k), k=0, \ldots, N-1,$ $0 \geq d_k + D_k^x x_k + D_k^u u_k, k=0, \ldots, N-1,$ $0 \geq h_k(x_k, u_k), k=0, \ldots, N-1,$ $0 \geq h_N(x_N),$ where a prediction horizon of the nonlinear predictive controller 110 is discretized in time, using a sequence of N equidistant or non-equidistant control time intervals. The control time intervals are divided by a sequence of discrete time points $t_k$ for $k=0, \ldots, N$.

The optimization variables in the optimal control structured NLP 640 consist of state variables $x_k$ and control input variables $u_k$ for $k=0, \ldots, N$. In some embodiments, the dimensions for the state and control variables 610 do not need to be equal to each other for each discrete time point $t_k$ for $k=0, \ldots, N$. At each sampling time for the predictive controller 110, the optimal control structured NLP 640 is formulated, using the reference and weighting matrix in the reference tracking cost 642, and NLP objective and constraint functions 644. The optimal control structured NLP 640 is solved in order to compute the solution vector 606. The solution vector 606 may be used to generate updated the state and the control values 612 that may be used in next iteration. Further, based on solving the optimal control structured NLP 640 a new control input 111 is generated.

The non-linear predictive controller 110 may track the reference trajectory by solving an optimal control problem formulation, in which the reference trajectory is indicated as $(p_X^{ref}(t_i), p_Y^{ref}(t_i), \psi^{ref}(t_i), v^{ref}(t_i))_{i=0,\ldots,M},$ given a grid of discrete time points $t_0 < t_1 < \ldots < t_i < \ldots < t_M$.

The objective function in the constrained optimal control structured NLP 640 that may be solved by the predictive controller 110 includes one or more linear and/or nonlinear least squares reference tracking terms 646. The reference tracking terms 646 may penalize a difference between a sequence of predicted state and/or output values and a sequence of reference state and/or output values for the reference trajectory 105 that is computed by the motion planner 108 at the path and motion planning layer 210.

In some embodiments of the present disclosure, a sequence of weighting matrices $W_k$ is used in the least squares reference tracking terms 646 for $k=0, \ldots, N$. To this end, each weighting matrix $W_k$ may be adapted in the control cost function 642, based on the reference trajectory 105. The output values $y_k(x_k, u_k)$ for $k=0, \ldots, N$, which are used in the reference tracking terms 646, may be defined as any linear or nonlinear function of state and/or control input variables.

For example, an output function may include, but is not limited to, longitudinal or lateral velocities, accelerations of the vehicle 153, a slip ratio or slip angle, angle of orientation, angular velocities, wheel speeds, forces, and torques.

The reference tracking terms 646 is defined by the weighting matrix $W_k$ and the reference values $y_k^{ref}$ 642. In some embodiments of the present disclosure, the weighting matrix is either positive definite $W_k > 0$ or positive semi-definite $W_k \geq 0$, i.e., all eigenvalues of the matrix $W_k$ are either larger than zero or all eigenvalues of the matrix $W_k$ are larger than or equal to zero.

Embodiments of the present disclosure may define additional tracking terms for the MPC cost function 642 in the form of a stage cost and/or a terminal cost term 648. Both the cost terms may include any combination of linear, linear-quadratic, or nonlinear functions. These additional objective terms may include a penalization of functions of state and/or control input variables. For example, the objective function 644 in the constrained optimal control structured NLP 640 may include a linear, quadratic, or nonlinear penalization of longitudinal or lateral velocities and/or accelerations of the vehicle, a slip ratio or slip angle, angles of orientation or angular velocities, wheel speeds, forces, torques or any combination of such quantities.

The constrained optimal control structured NLP 640 that is solved by the nonlinear predictive controller 110 may define a nonlinear dynamical model 650 that describes the state of the vehicle 153 at one time step $t_{k+1}$, given the state and control variables 610 at the previous time step $t_k$. The nonlinear dynamic system model 650 is defined by a time-invariant or time-varying function $x_{k+1} = F_k(x_k, u_k)$ for $k=0, \ldots, N-1$. Given the estimated state $\hat{x}_0$ 121 in the equality constraint for the initial state value 652 and a sequence of control input values $u_k$, the nonlinear dynamical model equations 650 may be used to compute the state values $x_k$ for $k=0, \ldots, N$.

Some embodiments of the present disclosure are based on the realization that a discrete-time dynamical model 650 to predict the behavior of the vehicle 153 may be obtained by performing a time discretization of a set of continuous time differential or differential-algebraic equations. Such a time discretization may sometimes be performed analytically but requires the use of a numerical simulation routine to compute a numerical approximation of the discrete-time evolution of the state trajectory. Examples of numerical routines to approximately simulate a set of continuous time differential or differential-algebraic equations include, but are not limited to, explicit or implicit Runge-Kutta methods, explicit or implicit Euler, backward differentiation formulas and other single- or multistep methods.

In addition to the equality constraints, including the initial state value 652 and the dynamic model equations 650, the constrained optimal control structured NLP 640 may include one or more linear and/or nonlinear inequality constraints to impose physical limitations of the system 120, safety constraints and/or to impose desirable performance-related constraints on the behavior of the autonomous or semi-autonomous vehicle 153. More specifically, the optimal control structured NLP 640 may include linear path inequality constraints 654 or nonlinear path inequality constraints 656 for $k=0, \ldots, N-1$ as well as linear and/or nonlinear terminal inequality constraints 658 imposed at the end of the prediction horizon. The inequality constraints are defined by a time-invariant or time-varying sequence of matrices $D_k^x$, $D_k^u$, vectors $d_k$ and/or nonlinear functions $h_k(x_k, u_k)$ for $k=0, \ldots, N$.

The inequality constraints may include constraints on, for example, longitudinal or lateral velocities, accelerations of the vehicle 153, the position and/or orientation of the vehicle 153 with respect to its surroundings, a slip ratio or slip angle, angles of orientation or angular velocities, wheel speeds, forces and/or torques. For example, obstacle avoidance constraints could be implemented in the nonlinear predictive controller 110 by defining a set of one or more inequality constraints on a linear or nonlinear function of the predicted position, velocity, and orientation of the vehicle 153 with respect to the predicted position, velocity, and orientation of one or multiple obstacles 158a and 158b in the surrounding environment of the vehicle 153.

In some embodiments of the present disclosure, the non-linear predictive controller 110 includes obstacle avoidance constraints that are implemented using a time-varying sequence of one or multiple ellipsoidal inequality constraints that may be represented as:

$$1 \le \left(\frac{\delta_{x,j}(t)}{a_{x,j}}\right)^2 + \left(\frac{\delta_{y,j}(t)}{a_{y,j}}\right)^2$$

where $$\begin{bmatrix} \delta_{x,j} \\ \delta_{y,j} \end{bmatrix} = R(e_{\psi,j})^T \begin{bmatrix} p_X - e_{x,j} \\ p_Y - e_{y,j} \end{bmatrix}$$

is a rotated distance of an estimated or predicted vehicle position $(p_X, p_Y)$ to the estimated and/or predicted position of one of potentially multiple obstacles 158a, 158b in the surrounding environment of the vehicle 153. The position and orientation of each obstacle 158a, 158b is denoted by $(e_{x,j}, e_{y,j}, e_{\psi,j})$, the matrix $R(e_{\psi,j})^T$ denotes the transpose of a rotation matrix corresponding to an angle $e_{\psi,j}$ that represents an orientation of the obstacle 158a, 158b, and $(a_{x,j}, a_{y,j})$ denotes lengths of principal semi-axes of an ellipsoid that defines safety margin, including uncertainty, around a spatial extent of the estimated shape, around each of the M nearest detected obstacles 158a, 158b for j=1, ..., M. The real-time obstacle detection and corresponding pose estimation may be performed by a sensing module and this information is shared by the different components in the multi-layer path and motion planning system 172, as shown in FIG. 2.

Some embodiments of the present disclosure are based on tailored optimization algorithms to efficiently solve the constrained optimal control structured NLP 640 at each sampling instant of the nonlinear predictive controller 110. Such an optimization algorithm may find a solution vector 606, which is either feasible with respect to the constraints and globally optimal, feasible but locally optimal, feasible but suboptimal or an iterative optimization algorithm may find a low-precision approximate control solution that is neither feasible nor locally optimal. Examples of NLP optimization algorithms include, but are not limited to, variants of interior point methods and variants of sequential quadratic programming (SQP) methods.

In particular, some embodiments of the present disclosure use the real-time iteration (RTI) algorithm that is an online variant of sequential quadratic programming (SQP) in combination with a quasi-Newton or generalized Gauss-Newton type positive semi-definite Hessian approximation, such that at least one convex block-sparse QP approximation needs to be solved at each sampling instant of the nonlinear predictive controller 110.

Each iteration of RTI comprises of two steps. At a first step corresponding to a preparation phase, system dynamics are discretized and linearized, the remaining constraint functions are linearized, and the quadratic objective approximation is evaluated to build the optimal control structured QP sub-problem. In a second step corresponding to a feedback phase the QP sub-problem is solved to update the current state and control values for all optimization variables and the next control input 111 is obtained to apply feedback to the system 120.

In some embodiments of the present disclosure, the block-sparse optimal control structure in the Hessian and constraint Jacobian matrices may be exploited in one or more of the linear algebra operations of the optimization algorithm in order to reduce the computational complexity, and therefore to reduce the execution time and memory footprint of the NLP optimization algorithm.

In accordance with some embodiments, the conditions set for the vehicle model (as denoted in equation (1)) is augmented with the acceleration a and rate of change $\delta_{rate}$ for the front wheel steering angle, such as $$\dot{v}=a, \text{ and } \dot{\delta}=\delta_{rate} \qquad (2)$$

Even though the vehicle speed, v, and front wheel steering angle, δ, are control commands that are typically sent to a low-level control-by-wire system, such as actuators of components of the vehicle 153, Eq. (2) enables introducing the acceleration a and steering angle rate of change $\delta_{rate}$ in the objective function 604 and constraints 602 for the formulation of the optimal control structured NLP 640 problem.

For example, a lateral position error with respect to the planned reference trajectory 105 may be formulated as:

$$e_Y = \cos(\psi^{ref})(p_Y - p_Y^{ref}) - \sin(\psi^{ref})(p_X - p_X^{ref}) \qquad (3)$$

In order to achieve an offset-free operation of the predictive controller 110], an integral action may be added to the non-linear predictive controller 110 formulation of the optimization problem by including the error integrator $\dot{e}_{Y_{int}} = e_Y$ in the vehicle model (1).

In an example, a resultant augmented vehicle model or updated system model 107 may be:

$$\left.\begin{aligned} \dot{p}X &= v\cos(\psi), \\ \dot{p}Y &= v\sin(\psi), \\ \dot{\psi} &= v\tan(\delta_f)/L, \\ \dot{\delta}_f &= (\delta - \delta_f)/\tau, \\ \dot{v} &= a, \\ \dot{\delta} &= \delta_{rate}, \\ \dot{e}_{Y_{int}} &= \cos(\psi^{ref})(p_Y - p_Y^{ref}) - \sin(\psi^{ref})(p_X - p_X^{ref}), \end{aligned}\right\} \qquad (4)$$

where $n_x = 7$ states, $x = [p_X\, p_Y\, \psi\, \delta_f\, v\, \delta\, \dot{e}_{Y_{int}}]^T$, and $n_u = 2$ control inputs, $u = [a\, \delta_{rate}]$.

The non-linear predictive controller 110 minimizes tracking errors for tracking the vehicle 153, when the vehicle 153 is being controlled to perform the hitching maneuver with respect to the reference trajectory 105. The tracking errors may be defined with respect to reference state values in the reference trajectory:

$$(p_X^{ref}(t_i), p_Y^{ref}(t_i), \psi^{ref}(t_i), v^{ref}(t_i))_{i=0,\ldots,M},$$

The tracking errors are minimized while satisfying constraints on longitudinal speed, acceleration, front wheel steering angle and steering angle change rate. The constrained optimal control NLP 640 problem may be formulated using direct multiple shooting. In this regard, at each control time step $t_i$ based on a time grid of equidistant time points $t_k$ for k=0, ... N, $$t_{k+1} - t_k = \frac{T}{N},$$

where T is a horizon length and N is a number of control intervals, a piecewise constant control parameterization may be applied. The constant control parameterization may be denoted as:

$$u(t_i+\tau|t_i)=u_{i,k}$$

for $\tau \in [t_k, t_{k+1})$, $u_{i,k}$ is predicted control input 111 computed at time step $t_i$. For simplicity, the equidistant time grid is aligned with the discrete time points of the planned reference trajectory 105, $x_{i,k}^{ref}=x^{ref}(t_i+t_k)$. Alternatively, a polynomial interpolation may be used for predicting the control input 111.

Given the state estimate $\hat{x}_{i,0}$ at time step $t_i$ and the piecewise constant control parameterization, the vehicle model dynamics in equation (4) may be discretized by a numerical integration method, resulting in the discrete-time prediction model denoted as:

$$x_{i,k+1}=f(x_{i,k},u_{i,k}), k=0,\ldots,N-1$$

For example, explicit $4^{th}$ order Runge-Kutta method may be applied to perform time discretization to predict behavior of the vehicle 153. It may be noted that the use of the Runge-Kutta method is only exemplary and in other embodiments, other integration methods may be used to achieve desired accuracy in prediction of behavior.

For example, the nonlinear cost function of the predictive controller 110 may be based on the least squares tracking terms 646. For example, the cost function may be formulated as:

$$J(X_i, U_i, S_i) = \frac{1}{2}\sum_{k=0}^{N-1}\left(\|x_{i,k} - x_{i,k}^{ref}\|_Q^2 + \|u_{i,k}\|_R^2\right) \quad (6a)$$

$$+ \frac{1}{2}\|x_{i,N} - x_{i,N}^{ref}\|_P^2 + \sum_{k=0}^{N-1}\rho\, s_{i,k} \quad (6b)$$

Where Q≥0, P≥0 are positive semi-definite weighting matrices, such as, $W_k$. Further, R>0 is positive definite weighting matrices. The reference state vector corresponding to the reference trajectory is $x^{ref}=[p_X^{ref}, p_Y^{ref}, \psi^{ref}, 0, v^{ref}, 0, 0]$ and $s_{i,k}$ are non-negative slack variables that soften the constraints 602 to ensure recursive feasibility of the optimal control problem, and are penalized in a linear term in (6b).

According to some embodiments, a quadratic penalty may be imposed for assigning weight by the weighting matrix. The quadratic penalty on the integrated error $\dot{e}_{Y_{int}}$ determines how offset-free tracking control $e_Y \rightarrow 0$ is achieved, to meet hitching requirements at the end of the maneuver. To avoid oscillations, the integrated error $\dot{e}_{Y_{int}}$ may be reset whenever its value grows too large or when the lateral position error $e_Y$ is sufficiently close to zero.

In an example implementation, the predictive controller may be implemented with a sampling period of $$T_s = \frac{T}{N} = 50 \text{ ms}.$$

At each control time step $t_i$, the velocity and steering commands for the low-level actuators of the vehicle 153 may be computed from $u_k$ of solution of the optimal control structured NLP 640 of the optimal control problem.

For example, the nonlinear optimal control structured NLP 640 may be solved within the sampling time of $T_s=50$ ms, using a tailored implementation of sequential quadratic programming (SQP) known as the real-time iterations (RTI) scheme, with Gauss-Newton type Hessian approximation. The RTI algorithm performs a single SQP iteration per control time step and uses a continuation-based warm starting of the state and control trajectories ($X_i$, $U_i$; $S_i$) from one time step $t_i$ to the next time step $t_{i+1}$. The non-linear functions and their first order derivatives may be evaluated efficiently using C code generation in CasADi. For solving QPs, a solver PRESAS, which applies block-structured factorization techniques with low-rank updates to preconditioning of an iterative solver within a primal active-set algorithm with specialized warm-starting may be used. In combination with the CasADi generated C code, the PREAS solver results in efficient and reliable NMPC solver for solving the optimal control structured NLP 640 problem that is suitable for embedded system platforms.

Based on the control input 111 generated by the predictive controller 110, by solving the optimal control structured NLP 640 problem, the vehicle 153 may be controlled to perform the hitching maneuver.

Figure 7A:
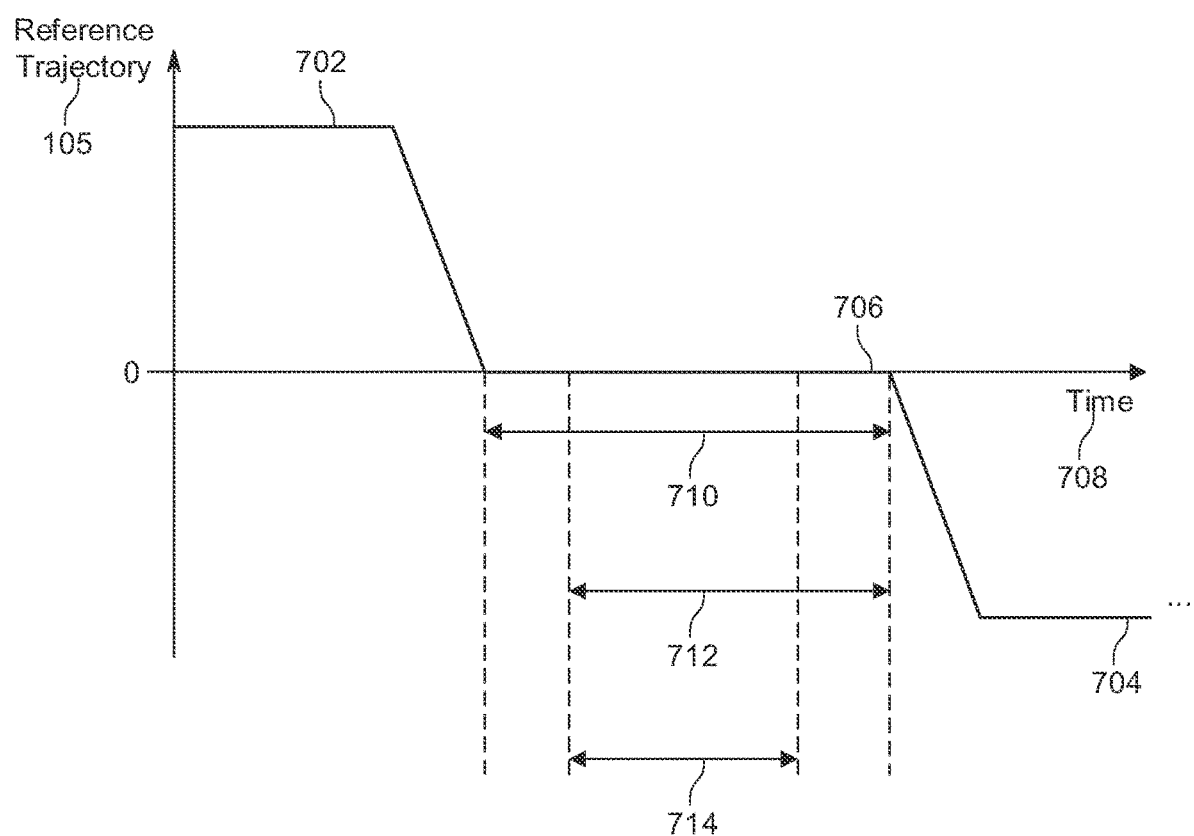
FIG. 7A shows an example reference trajectory, in accordance with some embodiments of the present disclosure.

FIG. 7A shows an example reference trajectory 105, in accordance with some embodiments of the present disclosure. The reference trajectory 105 may be computed by the motion planner 108 in the path and motion planning layer 210. To this end, the reference trajectory 105 may include one or more motion cusps, i.e., a transition from a forward motion 702 to a reverse motion 704 or from a reverse motion 704 to a forward motion 702. Some embodiments of the present disclosure are based on the realization that the reference trajectory 105 should include a sufficiently large pause period 710 at each of the one or more motion cusps, in order to allow for the predictive controller 110 to command a gear change with a sufficiently large preview time period 712 due to a time delay period 714 of the gear shifting mechanics in the controlled system.

For example, FIG. 7A shows a graph of the reference trajectory 105 with respect to time 708, including the forward motion 702 with positive reference velocity values, followed by the pause at standstill with zero reference velocity values 706, and followed by the reverse motion 704 with negative reference velocity values. The pause period 710 is larger than the preview time period 712, for the predictive controller 110 to command a gear change. The preview time period 712 is larger than the time delay period 714 of the gear shifting mechanics in the controlled vehicle 153.

In particular, the BIAGT motion planning algorithm is modified to introduce a pause at each motion cusp, i.e., at each switch between the forward motion 702 and the backward motion 704 of the vehicle 153 to reach the hitching point at the end of the maneuver. In the pause time period 710, $\Delta t_{pause}$, during which the vehicle 153 is planned to be at standstill with zero reference velocity value 706, a gear shift is initiated with the preview time period 712, $\Delta t_{preview}$ before the vehicle 153 starts moving in the opposite direction. The preview time period 712 is chosen to be larger than the time delay period 714 that indicates an average time it takes for the vehicle 153 to switch between gears, $\Delta t_{preview} > \Delta t_{gear}$. For example, longitudinal velocity bounds may change according to the current gear, v≥0 when the vehicle 153 is in forward motion 702 and v≤0 when the vehicle 153 is in reverse motion 704.

Figure 7B:
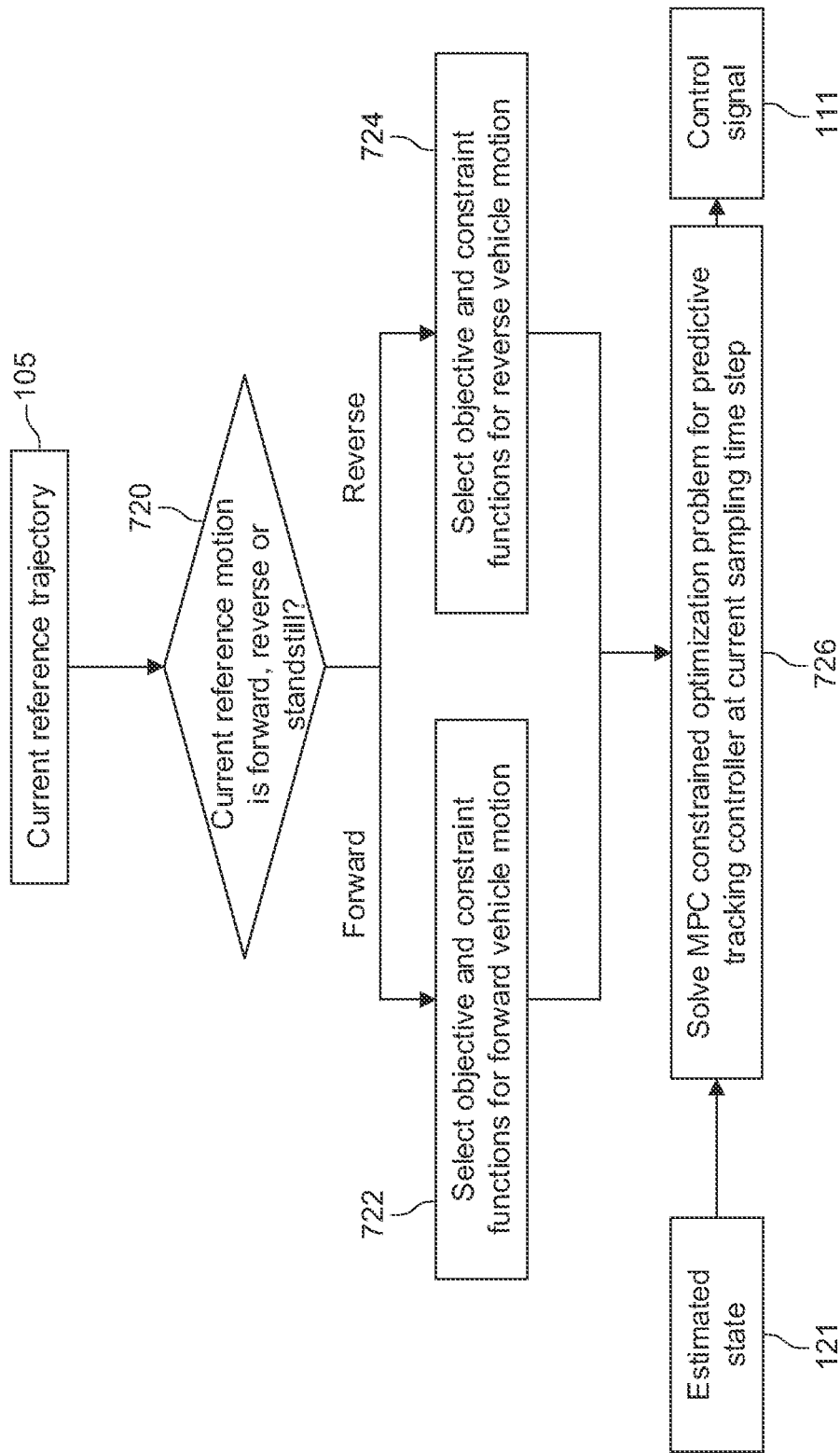
FIG. 7B shows an example method for switching NLP objective and constraint functions of a non-linear predictive controller, in accordance with some embodiments of the present disclosure.

FIG. 7B shows an example method for switching NLP objective and constraint functions 644 of the non-linear predictive controller 110, in accordance with some embodiments of the present disclosure. In particular, the objective and constraint functions 644 of the predictive controller 110 may be switched, depending on whether a current reference motion is either a forward motion 702 or a reverse motion 704.

At 720, the current reference trajectory 105 may be used to detect whether the majority of the reference trajectory 105 over the prediction horizon length of the predictive controller 110 has the forward motion 702, the reverse motion 704, or standstill with zero reference velocity value 706. In other words, a determination is made to identify, for example, whether the majority of the reference trajectory 105 over the prediction horizon length of the predictive controller 110 is either positive, negative, or close to zero.

According to some embodiments of the present disclosure, at 722, the objective and constraint functions 644 may be adjusted to the forward vehicle motion 702 at one or more sampling time steps $t_i$. This may ensure that the vehicle 153 velocity is always larger than or equal to zero.

In some embodiments of the present disclosure, at 724, the objective and constraint functions 644 may be adjusted to the reverse vehicle motion 704 at one or more sampling time steps $t_i$. This may ensure that the vehicle 153 velocity is always smaller than or equal to zero.

Given the objective and constraint functions 644 and the estimated state 121 for the current reference trajectory 105, the predictive controller 110 may be implemented by solving the constrained optimization problem for predictive reference tracking at the current sampling time step $t_i$, at 726, to create the control input 111. For example, the objective and constraint functions 644 may be related to the optimization problem, such as the optimal control structured QP 608 and optimal control structured NLP 640, of the predictive controller 110. To this end, the forward vehicle motion 702 followed by the reverse vehicle motion 704 may correspond to a motion cusp.

Figure 8A:
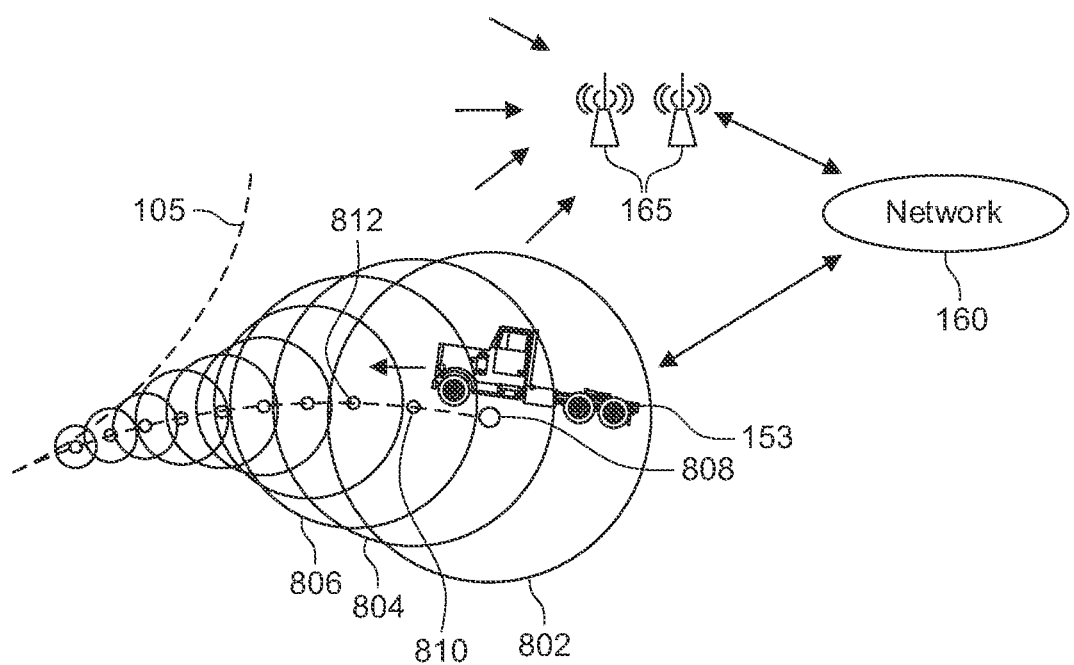
FIG. 8A shows an example of an automated hitching maneuver, in accordance with some embodiments of the present disclosure.

FIG. 8A shows an example of an automated hitching maneuver, in accordance with some embodiments of the present disclosure. The hitching maneuver may include one or more vehicle system 153. In order to perform the hitching maneuver, the modified BIAGT motion planning algorithm implemented by the motion planner 108 and the non-linear predictive controller 110 may be integrated.

It may be noted that the BIAGT motion planning algorithm utilized by the motion planner 108 computes a kinematically feasible trajectory, such as the reference trajectory 105. The reference trajectory 105 may be generated based on the first path 318 or the second path 428. The reference trajectory 105 avoids collisions between the vehicle 153 and any static obstacles 158a, 158b in the environment.

However, the motion planner 108 does not take into consideration any dynamic obstacles that may enter the environment. Regarding the dynamic obstacles, certain restrictions are imposed on the path and motion planning system 172 to control movement of the vehicle 153.

In this regard, some embodiments are based on the realization that the hitching maneuver is carried out in a mostly closed environment, i.e., without pedestrians, cyclists, or passenger vehicles, and with only sporadic appearances of dynamic obstacles in the area of interest. For example, the area of interest may correspond to a safety region (depicted as safety sets 802, 804, and 806) around a current state configuration 808 of the vehicle and/or predicted state configurations 810, 812 in the environment of the vehicle 153. It may be noted that during the maneuver, the vehicle 153 may move from the current state configuration 808 to the predicted state configurations 810, 812.

Further, some embodiments of the present disclosure are based on the realization that if a dynamic obstacle appears within the safety sets 802, 804, 806 while performing the hitching maneuver, the path and motion planning system 172 or the predictive controller 110 stops movement of the vehicle 153 by performing an automatic emergency braking (AEB). The predictive controller 110 then resumes execution of the maneuver after the dynamic obstacle has moved outside of a predefined safety sets 802, 804, 806.

Some embodiments of the present disclosure are based on the realization that a safety tube with a time-varying volume may be constructed around the reference trajectory 105 followed by the vehicle 153 for maneuvering. Moreover, an AEB system may be initiated whenever the dynamic obstacle enters the time-varying safety tube.

In some embodiments of the present disclosure, one or more road-side units (RSUs) or infrastructure sensing devices 165 can be used for accurate execution of the automated hitching maneuver, based on accurate sensing of the current state as well as accurate detection of dynamic obstacles in the environment or safety sets 802, 804, 806 of the controlled vehicle 153. For example, the one or more RSUs 165 may include one or more sensors, e.g., distance range finders, radars, LIDARs, and/or cameras, as well as sensor fusion technologies in order to accurately detect the state of the vehicle and of dynamic obstacles in the environment of the controlled system. In some embodiments of the invention, a communication network 160 may be used for real-time communication between the vehicle 153 and the one or more RSUs or infrastructure sensing devices 165.

In an example, the AEB system is initiated if a dynamic obstacle is detected, using sensors on-board the vehicle 153 and/or possibly by communication form one or more RSUs 165. To that end, if the dynamic obstacle is within the union of safety sets 802, 804, 806 around the current state configurations 808 or predicted state configuration 810, 812 of the vehicle 153, the predictive controller 110 is interrupted and AEB system engages to execute a braking maneuver.

When the dynamic obstacle moves outside the union of safety sets 802, 804, 806, the predictive controller is re-initialized, and the automatic hitching maneuver continues. In certain cases, due to the low speeds at which the vehicle 153 executes the hitching maneuver, the same motion plan, i.e., the reference trajectory may be reused to complete the maneuver and the BIAGT algorithm does not need to be executed after such an interruption. However, in certain cases, fast re-planning of the motion plan or new reference trajectory may have to be generated and obstacle avoidance constraints in the optimization problem formulation may be changed.

Figure 8B:
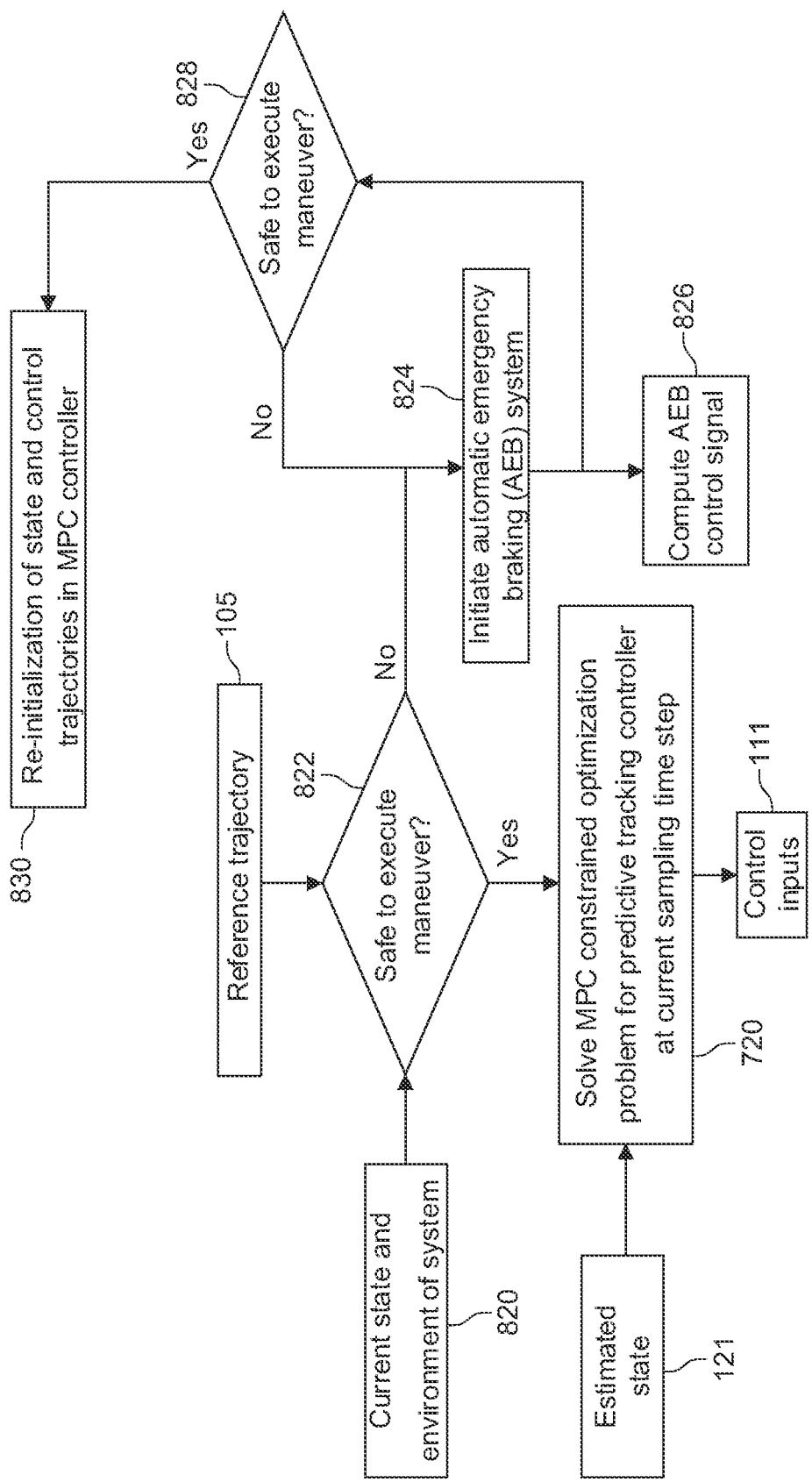
FIG. 8B shows an example method for re-initialization of the predictive controller, in accordance with some embodiments of the present disclosure.

FIG. 8B shows an example method for re-initialization of the predictive controller 110, in accordance with some embodiments. For example, the motion of the vehicle 153 and the tracking of the predictive controller 110 may be interrupted by a dynamic obstacle. In certain cases, going back to old reference trajectory may not be feasible as, for example, the dynamic obstacle is not moving for a long time, change in environment of the vehicle 153 due to the dynamic obstacle, and so forth.

At 820, information relating to the current state configuration 808 and surroundings of the vehicle 153 is tracked. For example, the surroundings of the vehicle may correspond to safety sets 802, 804, 806. In an example, the predictive controller 110 may determine the information, based on tracking of the vehicle 153 to check whether it is safe or not to execute a maneuver, such as the hitching maneuver, at each sampling time step $t_i$, using a detection mechanism. For example, the detection mechanism may comprise using RSUs 165 or other one or more on-board sensors to sense the current state 808 of the vehicle 153 and surroundings of the vehicle 153.

At 822, a determination is made to check if each of one or more safety checks associated with maneuvering are satisfied, based on the current state 808 and environment of the vehicle 153 and the current reference trajectory 105.

Once the safety checks are satisfied, at 720, the predictive controller 110 may be implemented by solving the constrained optimization problem for predictive reference tracking of the vehicle 153, based on the reference trajectory 105 and the estimated state 121, at the sampling time step $t_i$. The predictive controller 110 may generate the control inputs 111 to control the vehicle 153 for performing the hitching maneuver.

However, if the safety checks are not satisfied at 822, an automatic emergency braking (AEB) system is initiated. At 824, the AEB system is initiated to safely bring the vehicle 153 to a standstill. In this regard, an AEB control signal is computed at 826. The generated AEB control signal is provided to the actuators of the vehicle 153, to bring the vehicle 153 to standstill. If one or more of the safety checks are not satisfied, at 822, for example, if one or more dynamic obstacles are detected inside the safety sets 802, 804, 806 around the current state configuration 808 and/or predicted state configurations 810 and 812 of the vehicle 153, the AEB system may be activated.

Some embodiments of the disclosure are based on the realization that the AEB system continues its execution as long as one or more of the safety checks are not satisfied, at 828.

Further, at 830, a re-initialization step for the state and control trajectories of the predictive controller 110 is executed when it is again safe to execute the maneuver. For example, in order to ensure a relatively smooth transition after switching from the AEB back to the hitching maneuver, the predictive controller 110 may computes a closest point in the reference trajectory 105 with respect to the current state configuration 808 of the vehicle 153. Subsequently, the predictive controller 110 may start tracking the vehicle 153 from the current state configuration 808 of the vehicle 153 the reference trajectory 105 and resulting in an updated reference trajectory for the predictive controller 110. For example, the reference trajectory 105 is set to the current state configuration 808 of the vehicle 153 with a zero reference speed value. Subsequently, new reference states are time shifted within the horizon to account for the vehicle reaching a reference speed from standstill after braking.

Figure 9:
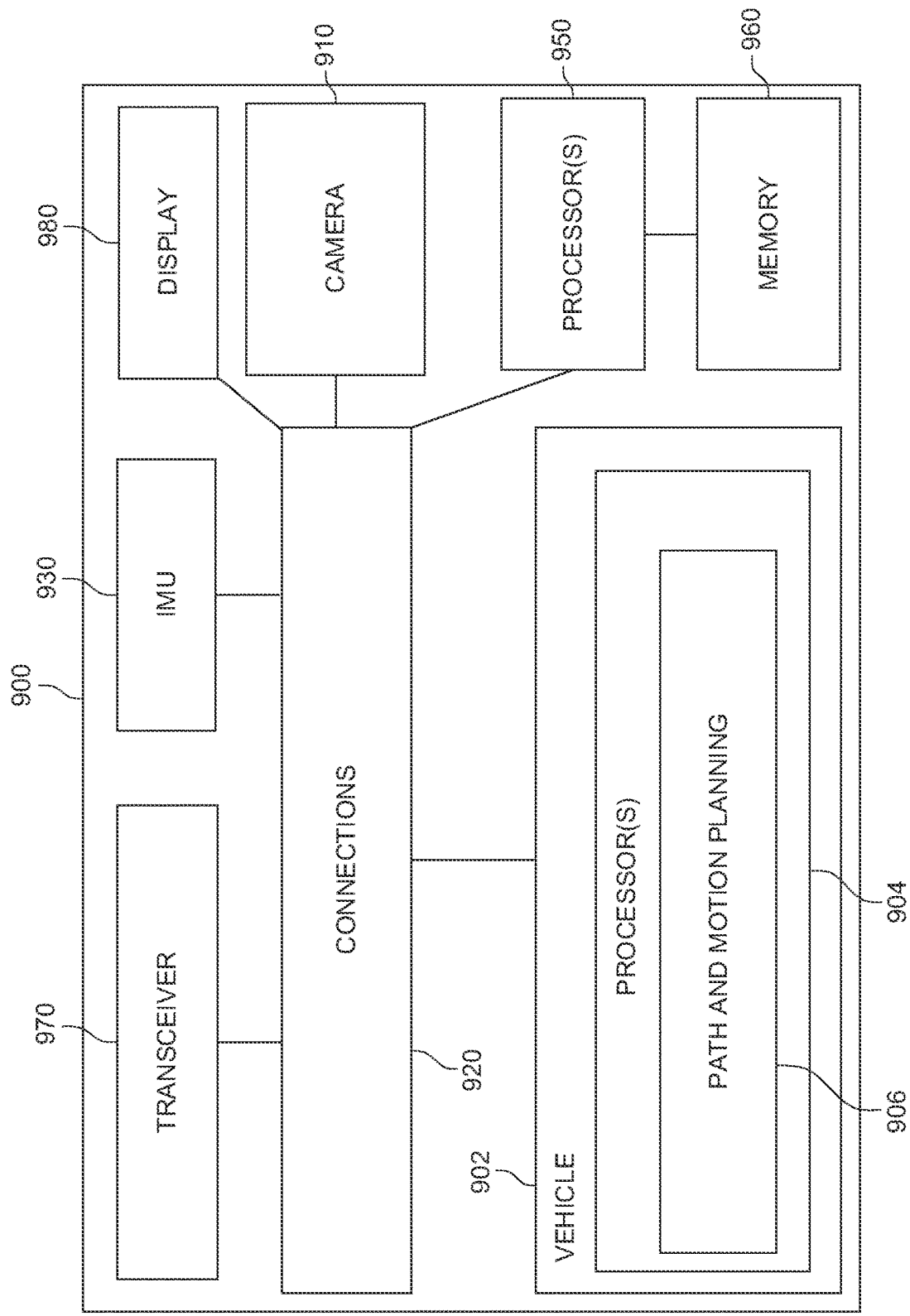
FIG. 9 shows a schematic of a system, in accordance with some embodiments of the present disclosure.

FIG. 9 shows a schematic of a system 900, in accordance with an embodiment. The system 900 includes a vehicle 902 including a processor 904 configured for performing path and motion planning 906. The vehicle 902 also includes at least one sensor, such as a pressure sensor, force sensor, distance range finders, radar, LIDAR and/or a camera. The sensors may be operatively connected to the processor 904 and is configured for sensing information indicative of the initial state and the target state of the vehicle 902. The vehicle 902 may be a tractor-trailer type vehicle as described in previous embodiments. Using this information, the processor 904 is configured to perform motion and path planning for the vehicle 902 using one or more techniques described above in previous embodiments.

The system 900 may include one or combination of sensor(s) 910, an inertial measurement unit (IMU) 930, a processor 950, a memory 960, a transceiver 970, and a display/screen 980, which can be operatively coupled to other components through connections 920. The connections 920 can comprise buses, lines, fibers, links, or combination thereof.

The transceiver 970 can, for example, include a transmitter enabled to transmit one or more signals over one or more types of wireless communication networks and a receiver to receive one or more signals transmitted over the one or more types of wireless communication networks. The transceiver 970 can permit communication with wireless networks based on a variety of technologies such as, but not limited to, femtocells, Wi-Fi networks or Wireless Local Area Networks (WLANs), which may be based on the IEEE 802.11 family of standards, Wireless Personal Area Networks (WPANS) such Bluetooth, Near Field Communication (NFC), networks based on the IEEE 802.15x family of standards, and/or Wireless Wide Area Networks (WWANs) such as LTE, WiMAX, etc. The system 900 can also include one or more ports for communicating over wired networks.

In some embodiments, the sensor(s) 910 may include image sensors, such as CCD or CMOS sensors, lasers and/or camera, which are hereinafter referred to as "sensor 910". For example, the sensor 910 can convert an optical image into an electronic or digital image and can send acquired images to the processor 950. Additionally, or alternatively, the image sensor can sense the light reflected from a target object in a scene and submit the intensities of the captured light to the processor 950.

For example, the sensor 910 may include color or grayscale cameras, which provide "color information." The term "color information" as used herein refers to color and/or grayscale information. In general, as used herein, a color image or color information can be viewed as comprising 1 to N channels, where N is some integer dependent on the color space being used to store the image. For example, an RGB image comprises three channels, with one channel each for Red, Blue, and Green information.

In some embodiments, the processor 950 can also receive input from IMU 930. In other embodiments, the IMU 930 can comprise 3-axis accelerometer(s), 3-axis gyroscope(s), and/or magnetometer(s). The IMU 930 can provide velocity, orientation, and/or other position related information to the processor 950. In some embodiments, the IMU 930 can output measured information in synchronization with the capture of each image frame by the sensor 910. In some embodiments, the output of the IMU 930 is used in part by the processor 950 to fuse the sensor measurements and/or to further process the fused measurements.

The system 900 can also include a screen or display 980 rendering images, such as color and/or depth images. In some embodiments, the display 980 can be used to display live images captured by the sensor 910, fused images, augmented reality (AR) images, graphical user interfaces (GUIs), motion control instructions, and other program outputs. In some embodiments, the display 980 can include and/or be housed with a touchscreen to permit users to input data via some combination of virtual keyboards, icons, menus, or other GUIs, user gestures and/or input devices such as styli and other writing implements. In some embodiments, the display 980 can be implemented using a liquid crystal display (LCD) display or a light emitting diode (LED) display, such as an organic LED (OLED) display. In other embodiments, the display 980 can be a wearable display. In some embodiments, the result of the fusion may be rendered on the display 980 or submitted to different applications that can be internal or external to the system 900.

Exemplary system 900 can also be modified in various ways in a manner consistent with the disclosure, such as, by adding, combining, or omitting one or more of the functional blocks shown. For example, in some configurations, the system 900 does not include the IMU 930 or the transceiver 970. Further, in certain example implementations, the system 900 include a variety of other sensors (not shown) such as an ambient light sensor, microphones, acoustic sensors, ultrasonic sensors, laser range finders, etc. In some embodiments, portions of the system 900 take the form of one or more chipsets, and/or the like.

The processor 950 can be implemented using a combination of hardware, firmware, and software. The processor 950 can represent one or more circuits configurable to perform at least a portion of a computing procedure or process related to sensor fusion and/or methods for further processing the fused measurements. The processor 950 retrieves instructions and/or data from memory 1060. The processor 950 can be implemented using one or more application specific integrated circuits (ASICs), central and/or graphical processing units (CPUs and/or GPUs), digital signal processors (DSPs), digital signal processing devices (DSPDs), programmable logic devices (PLDs), field programmable gate arrays (FPGAs), controllers, micro-controllers, microprocessors, embedded processor cores, electronic devices, other electronic units designed to perform the functions described herein, or a combination thereof.

The memory 960 may be implemented within the processor 950 and/or external to the processor 950. As used herein the term "memory" refers to any type of long term, short term, volatile, nonvolatile, or other memory and is not to be limited to any particular type of memory or number of memories, or type of physical media upon which memory is stored. In some embodiments, the memory 960 holds program codes that facilitate the automated parking or motion planning of tractor-trailer-based vehicle 902.

For example, the memory 960 can store the measurements of the sensors, such as still images, depth information, video frames, program results, as well as data provided by the IMU 930 and other sensors. The memory 960 can store a memory storing a geometry of the vehicle 902, a map of the environment in which the maneuvering of the vehicle is to be performed, a kinematic model of the vehicle 902, and a dynamic system model of the vehicle 902. In general, the memory 960 may represent any data storage mechanism. The memory 960 can include, for example, a primary memory and/or a secondary memory. The primary memory can include, for example, a random-access memory, read only memory, etc. While illustrated in FIG. 9 as being separate from the processors 950, it should be understood that all or part of a primary memory can be provided within or otherwise co-located and/or coupled to the processors 950.

Secondary memory may include, for example, the same or similar type of memory as primary memory and/or one or more data storage devices or systems, such as, for example, flash/USB memory drives, memory card drives, disk drives, optical disc drives, tape drives, solid state drives, hybrid drives etc. In certain implementations, secondary memory can be operatively receptive of, or otherwise configurable to a non-transitory computer-readable medium in a removable media drive (not shown). In some embodiments, the non-transitory computer readable medium forms part of the memory 960 and/or the processor 950.

The above-described embodiments of the present disclosure can be implemented in any of numerous ways. For example, the embodiments may be implemented using hardware, software, or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the disclosure may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed but are used merely as labels to distinguish one claim element having a certain name from another element having a same name (but for use of the ordinal term) to distinguish the claim elements.

Although the disclosure has been described by way of examples of preferred embodiments, it is to be understood that various other adaptations and modifications can be made within the spirit and scope of the disclosure.

Therefore, it is the object of the appended claims to cover all such variations and modifications as come within the true spirit and scope of the disclosure.

What is claimed is:

1. A control system for controlling a movement of a vehicle using a motion planner, comprising:
   at least one processor; and
   a memory having instructions stored thereon that cause the at least one processor of the control system to:
     construct a graph having multiple nodes defining states of the vehicle, the multiple nodes of the graph comprising an initial node defining an initial state of the vehicle and a target node defining a target state of the vehicle, wherein each pair of nodes in the graph is connected with an edge defined by one or a combination of collision-free motion primitives moving the vehicle between the states of the connected nodes, each node comprising a number of motion cusps, and wherein the multiple nodes connected through corresponding edges form a first path through the graph connecting the initial node with the target node by a sequence of motion primitives for moving the vehicle from the initial state to the target state;
     determine a first number of motion cusps in the sequence of motion primitives of the first path, wherein a motion cusp from the first number of motion cusps indicates a switching between a forward motion and a backward motion in the sequence of motion primitives;
     on determining that the first number of motion cusps is above a threshold, expand the graph to add new nodes until a termination condition is met, wherein the expansion of the graph is subjected to a constraint associated with a total number of motion cusps, the graph being expanded to form a second path connecting the initial node with the target node, wherein the second path has a second number of motion cusps that is less than the first number of motion cusps; and control the movement of the vehicle based on the second path.

2. The control system of claim 1, wherein the instructions further cause the at least one processor of the control system to:

perform the expansion of the graph until the termination condition is met; and control the movement of the vehicle based on the second path, when the second path is formed before the termination condition is met.

3. The control system of claim 2, wherein the instructions further cause the at least one processor of the control system to:

control the movement of the vehicle based on the first path, when the second path is not formed until the termination condition is met.

4. The control system of claim 1, wherein the instructions further cause the at least one processor of the control system to:

compare the first number of motion cusps with the threshold; and expand the graph to add the new nodes, when the first number of motion cusps in the first path is above the threshold.

5. The control system of claim 1, wherein the second path comprises a minimum number of motion cusps for moving the vehicle from the initial state to the target state.

6. The control system of claim 1, wherein the instructions further cause the at least one processor of the control system to:

generate a trajectory for the movement of the vehicle along at least one of: the first path or the second path, as a function of time; and generate control commands for the vehicle to cause the vehicle to follow the trajectory.

7. The control system of claim 6, wherein the instructions further cause the at least one processor of the control system to:

generate the trajectory for the movement of the vehicle by adding a time dimension to at least one of: the first path or the second path, wherein the adding of the time dimension comprises adding extra time period at one or more motion cusps of the trajectory.

8. The control system of claim 6, wherein the instructions further cause the at least one processor to:

determine a safety region for the movement of the vehicle, based on the generated trajectory, the safety region comprising one or more safety sets along the trajectory;

check for a dynamic obstacle within the safety region; and on identifying the dynamic obstacle to be within the safety region, cause to stop the movement of the vehicle along the trajectory by initiating an automatic emergency braking (AEB) system to execute a braking maneuver.

9. The control system of claim 1, wherein the instructions further cause the at least one processor of the control system to:

construct the graph to form the first path by iteratively expanding a node from the multiple nodes to create a new node or by connecting two existing nodes from the multiple nodes.

10. The control system of claim 1, wherein the control system comprises a model predictive controller (MPC), the MPC having associated with it at least a constraint function, a quadratic objective function and a dynamic system model.

11. The control system of claim 10, wherein the instructions further cause the at least one processor to:

generate equality and inequality constraint functions for the MPC, the MPC having non-linear constraints and non-linear system model;

generate an objective function for the MPC, the objective function indicating the initial state and the target state of the vehicle; and solve an optimization problem associated with the MPC, based on the equality and inequality constraint functions and the objective function, using one or more iterations of sequential quadratic programming.

12. The control system of claim 11, wherein the constraint function and the objective function relating to the optimization problem associated with the MPC are adjusted to at least one of: a forward vehicle motion or a reverse vehicle motion.

13. The control system of claim 1, wherein, to form at least one of: the first path or the second path, the instructions further cause the at least one processor of the control system to:

construct a first tree of a first set of nodes originating from the initial node;

construct a second tree of a second set of nodes from the target node; and connect the first tree with the second tree by connecting a node from the first set of nodes with another node from the second set of nodes.

14. The control system of claim 13, wherein the instructions further cause the at least one processor of the control system to:

connect the first tree with the second tree using a collision-free connecting path with one of forty-eight Reeds-Shepp (RS) patterns to form the first path; and connect the first tree with the second tree using a collision-free connecting path with one of eight from the forty-eight RS patterns to form the second path, wherein the eight RS patterns are cusp-free.

15. The control system of claim 13, wherein, to form at least one of: the first path or the second path, the instructions further cause the at least one processor of the control system to:

select an expandable node from at least one of: the first nodes of the first tree, or the second nodes of the second tree, based on a cost associated with the expandable node; and expand the graph by adding a child node connected to the expandable node with an edge defined by a collision-free motion primitive such that a cost of the child node is less than the cost of the expandable node, wherein the cost of the child node is a minimum cost for reaching the target node from the initial node through the child node, the cost of the child node comprising a first cost of an initial path through the first set of nodes, a second cost of a target path through the second set of nodes, and a third cost of a connecting path between the first set of nodes and the second set of nodes.

16. The control system of claim 15, wherein the instructions further cause the at least one processor of the control system to:

remove an expandable node from a queue while expanding the graph to form the second path, when a sequence of motion primitives between the root node and the corresponding expandable node comprises a number of motion cusps greater than a predefined threshold.

17. The control system of claim 15, wherein the instructions further cause the at least one processor of the control system to:
  select the expandable node to form the first path without the constraint associated with the number of motion cusps; and
  select the expandable node to form the second path, wherein the expansion of the graph is subjected to the constraint associated with the total number of motion cusps.

18. The control system of claim 13, wherein the instructions further cause the at least one processor of the control system to:
  initialize the second tree with a root node at a distance from the target node having a cusps-free movement to the target node.

19. The control system of claim 18, wherein the root node is connected to the target node with an edge defining a straight motion.

20. A method for controlling an entity, the method comprising:
  constructing a graph having multiple nodes defining states of a vehicle, the multiple nodes of the graph comprising an initial node defining an initial state of the vehicle and a target node defining a target state of the vehicle, wherein each pair of nodes in the graph is connected with an edge defined by one or a combination of collision-free motion primitives moving the vehicle between the states of the connected nodes, each node comprising a number of motion cusps, and wherein the multiple nodes connected through corresponding edges form a first path through the graph connecting the initial node with the target node by a sequence of motion primitives for moving the vehicle from the initial state to the target state;
  determining a first number of motion cusps in the sequence of motion primitives of the first path, wherein a motion cusp from the first number of motion cusps indicates a switching between a forward motion and a backward motion in the sequence of motion primitives;
  on determining that the first number of motion cusps is above a threshold, expanding the graph to add new nodes until a termination condition is met, wherein the expansion of the graph is subjected to a constraint associated with a total number of motion cusps, the graph being expanded to form a second path connecting the initial node with the target node, wherein the second path has a second number of motion cusps that is less than the first number of motion cusps; and
  controlling a movement of the vehicle based on the second path.

21. The method of claim 20, the method further comprising:
  performing the expansion of graph until the termination condition is met; and
  controlling the movement of the vehicle based on the second path, when the second path is formed before the termination condition is met, or controlling the movement of the vehicle based on the first path, when the second path is not formed until the termination condition is met.

22. The method of claim 20, to form at least one of: the first path or the second path, the method further comprising:
  constructing a first tree of a first set of nodes originating from the initial node;
  constructing a second tree of a second set of nodes from the target node; and
  connecting the first tree with the second tree by connecting a node from the first set of nodes with another node from the second set of nodes control commands for the vehicle to cause the vehicle to follow the trajectory.

23. The method of claim 22, to form at least one of: the first path or the second path, the method further comprising:
  selecting an expandable node from at least one of: the first nodes of the first tree, or the second nodes of the second tree, based on a cost associated with the expandable node; and
  expanding the graph by adding a child node connected to the expandable node with an edge defined by a collision-free motion primitive such that a cost of the child node is less than the cost of the expandable node, wherein the cost of the child node is a minimum cost for reaching the target node from the initial node through the child node, the cost of the child node comprising a first cost of an initial path through the first set of nodes, a second cost of a target path through the second set of nodes, and a third cost of a connecting path between the first set of nodes and the second set of nodes.

24. A non-transitory computer readable storage medium embodied thereon a program executable by a processor for performing a method, the method comprising:
  constructing a graph having multiple nodes defining states of a vehicle, the multiple nodes of the graph comprising an initial node defining an initial state of the vehicle and a target node defining a target state of the vehicle, wherein each pair of nodes in the graph is connected with an edge defined by one or a combination of collision-free motion primitives moving the vehicle between the states of the connected nodes, each node comprising a number of motion cusps, and wherein the multiple nodes connected through corresponding edges form a first path through the graph connecting the initial node with the target node by a sequence of motion primitives for moving the vehicle from the initial state to the target state;
  determining a first number of motion cusps in the sequence of motion primitives of the first path, wherein a motion cusp from the first number of motion cusps indicates a switching between a forward motion and a backward motion in the sequence of motion primitives;
  on determining that the first number of motion cusps is above a threshold, expanding the graph to add new nodes until a termination condition is met, wherein the expansion of the graph is subjected to a constraint associated with a total number of motion cusps, the graph being expanded to form a second path connecting the initial node with the target node, wherein the second path has a second number of motion cusps that is less than the first number of motion cusps; and
  controlling a movement of the vehicle based on the second path.

* * * * *